US010419411B2

(12) United States Patent
Garcia et al.

(10) Patent No.: US 10,419,411 B2
(45) Date of Patent: *Sep. 17, 2019

(54) NETWORK-VISITABILITY DETECTION

(71) Applicant: Microsoft Technology Licensing, LLC, Redmond, WA (US)

(72) Inventors: Aurelio Navarro Belletti Garcia, Issaquah, WA (US); Madis Kaal, Tallinn (EE)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 194 days.

This patent is subject to a terminal disclaimer.

(21) Appl. No.: 15/179,000

(22) Filed: Jun. 10, 2016

(65) Prior Publication Data

US 2017/0359326 A1    Dec. 14, 2017

(51) Int. Cl.
*H04L 29/00* (2006.01)
*H04L 29/06* (2006.01)
(Continued)

(52) U.S. Cl.
CPC .......... *H04L 63/08* (2013.01); *H04L 9/3271* (2013.01); *H04L 63/123* (2013.01); *H04L 63/20* (2013.01);
(Continued)

(58) Field of Classification Search
CPC .......... H04L 63/0428; H04L 63/0442; H04L 12/189; H04L 63/061; H04L 2463/101;
(Continued)

(56) References Cited

U.S. PATENT DOCUMENTS 7,760,710 B2    7/2010  Halasz et al.
8,904,013 B2   12/2014  Papakipos et al.
(Continued)

FOREIGN PATENT DOCUMENTS

EP    2194737 A1 *  6/2010  ............ H04W 12/08

OTHER PUBLICATIONS

Barkay, et al., "Wireless Infrastructure Implementation: Best Practices," White-Paper of Intel, Nov. 2014, pp. 1-14.
(Continued)

*Primary Examiner* — Ghazal B Shehni
(74) *Attorney, Agent, or Firm* — Drinker Biddle & Reath LLP

(57) ABSTRACT

A state of visitability of a network interface can be determined by transmitting, via a network interface, a security request including data of a trigger. The security request can be transmitted to a network access point (NAP). A result associated with the security request can be determined. A state of visitability of the NAP can be determined based at least in part on the result. The state of visitability can indicate whether a predetermined credential-evaluation entity is reachable via the NAP. In some examples, a network registry can receive an indication of a first NAP. The network registry can determine, based at least in part on stored registry information, an instruction associated with the first network access point, and transmit the instruction. In some examples, a terminal can present a user interface including an indication of a NAP and a content item referenced by the instruction.

20 Claims, 16 Drawing Sheets

(51) Int. Cl.
  *H04W 12/08* (2009.01)
  *H04L 9/32* (2006.01)
  *H04W 12/06* (2009.01)
  *H04W 84/12* (2009.01)
(52) U.S. Cl.
  CPC ............ *H04W 12/06* (2013.01); *H04W 12/08* (2013.01); *H04L 2209/80* (2013.01); *H04W 84/12* (2013.01)
(58) Field of Classification Search
  CPC  H04L 65/4076; H04L 2209/80; H04L 63/062
  See application file for complete search history.

(56) References Cited

U.S. PATENT DOCUMENTS

| | | | |
|---|---|---|---|
| 2005/0044216 A1 | 2/2005 | Zhang et al. | |
| 2006/0089122 A1 | 4/2006 | Zavalkovsky et al. | |
| 2010/0114878 A1 | 5/2010 | Lu et al. | |
| 2010/0146272 A1* | 6/2010 | Centonza | H04W 28/02 713/168 |
| 2013/0155876 A1 | 6/2013 | Potra et al. | |
| 2015/0146703 A1* | 5/2015 | Son | H04W 48/16 370/338 |

OTHER PUBLICATIONS

"Cloudessa—Manage WiFi Access in Captive Portal Hotspots and Co-Working Spaces," published Aug. 30, 2013, at <<http://cloudessa.com/solutions/manage-wifi-access-in-captive-portal-hotspots-and-co-working-spaces/>>, 3 pages.
Farnham, "Detecting DNS Tunneling", available at: <<https://www.sans.org/reading-room/whitepapers/dns/detecting-dns-tunneling-34152>>, Feb. 25, 2013, 32 pages.
"FortiOS Handbook—Deploying Wireless Networks for FortiOS 5.0," published Feb. 20, 2014, at <<http://docs.fortinet.com/uploaded/files/1091/fortigate-wireless-50.pdf>>, 113 pages.
FeeRADIUS Wiki, "config/Proxy", available at <<http://wiki.freeradius.org/config/Proxy>>, Mar. 26, 2015, 4 pages.
"Hotex RADIUS Manager—Subscriber Billing and Bandwidth Management with Radius Authentication," published Jan. 13, 2008, at <<http://hotspotexpress.in/products/radius.html>>, 2 pages.
"HP Cloud Network Manager User Guide," published Jul. 2014, at <<http://h20565.www2.hpe.com/hpsc/doc/public/display?sp4ts.oid=7102761&docId=emr_na-c04380236&docLocale=en_US>>, 89 pages.
Juniper Networks, "Domain Name and Realm Name Overview", available at <<http://www.juniper.net/techpubs/en_US/lunose13.3/topics/concept/aaa-access-domain-name-realm-name-overview.html>>, Sep. 20, 2012, 3 pages.
Microsoft.com, "Realm names", available at <<https://technet.microsoft.com/en-us/library/cc779938(d=printer,v=ws.10).aspx>>, Jan. 21, 2005, 2 pages.
"RADIUS Authentication, Authorization, and Accounting," published Apr. 6, 2011, at <<https://msdn.microsoft.com/en-us/library/bb892012(v=vs.85).aspx>>, 2 pages.
"Radius for UNIX Administrator's Guide," Lucent Technologies, retrieved Mar. 19, 2016, at <<http://portmasters.com/tech/docs/radius/proxy.html>>, 14 pages.
"RADIUS Server," published May 21, 2014, at <<https://msdn.microsoft.com/en-us/library/cc755248.aspx>>, 3 pages.
Rigney et al., "Remote Authentication Dial in User Service (RADIUS)", Network Working Group, Request for Comments No. 2865, Jun. 2000, 76 pages.
Ruckus, "How Interworking Works A Detailed Look at 802.11u and Hotspot 2.0 Mechanisms", available at <<www.ruckuswireless.com>>, Jul. 2013, 12 pages.
"Using Regular Expressions in NPS," retrieved Mar. 19, 2016, at <<https://technet.microsoft.com/en-us/library/cc755272(v=ws.10).aspx>>, 3 pages.
"WiNG 5 FIPS 140-2," retrieved Dec. 15, 2015, at <<https://www.zebra.com/us/en/products/spec-sheets-latest/wing-5-fips-spec-sheet-en.pdf>>, 7 pages.
Wright, D., "Hotspots Get Hotter with Release 2 of Hotspot 2.0," published Oct. 27, 2014, at <<http://www.theruckusroom.net/2014/10/hotspots-get-hotter-with-release-2-of-hotspot-20.html>>, 5 pages.

* cited by examiner

NETWORK-VISIBILITY DETECTION

BACKGROUND

Many computing devices are able to connect to various networks, either sequentially or simultaneously. For example, many smartphones, tablets, laptop computers, and other network-connectable computing devices ("terminals") can connect to, and roam between, cellular networks operated by various carriers. Furthermore, many terminals, such as smartphones, can connect to multiple networks simultaneously, e.g., cellular and WIFI networks, and select one or more of those networks to carry data of a particular connection.

Since cellular networks are often more expensive than WIFI networks, users often prefer to use WIFI connections whenever possible. However, since users often desire reliable network connectivity, users may use cellular networks that support roaming between coverage areas without terminating existing network connections, which many WIFI networks do not.

Many airports, hotels, restaurants, and other business or residential locations include WIFI Wireless Access Points (WAPs). WAPs may be located at a store, enterprise, point of interest or other location (referred to generically herein as a "hotspot") to provide wireless service to nearby terminals. Some WAPs provide wireless network connectivity to any terminal within range. Other WAPs provide wireless network connectivity only to terminals that provide authorization information. Authorization information can include, e.g., 802.1X credentials, a WIFI key used for encryption and authentication, a username and password, an access token provided, e.g., by an operator of the hotspot, or other credentials. Some prior schemes place the burden of authenticating to a WAP or a network on the user of a device.

SUMMARY

This disclosure describes systems, methods, and computer-readable media for determining a state of visitability of a network access point. In some examples, even when a terminal is receiving network service from a network access point, e.g., when the device and the access point are in communication, the network access point may require credentials before providing network access. The state of visitability can indicate whether the network access point will accept credentials issued by a particular issuing entity, in some nonlimiting examples.

In some examples, a computing device such as a terminal can transmit, via the network interface, a security request including data of a trigger. The security request can be transmitted to a network access point. The computing device can determine a result associated with the security request and determine a state of visitability of the network access point based at least in part on the result. The state of visitability can indicate whether a credential-evaluation entity is reachable via the network access point. An identifier of the credential-evaluation entity can be stored, e.g., in a computer-readable medium. According to example techniques described herein, a computing device, e.g., a network registry, can receive an indication of a first network access point. The computing device can determine, based at least in part on stored registry information, an instruction associated with the first network access point. The computing device can transmit the instruction via the network interface. According to further example techniques described herein, a computing device such as a terminal can transmit, via a network interface, a request for instruction comprising identification of a network access point. The computing device can receive, via the network interface, an instruction comprising a content identifier. The computing device can retrieve, from a memory, a content item associated with the content identifier, and present a user interface including an indication of the network access point in association with the content item.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, can refer to systems, methods, computer-readable instructions, modules, algorithms, hardware logic, or operations as permitted by the context described above and throughout the document.

BRIEF DESCRIPTION OF THE DRAWINGS

The same numbers are used throughout the drawings to reference like features and components. The drawings are not necessarily to scale.

DETAILED DESCRIPTION

Overview

Figure 1:
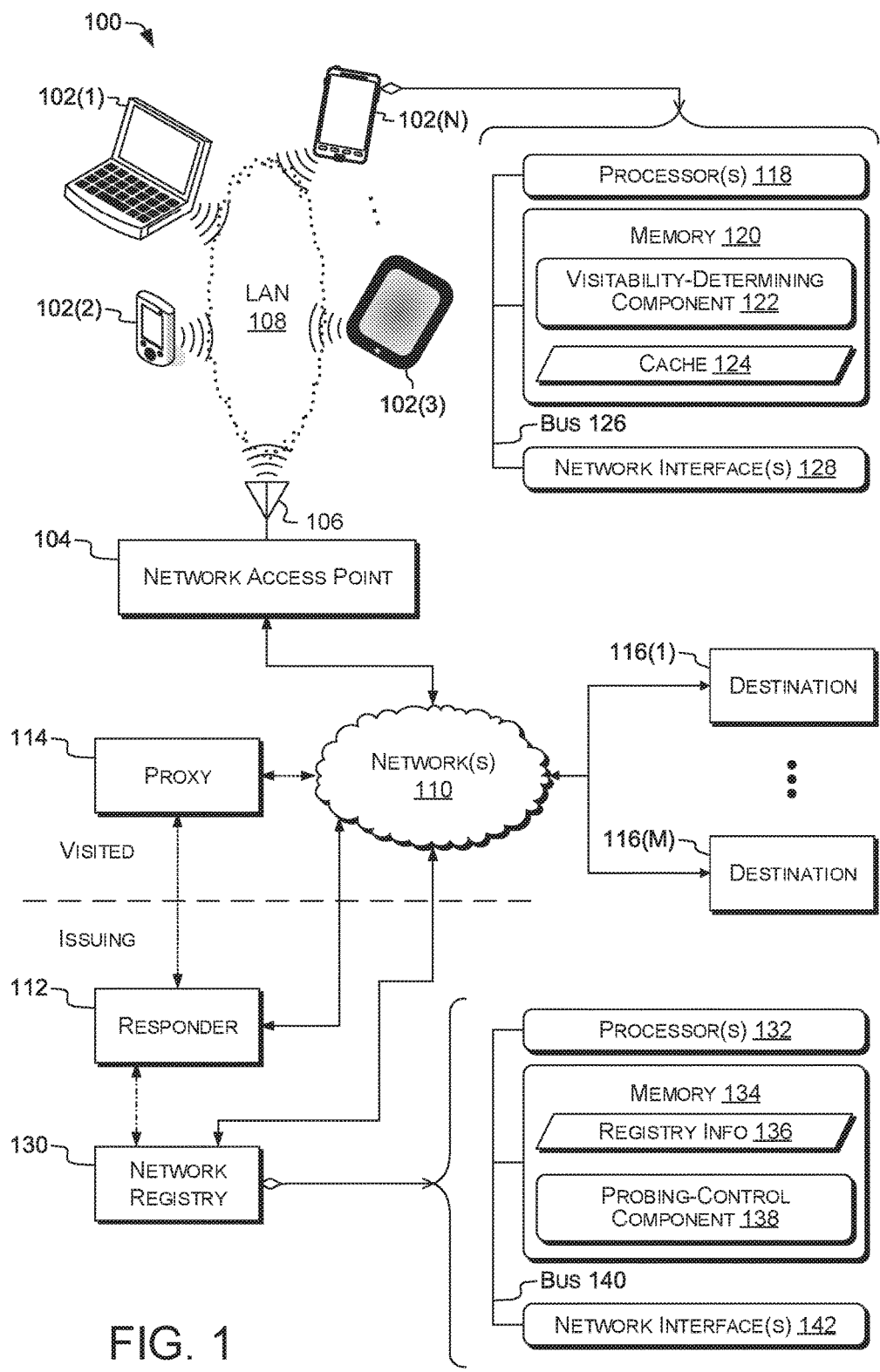
FIG. 1 is a block diagram depicting an example environment for implementing visitability-state detection as described herein.

As used herein, "network service" refers to a connection between a computing device and a network access point, such as a WAP or an Ethernet switch, via which data can be transmitted. For example, a WIFI client can receive network service by associating with a WAP. Network service can be provided via various types of networks, e.g., WIFI, ZIG-BEE, Ethernet, near-field communications techniques (NFC), cellular data networks such as LTE networks or WIMAX networks, or other personal-area, local-area, wide-area, or metropolitan-area networks. Smartphones, cellular networks, and WIFI networks are used for clarity of illustration and are not limiting. Numerous other types of wireless devices may also be used in accordance with the techniques described herein. Throughout this document, unless otherwise expressly indicated, features discussed in the context of WAPs are also applicable to other network access points (NAPs), e.g., Ethernet jacks in public areas such as airports.

As noted above, some WAPs, e.g., "open" WAPs, provide wireless network service to any computing device within range. However, even on open WAPs (or other open network access points, and likewise throughout the document), wireless network service does not guarantee network connectivity. Some WAPs permit access only to pre-selected network servers (or services, and likewise throughout the document), such as the WAP vendor's Web site or the hotspot owner's Web site. This is often referred to as a "walled garden" configuration. Additionally or alternatively, some WAPs require users to interact with a captive portal, often presented as a Web page, before permitting access to servers other than the captive portal (or sites permitted by a walled garden). Captive portals can require users to enter credentials or agree to terms of service before permitting network connectivity to such servers or services. Additionally or alternatively, some WAPs require authentication, e.g., via the Institute of Electrical and Electronics Engineers (IEEE) 802.1X protocol or other authentication protocols, before permitting access to network destinations other than an authentication server such as a Remote Authentication Dial In User Service (RADIUS) server.

Many implementations of captive portals respond to any attempt to access a server with the HyperText Markup Language (HTML) source of the captive portal's main Web page. In this way, whenever a user attempts to access a Web page, the captive portal will appear. For example, a hotel may provide WIFI network service to its guests, but require entry of an access token, e.g., a guest's room number, in a captive-portal interface before providing network connectivity to destinations other than those controlled by the hotel. As used herein, "whitelisted" servers or protocols are servers or protocols to which a walled-garden or captive-portal implementation permits access, e.g., without requiring credentials such as a hotel room number, a username and password, or other authorization information.

As used herein, a state of network connectivity of a network interface indicates the degree to which a terminal can, without specific (e.g., per-connection) authorization by the WAP or other network service provider, establish network connections via that network interface to servers selected by the terminal. A terminal may have multiple network interfaces having different states of network service or network connectivity. For example, a cellular network interface and a WIFI network interface may both have network service, but the cellular network interface may have unrestricted network connectivity while the WIFI network interface has restricted network connectivity.

For example, walled gardens restrict network connectivity to only specific sites approved by the network service provider. Therefore, a terminal connected via a walled garden has a different state of network connectivity than a terminal connected via an unrestricted network. Similarly, captive portals restrict network connectivity to, in some examples, only the captive portal. As a result, network service does not guarantee desired states (e.g., levels) of network connectivity. As used herein, "network connectivity" does not refer to non-local restrictions on network access such as those due to failures at the server or to intervening black holes, firewalls, or filters. Examples of such restrictions are discussed below with reference to FIG. 2.

The HOTSPOT 2.0 and IEEE 802.11u protocols are intended to permit roaming between WIFI networks with a user experience (UX) similar to the user experience provided by cellular roaming. In some example roaming scenarios, an issuing entity issues credentials to users. A visited entity operates a WAP from which a user can receive network service. Issuing entities and visited entities, e.g., hotspot or other WAP or NAP operators, can join together in "roaming consortia" identified, e.g., by an IEEE-assigned Organization Identifier (OD). When a user subscribes to a roaming service from one provider in a roaming consortium, that user can use WAPs operated by any member of that roaming consortium, referred to herein as "visitable" WAPs. That is, credentials issued by the issuing entity can be used to obtain network connectivity from a WAP associated with a visited entity in a same roaming consortium as the issuing entity. This can improve user experience, e.g., by permitting a device to bypass a captive portal and receive network connectivity directly upon connecting with a visitable WAP. As used herein, the term "roaming consortium" is not limited to HOTSPOT 2.0 or IEEE 802.11u roaming consortia.

In some examples, an issuing entity operates a credential-evaluation entity, e.g., a RADIUS server, that can determine whether credentials presented are valid credentials issued by that issuing entity. Credential-evaluation entities can include any networked or network-connectable computing devices configured to check the validity of credentials presented, e.g., by computing devices. Example credential-evaluation entities can include Authentication, Authorization and Accounting (AAA) servers. For brevity, credential-evaluation entities are referred to herein as "responders."

At present, the HOTSPOT 2.0 and IEEE 802.11u protocols are not yet widely implemented. Moreover, even when implemented, some visible WAPs must be manually configured with the OI(s) of roaming consortium(s) in which the visible WAPs operators participate. Some visible WAPs or visible responders may not be properly configured, which may result in WAPs failing to advertise all the OI(s) associated with those WAPs. Moreover, a particular WAP may experience intermittent failures in connectivity to a responder, causing the visibility of a WAP to change over time. Therefore, there is a continuing need for techniques terminals can use to determine whether a particular WAP is a visible WAP.

Examples techniques herein permit determining and using a state of visibility of a network to enable a terminal to authenticate to a network access point using credentials provided by an issuing entity. The "issuing entity" is any entity that provides or otherwise determines credentials of a user, e.g., an Internet Service Provider (ISP), an entity operated by a routing consortium or network-service company such as IPASS, BOINGO, or WAYPORT, an operating-system vendor, or a cellular network operator. As used herein, a state of visibility of a network access point indicates the degree to which a terminal can obtain network connectivity via that network access point using credentials provided by an issuing entity. For example, a WAP operated by the issuing entity or a service that operates the issuing entity (e.g., a network-service company) generally has a state of full visibility (with respect to the issuing entity). In another example, a visible WAP that advertises an OI known to the terminal, and that can communicate with a responder associated with that OI, has a state of full visibility. The terminal can authenticate with the visible WAP and obtain full network connectivity using issuing-entity credentials. In some examples, a terminal can obtain full network connectivity from a visible WAP without user intervention. In some examples, users moving between visible WAPs having full visibility can enjoy a user experience similar to that of cellular roaming. In some examples, by contrast, a captive-portal configuration requiring a user to provide billing information before receiving network connectivity, or otherwise rejecting the use of issuing-entity credentials to obtain network connectivity, is considered to have a state of absent visibility. A WAP accepting issuing-entity credentials, e.g., only during specific times, such as during sporting events or concerts, is considered to have a state of partial visibility. In another example, a WAP on an aircraft, such as GOGO INFLIGHT, may provide at least one of network service, network connectivity, or network visibility only during specific portions of a flight, e.g., cruise flight or when the aircraft is at an altitude above 10,000 feet. Such a WAP or other network access point may be considered to have a state of partial visibility.

In some examples, a terminal receiving network service from a network access point providing a state of full visibility can use that network service, e.g., via a WIFI network, instead of a cellular network whenever the type of network transmission permits. Using the WIFI network in such situations may reduce users' wireless-data costs, provide reduced latency, or provide increased throughput, compared to using the cellular network. A terminal not connected to a WIFI network providing the desired state of connectivity can use the cellular network for data connections. Selecting a network to use for data connections based at least in part on a state of network visibility may reduce the occurrence of dropped or interrupted network connections, or may permit the user to use network services without interruption by, e.g., captive-portal user interfaces (UIs).

A state of visibility of a network access point is associated with a particular issuing entity. For example, a particular network access point can simultaneously or concurrently have a state of full visibility with respect to one issuing entity, e.g., operated by a first routing consortium, and a state of absent visibility with respect to another issuing entity, e.g., operated by a second routing consortium. In some examples, a routing consortium may operate or include multiple issuing entities, and a network access point may have respective states of network visibility with respect to individual ones of those issuing entities. In some examples, multiple network access points may share a state of visibility. For example, multiple WIFI access points (APs) may participate in an Extended Service Set (ESS). Within an ESS, a terminal may be able to roam between APs using a re-association sequence. In some examples, one or more APs in the ESS may have a common state of network visibility with respect to a particular issuing entity. In some examples, one or more APs may have respective states of network visibility with respect to a particular issuing entity.

According to various examples herein, visibility can be tested by querying a predetermined destination, e.g., a responder such as a RADIUS server. This querying is referred to as "probing." As used herein, a "destination" is an identifiable recipient of network traffic, e.g., authentication traffic. A destination can include a network-connected peer, e.g., a server or client. Network traffic for a particular destination can be handled by one server or by one or more servers of a group of servers. For example, packets to an anycast IP address (a destination) can be handled by any peer reachable at that IP address. In another example, a particular hostname or network address (a destination) can be associated with a load-balancer that routes traffic for that destination to one of a number of peers for processing.

In an example of probing, a terminal can transmit a RADIUS request via a network access point, e.g., a WAP. The RADIUS request can include a trigger, e.g., an invalid username. The RADIUS request can be conveyed to a RADIUS server or other responder, which can respond with a RADIUS Reply-Message having known content, e.g., an OI, text string, or other data identifying a roaming consortium or network provider. The terminal can receive the RADIUS Reply-Message and determine that the network access point has a state of full visibility if the Reply-Message matches a predefined reply message stored at the terminal. If the terminal does not receive a RADIUS response, receives a response without a Reply-Message, or receives a response with a Reply-Message not matching the predefined reply message, the terminal can determine that the network access point does not provide a state of full visibility, or can determine that the state of network visibility is unknown. Various examples are described below, e.g., with reference to blocks 620 or 626.

Example techniques described herein can enable terminals to select an appropriate network for data communications in progress, e.g., when moving into or out of a particular wireless network's coverage area. Selecting appropriate networks can reduce the probability of dropped connections or data loss, and can improve usability of network-centric applications. Example techniques herein can provide the user with a choice of networks having known states of visibility, improving the user experience of roaming. Some example techniques described herein can permit more robustly or efficiently determining the state of visitability of a network access point, and selecting an appropriate network based at least in part on the state of visitability.

Some example techniques described herein can reduce network bandwidth consumption and processor usage associated with attempts to connect via networks having reduced visibility. Reducing bandwidth consumption can increase network throughput for a terminal or for other computing devices connected to the same network access point as the particular terminal. Reducing processor usage can save power, increasing battery life of portable terminals such as smartphones. Some example techniques herein can provide information about a particular network access point, e.g., in a particular hotspot, permitting adjusting probing operation according to the characteristics of visitability experienced by other users of a particular network access point.

Some example scenarios and example techniques for network-visitability detection are presented in greater detail in the following description of the figures. As noted above, various examples are presented with reference to cellular data networks or WIFI networks providing full visibility and WIFI networks providing limited visitability (e.g., WAPs that are not visitable WAPs). However, these examples are not limiting, and other types of networks can be configured with various states of network connectivity or visitability.

For brevity of illustration, in the diagrams herein, an arrow beginning with a diamond connects a first component or operation (at the diamond end) to at least one second component or operation that is or can be included in the first component or operation.

Illustrative Environment

FIG. 1 shows an example environment 100 in which examples of network-visitability-determining systems can operate or in which methods for determining visibility such as described below can be performed. In the illustrated example, various devices or components of environment 100 include computing devices 102(1)-102(N) (individually or collectively referred to herein with reference 102), N≥1, depicted as portable computing devices. Computing device 102 represents any type of device that can communicate via a network. Computing device 102 can be implemented as, for example, but without limitation, a laptop (e.g., 102(1)), a personal digital assistant (PDA) (e.g., 102(2)), a tablet computer such as a MICROSOFT SURFACE or APPLE IPAD (e.g., 102(3)), a smartphone such as a MICROSOFT LUMIA (e.g., 102(4)), a feature phone, a smart watch, a network-connectable biometric device such as a fitness tracker, a virtual-reality (VR) or augmented-reality (AR) display such as GOOGLE GLASS or other displays or computing systems, e.g., configured to be worn on the head, wrist, or another part of the body, a network-connectable sensor or actuator, a robot, an network-enabled television, a television set-top box (cable or otherwise, e.g., an APPLE TV), a game console, a portable gaming system, a desktop computer, or a server. Different devices or types of devices can have different uses for network connectivity information. For example, smartphone 102(N) can use network connectivity information to determine which wireless network to use for new connections to destinations. In another example, laptop computer 102(1) can use network connectivity information to determine whether the laptop computer is connected to a corporation's private network or to a public network, and to adjust security settings accordingly. In some examples, a computing device 102 can use visitability information to select a network via which to communicate.

In the illustrated example, computing devices 102 receive network service from network access point (NAP) 104. In the illustrated example, NAP 104 is a WAP having antenna 106 and providing wireless network service. For example, NAP 104 can host a local network 108, e.g., an Ethernet or WIFI local-area network (LAN). NAP 104 is connected via one or more network(s) 110, e.g., the Internet, to one or more responders 112. For brevity, only one responder 112 is shown. In some examples, at least one responder 112 can be or include a RADIUS server or another Authentication, Authorization and Accounting (AAA) or other security server.

In some examples, local network(s) 108 or network(s) 110 can each be or include a cable television network, radio frequency (RF), microwave, satellite, or data network, such as the Internet, and can each support wired or wireless media using any format or protocol, such as broadcast, unicast, or multicast. Additionally, each of local network(s) 108 or network(s) 110 can be any type of network, wired or wireless, using any type of network topology and any network communication protocol, and can be represented or otherwise implemented as a combination of two or more networks.

Responders 112 can include, e.g., RADIUS servers responding to authentication or authorization requests, other computing devices 102, or other computing devices configured to receive and respond to security requests. Responders 112 can be part of a load-balancing arrangement, in some examples. At least when a desired state of network service or of network connectivity is provided by NAP 104, computing devices 102 can communicate with responders 112 via NAP 104 and network 110. In some examples, computing device 102 can communicate with NAP 104 using a first protocol, e.g., secure HyperText Transfer Protocol (HTTPS), and NAP 104 can communicate with responder 112 using a second protocol, e.g., RADIUS.

In some examples, graphically depicted with stippled lines, NAP 104 can be connected to a proxy 114, e.g., via network 110. Proxy 114 can include, e.g., a RADIUS server configured to perform proxy functions, a dedicated RADIUS proxy, or a device providing proxy functions for security requests expressed in other protocols. A computing device 102 or NAP 104 can communicate with a responder 112 via a proxy 114. In some examples, computing device 102 or NAP 104 can communicate with a responder 112 via multiple proxies 114 in a proxy chain (omitted for brevity). A proxy chain can include any number of proxies 114. For example, a security request from computing device 102 or NAP 104 (e.g., on behalf of computing device 102) can be passed sequentially through a chain of proxies 114 before reaching responder 112. A response from responder 112 can be passed sequentially through the chain of proxies 114 in the reverse order of the request before reaching computing device 102 or NAP 104. In some examples, full visibility may not be present if at least one proxy 114 in a proxy chain is not configured to properly forward a request toward responder 112.

In some examples, given sufficient network connectivity, a computing device 102 can communicate via local network 108, NAP 104, and network 110 with one or more destinations 116(1)-116(M) (individually or collectively referred to herein with reference 116), M≥1. Destinations 116 can include, e.g., web servers, email servers, other computing devices 102, or other network-connected computing devices.

In some examples, at least one of the destinations 116 can include a portal server (omitted for brevity), e.g., connected to NAP 104 via network 110. The portal server can additionally or alternatively be included in, or bundled or co-located with, NAP 104. One portal server can communicate with one or more NAPs 104, and one NAP 104 can communicate with one or more portal servers. The portal server can include, a Web server responding to queries by providing content of a captive-portal Web page. The portal server can also communicate with NAP 104 to control the network connectivity provided to a particular computing device 102. For example, when a user provides valid credentials to a portal server via a computing device 102, the portal server can direct NAP 104 to provide a selected state of network connectivity, e.g., full connectivity, to the corresponding computing device 102. In some examples described herein, NAP 104 can additionally or alternatively provide a selected state of network connectivity, e.g., full connectivity, to the corresponding computing device 102 at the direction of at least one responder 112.

In the illustrated example, computing device 102 includes at least one processor 118 and at least one memory 120 (e.g., a computer-readable medium, CRM) configured to store, e.g., data of responders 112 or security requests being issued to responders 112. The details of example computing device 102 can be representative of other computing devices 102 or of responders 112. However, individual ones of computing devices 102 or responders 112 can include additional or alternative hardware or software components.

Memory 120 can also store a visitability-determining component 122 stored in the memory 120 and executable on the processor 118. The component 122 can include, e.g., modules stored on computer-readable media such as computer storage media (discussed below) and having thereon computer-executable instructions. The instructions, when executed by the at least one processor 118, cause the at least one processor 118 to perform operations such as the operations described below with reference to FIGS. 3-20. In the illustrated example environment 100, component 122 can be a component of an operating system (not shown) or otherwise stored or executed locally on computing device 102.

Memory 120 can also include a cache 124 of information of responders 112 or other information. Examples are discussed below with reference to, e.g., at least FIG. 3, 12, 13, or 17-19. For example, the cache 124 can store identification information of visitable NAPs, or content items, as described below. In some examples, the cache 124 or memory 120 can store an identifier of a credential-evaluation entity, e.g., responder 112. For example, the identifier can include a Uniform Resource Identifier (URI) such as a Uniform Resource Name (URN) or Uniform Resource Locator (URL). The identifier can additionally or alternatively include a network address (e.g., an IPv4 dotted-quad or an IPv6 address), domain name, hostname, service name, or other identifier of a responder 112 or a proxy 114. The identifier can additionally or alternatively include at least one element of a routing chain, or a full routing chain, e.g., as discussed below with reference to FIG. 312. In some examples, the identifier is stored as a component of a username or other credential. In some examples, the identifier is stored separately from at least one credential. In some examples, the identifier is received via a user interface and stored, e.g., in a random-access memory (RAM) or a nonvolatile memory.

Processor 118 can communicate information with memory 120, e.g., via bus 126. Processor 118 can also communicate via bus 126 with network interface(s) 128, which can in turn permit communication via local network 108. In some examples, processor 118 can receive information via network interface 128, e.g., from a network registry 130 as discussed below. Information stored in cache 124 by one computing device 102 may differ from information stored by another computing device 102, e.g., because of differences between the computing devices 102 in the timing of receiving updated information from a network registry 130, or because different computing devices 102 have different operating systems or otherwise differ in ways correlated with information stored in cache 124.

Component 122 (or modules thereof, and likewise throughout the document) can be configured to determine a state of visitability. In some examples, the state of visitability can indicate whether a predetermined credential-evaluation entity is reachable via the network access point. For example, the predetermined credential-evaluation entity can be, e.g., identified by the identifier in cache 124 or memory 120. A credential-evaluation entity is "reachable" via a network access point, as described herein, at least if bidireectional communications can be conducted between the credential-evaluation entity and the network access point at least for the purpose of transmitting credentials to the credential-evaluation entity and receiving an indication of whether the credentials are valid. Reachability as used herein does not require that the NAP be able to establish communications with the credential-evaluation entity for unrelated purposes. For example, for security, credential-evaluation entity may block access to network services such as finger, rlogin, and echo, while still remaining reachable for RADIUS connections, e.g., via User Datagram Protocol (UDP) port 1812.

For example, a visitable (full-visitability) network access point may have network communications with a responder operated by an issuing entity. This can permit the visitable NAP to accept credentials determined by an issuing entity. In some examples, the state of visitability can indicate whether a network access point 104 is communicatively connectable with a credential-evaluation entity such as responder 112, e.g., to evaluate credentials. Evaluating credentials can include, e.g., checking password hashes against stored hashes associated with particular usernames, or validating digital signatures. In some examples, component 122 can be configured to receive instructions indicating which responders 112 to probe. In some examples, component 122 can be configured to probe responder(s) 112 and determine states of visitability of NAPs 104. In some examples, component 122 can be configured to transmit indications of states of visitability of NAPs 104 to network registry 130. In some examples, component 122 can be configured to provide, e.g., via a display device of a computing device 102, a visual representation of the state of visitability, e.g., as discussed below with reference to FIG. 3 or 17-20.

In the illustrated examples, a computing device 102 can (given sufficient network connectivity) communicate via network 110 with a network registry 130. Network registry 130 can store information about which responders 112 are accessible from which computing devices 102 or from which local networks 108. For example, network registry 130 can provide an instruction to computing device 102. In response to the instruction, computing device 102 can transmit a security request to at least one responder 112. Computing device 102 can determine a state of visitability of network interface 128 based at least in part on a result associated with the security request. Computing device 102 can then transmit an indication of, e.g., the state of visitability to the network registry 130. The network registry 130 can store the indication, and use the stored indication in determining future instructions to the same or other computing device(s) 102. This can permit reducing the network bandwidth required for probing, e.g., if a state of visitability of a particular network interface 128 is already known to the network registry 130.

In some examples, communications between computing device(s) 102 and responder(s) 112 or network registr(ies) 130 can be encrypted, signed, or otherwise protected from at least one of interception or alteration. For example, messages to be transmitted via network(s) 110 can be encrypted and cryptographically signed by the sender, and decrypted and verified by the receiver. Public- or private-key encryption can be used. Messages can be authenticated using a Message Authentication Code such as an HMACSH256 Secure Hash Algorithm (SHA)-256-based hash. In some examples, at least one, or each and every, message transmitted via network(s) 110 during the conduct of processes described herein (e.g., with reference to FIGS. 5-19) can include a cryptographic nonce, e.g., a timestamp, random number, random character string, or cryptographic hash of any of those, to provide increased resistance to replay or known-plaintext attacks. As used herein, a "random" item can be or include a truly random item or a pseudorandom item. As used herein, a "cryptographic nonce" can be produced using cryptographic techniques or other techniques. In a nonlimiting example, a timestamp used as a cryptographic nonce can be produced by retrieving a current time from a processor-accessible clock, without the use of any hashing, encryption, or other cryptographic algorithms.

In the illustrated example, network registry 130 includes at least one processor 132 and at least one memory 134 (e.g., a CRM) configured to store, e.g., registry information 136 of responders 112 or results of security requests issued to responders 112. Memory 134 can also store a probing-control component 138 stored in the memory 134 and executable on the processor 132. The probing-control component 138 can include, e.g., modules stored on computer-readable media such as computer storage media (discussed below) and having thereon computer-executable instructions. The instructions, when executed by the at least one processor 132, cause the at least one processor 132 to perform operations such as the operations described below with reference to FIGS. 3-20. Memory 134, and likewise memory 120, can include at least one storage device, memory device, or storage medium, and is not limited to, e.g., a single RAM bank or a single CRM.

Processor 132 can communicate information with memory 134, e.g., via bus 140. Processor 132 can also communicate via bus 140 with network interface(s) 142, which can in turn permit communication via network 110.

In some examples, as indicated by the dash-dot line, at least one responder 112 can be communicatively connected with network registry 130. The connection can be made via network(s) 110 or otherwise, e.g., via a private LAN. In some examples, at least one responder 112 can combined or integrated with network registry 130 in a single system performing function(s) of both. Accordingly, throughout this document, functions described as being performed by a responder 112 or the network registry 130 can additionally or alternatively be performed by such a combined or integrated system. In some examples, multiple responders 112 are communicatively connected via network(s) 110 with network registry 130. Registry information 136 can be updated by responder(s) 112 or network registry 130, in some examples.

In some nonlimiting examples, at least one of NAP 104, proxy 114, or a portal server (discussed above with reference to destinations 116) can be operated by a visited entity. In some nonlimiting examples, at least one of responder 112 or network registry 130 can be operated by an issuing entity. In some examples, a state of full visitability permits computing device 102 to roam, e.g., to obtain network connectivity from the visited entity based on credentials validated by the issuing entity.

Figure 2:
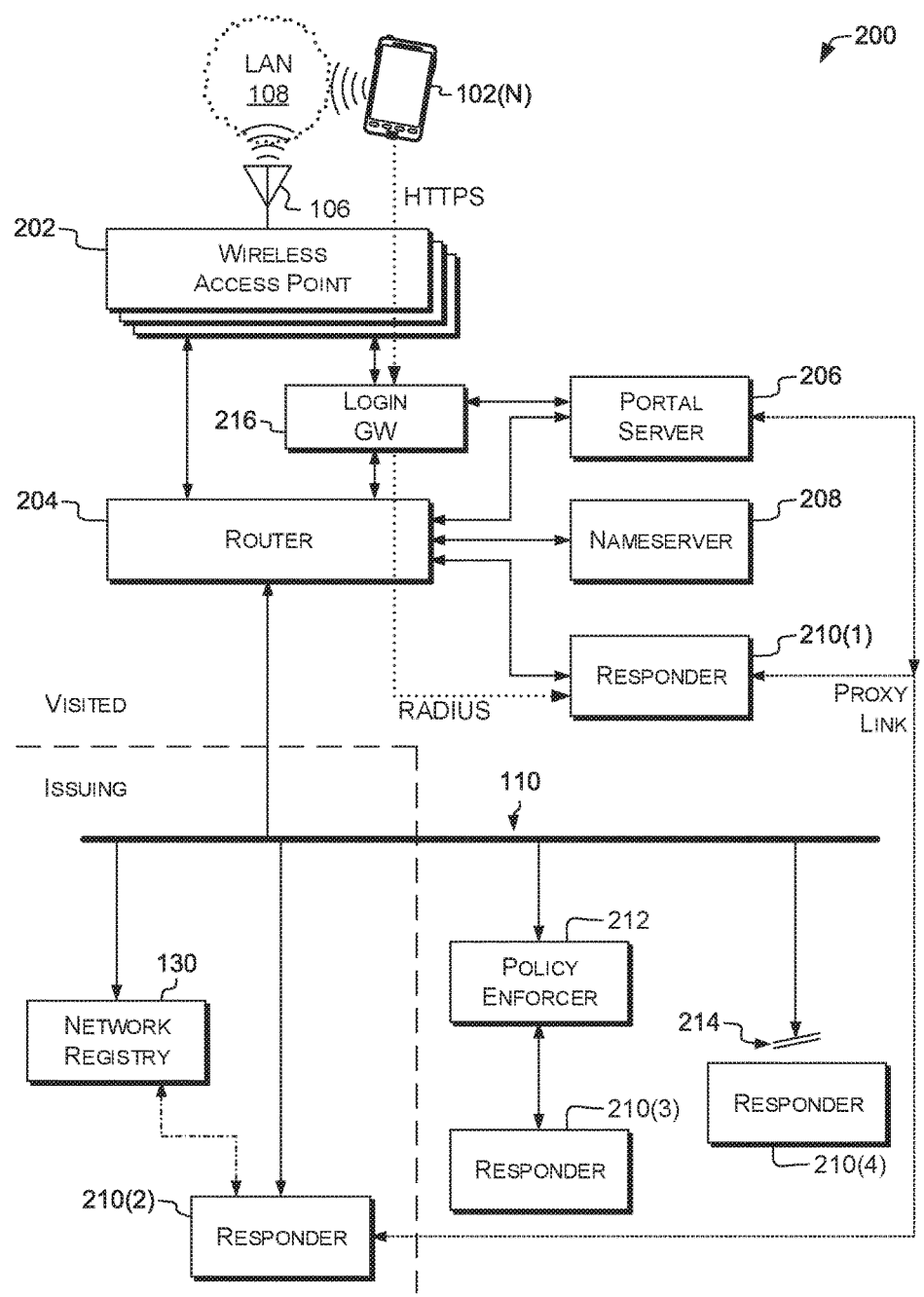
FIG. 2 is a block diagram depicting another example environment for implementing visitability-state detection as described herein.

FIG. 2 shows an example environment 200 in which examples of network-visitability determination can take place. The specific components shown are illustrative and not limiting. For example, wired communications can be used instead of wireless communications. Smartphone 102(N) receives network service of a local network 108 from WAP 202, which can represent NAP 104, FIG. 1. WAP 202 has antenna 106. As graphically represented by the stacked boxes, a particular hotspot may have multiple WAPs 202, or a particular facility may have multiple hotspots, each with one or more WAPs 202. WAPs 202 communicate with a router 204 that directs traffic via the one or more networks 110 (graphically represented with a heavy line). Router 204 can represent a switch, router, gateway, or any other network device that selectively directs network packets (or frames, datagrams, etc.) based at least in part on the headers or contents of those packets. In a captive-portal configuration, for example, router 204 can direct traffic from a not-yet-authorized computing device 102(N) to a portal server 206. In some examples, WAP 202, router 204, portal server 206, or a combination of any of those, permits computing device 102(N) to access only selected whitelisted destinations. In some examples, e.g., a hotel or restaurant chain operating hotspots at multiple locations, router 204 (or multiple routers 204, e.g., one per hotspot, and likewise throughout the document) can whitelist portal server 206 from multiple hotspots. This can permit a single portal server 206 to provide captive-portal content or functions to multiple WAPs 202.

In some examples, the accessible selected destinations include a nameserver 208, which can be whitelisted. The nameserver 208 can map names of destinations, e.g., Internet hostnames, to network addresses. For example, a nameserver can include a domain name system (DNS) server responsive to name lookups to map hostnames, e.g., "www.msftncsi.com", to internet protocol (IP) addresses, e.g., 74.202.215.16 (IPv4) or 2001:4870:e009::4aca:d710 (IPv6). In some examples, omitted for brevity, nameserver 208 can additionally or alternatively be communicatively connected to network 110.

In some examples, a captive-portal or walled-garden hotspot may permit communications with nameserver 208 even if the hotspot prohibits connections to the destinations named. Nameserver 208 can be whitelisted for name lookups, e.g., for DNS traffic on transmission control protocol (TCP) port 53 or UDP port 53. Additionally or alternatively, nameserver 208 can be whitelisted for other traffic, e.g., pings or routing messages.

For example, a user of computing device 102(N) may desire to visit the www.microsoft.com Web site. Permitting name lookups, e.g., by whitelisting nameserver 208, can permit the user's Web browser on computing device 102(N) to successfully determine, by transmitting a name lookup request to nameserver 208 and receiving a response, that "www.microsoft.com" corresponds to network address 184.87.79.194. The Web browser can then make a request to 184.87.79.194. That request, in a captive-portal example, can be intercepted by router 204 and redirected to portal server 206, e.g., at private IP address 192.168.13.37. Portal server 206 can then return a captive-portal Web page instead of the desired MICROSOFT web page. In some configurations, if name lookup fails, a Web browser will not request a page. Therefore, permitting name lookups permits users to access captive-portal Web pages. Throughout the discussions of example states of network connectivity and example states of visitability below, unless otherwise specified, router 204 can permit access to nameserver 208 for name lookups, or can permit access to nameserver 208 for any communications, or can prohibit access to nameserver 208, in various examples.

In a first state of network connectivity, router 204 permits computing device 102(N) to communicate only with portal server 206. This state can represent a captive-portal situation. As noted in the previous paragraph, router 204 can also permit computing device 102(N) to communicate with nameserver 208 for the purpose of name lookups.

In a second state of network connectivity, router 204 permits computing device 102(N) to communicate with portal server 206 or a responder 210(1) (which can represent responder(s) 112, FIG. 1), but with no other destinations. This state can represent a captive-portal, walled-garden situation, in which responder 210 is approved by the walled garden. For example, responder 210 can include a RADIUS server associated with the operator of WAP(s) 202.

In a third state of network connectivity, router 204 permits computing device 102(N) to communicate with any devices accessible via network 110. This state can represent an unrestricted access point. This state can additionally or alternatively represent a captive-portal situation after the user has been authorized by the portal server 206 to access destinations other than the portal server 206. This state is referred to for brevity as a "full-connectivity state."

Even in the full-connectivity state of network connectivity, not all responders 112, 210 or other destinations are necessarily reachable at any given time. In the illustrated example, computing device 102 can communicate with responder 210(2) via network 110. However, computing device 102 can communicate with responder 210(3) only via paths passing through policy enforcer 212. Policy enforcer 212 can include a server or other network device configured, e.g., as a selective or universal black hole, firewall, or filter. For example, policy enforcer 212 may discard packets originating from specific countries, thereby preventing computing devices 102 in those countries from accessing responder 210(3). Also in the illustrated example, the network connection to responder 210(4) is suffering a link failure 214. Link failure 214 may cause packets to responder 210(4) to be lost, preventing computing device 102(N) from accessing responder 210(4). As used herein, the state of network connectivity of a network interface does not include or represent failures such as those due to policy enforcer 212, link failure 214, or failure of individual responders 210, e.g., due to power outages. Moreover, as used herein, the state of network connectivity may include information of level(s), set(s), or other representations of reachability of responders 210 or other destinations 116, or of bandwidth, latency, or other quantitative connection parameters.

In the illustrated example, responder 210(1) is configured to operate at least in part as a proxy. Responder 210(1) can communicate requests and responses between computing device 102(N) and responder 210(2), as indicated by the stippled connector ("Proxy Link"). In some examples, portal server 206 is communicatively connected with responder 210(2), e.g., directly or via responder 210(1). In some examples, even in a state of less than full network connectivity, e.g., a state in which responder 210(2) is not directly accessible due to captive-portal or other restrictions, or to intervening network failures, computing device 102(N) can access responder 210(2) via responder 210(1) (or portal server 206, and likewise throughout the discussion of FIG. 2). In some examples, the name or address of responder 210(2) are known to responder 210(1) but not to computing device 102(N), so computing device 102(N) communicates with responder 210(2) exclusively via responder 210(1) (or another responder 210 configured with a name or address of responder 210(2)).

In the illustrated example, responder 210(2) is communicatively connected with network registry 130, as indicated by the dash-dot arrow. As discussed above with reference to FIG. 1, responder 210(2) and network registry 130 can additionally or alternatively be combined or otherwise embodied in a single system performing the functions of both.

In the illustrated nonlimiting example, at least one of WAP 202, router 204, portal server 206, nameserver 208, or responder 210(1), can be part of a "visited" networking environment, e.g., operated by a visited entity. In the illustrated nonlimiting example, at least one of responder 210(2) or network registry 130 can be part of an "issuing" networking environment, e.g., operated by an issuing entity or a network-service provider that operates the issuing entity.

In some examples, at least some functions described above with reference to router 204 can be performed by a login gateway 216 ("Login GW"). The login gateway 216 can communicate with the computing device 102 via the WAP 202 (or other NAP) and can communicate with responders 210, e.g., directly or via router 204. In some examples, computing device 102 establishes a connection, e.g., an HTTPS connection, to the login gateway 216 via WAP 202. Computing device 102 can transmit probe queries or authentication requests to login gateway 216 via this connection. Login gateway 216 can then forward or proxy the queries or requests to at least one responder 112 or 210, e.g., directly or via at least one of router 204 or proxy 114. In the illustrated nonlimiting example, as graphically depicted by the dotted arrows, computing device 102 communicates using HTTPS with login gateway 216 via WAP 202, and login gateway 216 communicates using RADIUS with responder 210 via router 204.

In some examples, portal server 206 can include, operate, perform functions of, or cooperate or be bundled with login gateway 216. In some examples, login gateway 216 can include, operate, perform functions of, or cooperate or be bundled with WAP 202. In some examples, login gateway 216 can be included in a network controller. In some examples of networks, such as Ethernet or other wired networks, login gateway 216 can be communicatively connected between router 204 and a NAP including, e.g., a switch, hub, or other device providing or aggregating network ports at OSI Layer 2.

Illustrative Processing

Figure 3:
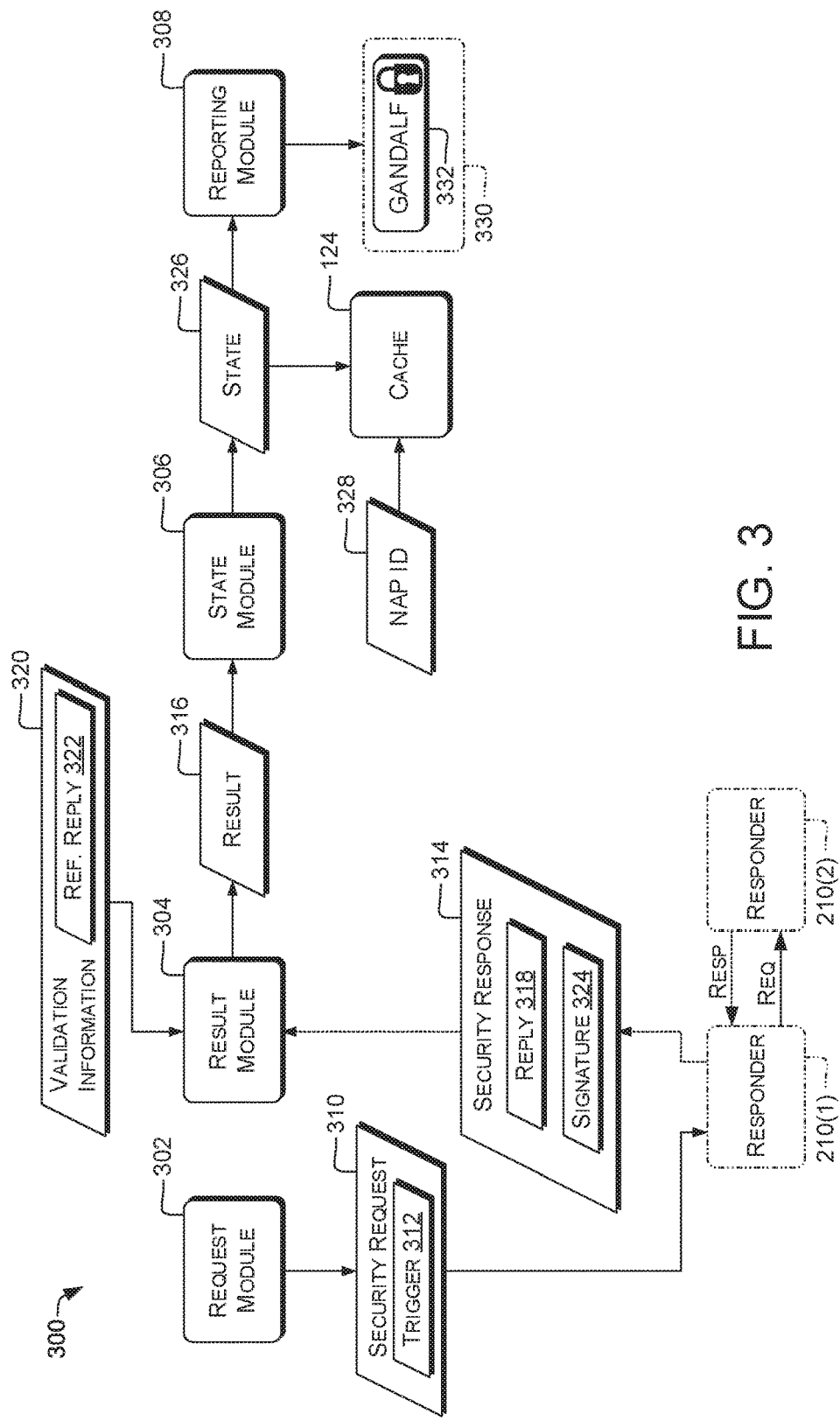
FIG. 3 is a dataflow diagram depicting example module interactions during visitability-state detection.

FIG. 3 is a dataflow diagram 300 illustrating example interactions between components illustrated in FIGS. 1 and 2, and showing example modules of visitability-determining component 122. The modules of the visitability-determining component 122, e.g., stored in memory 120, can include one or more modules (e.g., shell modules or application programming interface (API) modules, and likewise throughout the document), which are illustrated as a request module 302, a result module 304, a state module 306, and a reporting module 308.

In some examples, request module 302 is configured to transmit a security request 310, e.g., via network interface 128 to NAP 104. In some examples, the security request 310 can include an Extensible Authentication Protocol (EAP)

request, a username/password pair, or other credentials or security information. The security request 310 can include framing, e.g., IEEE 802.1X "EAP over LAN" (EAPOL) framing or RADIUS framing.

The security request 310 can have a first destination. The first destination can be the final intended destination of the security request, or can be different from the final intended destination of the security request. In the illustrated example, the first destination is responder 210(1) (shown in phantom). In some examples, request module 302 can determine the first destination based on information provided by NAP 104, e.g., in an IEEE 802.11u or HOTSPOT 2.0 probe response or Access Network Query Protocol (ANQP) response. In other examples, the first destination can be a NAP 104 such as WAP 202. In some examples, request module 302 can determine the first destination based on a beacon packet, e.g., transmitted by WAP 202. For example, request module 302 can receive an address of WAP 202, e.g., in a beacon packet, and determine the first destination to be the received address.

In some examples, the security request can include data of a trigger 312. The trigger 312 can be selected to cause a responder 112 to provide a predetermined reply in the event that the responder 112 and the visitability-determining component 122, FIG. 1, are members of a particular roaming consortium. For example, the trigger 312 can include an RADIUS username that is reserved by a particular roaming consortium for probing, e.g., as discussed above with reference to FIG. 1. In some examples, the trigger 312 can include at least one element of a predetermined set of one or more elements, e.g., credentials such as valid, reserved, or invalid usernames or other credentials. The predetermined set of elements can include, e.g., elements that are valid under the authentication protocol in use. In some examples, the security request 310 is expressed in a selected protocol, e.g., RADIUS or EAPOL.

In the illustrated example, responder 210(1) proxies the security request 310 ("Req") to responder 210(2). For example, responder 210(1) can receive the security request 310 via EAPOL and proxy the security request 310 via RADIUS to responder 210(2). Responder 210(2) can then respond with a security response ("Resp"). Responder 210(1) can proxy the security response as security response 314.

In some examples, result module 304 is configured to receive, via the network interface 128, the security response 314 associated with the security request 310. Solely for clarity, arrows related to the security response 314, or to other responses described below, are shown dashed. In some examples, depending on whether responders 210(1) or 210(2) are up, accessible via the network, or blocked, result module 304 may or may not receive the security response 314.

In some examples, result module 304 is configured to determine a result 316 associated with the security request 310. For example, result module 304 can determine the result 316 based at least in part on the security response 314, or based at least in part on whether a security response 314 was received. The result 316 can indicate at least, e.g., whether the security request 310 succeeded or failed, whether the security request 310 timed out, whether or not a response was received, whether or not the first destination or another destination was reachable over the network, or specific content of the security response 314. In some examples, the result 316 can indicate that the security request 310 successfully reached the first destination or another destination, e.g., responder 210(2), that no response to the security request 310 was received, or that security request 310 did not reach the first destination or another destination (e.g., due to a gateway failure). For example, the result 316 can indicate that the security response 314 includes an error message provided by policy enforcer 212 or another computing device other than the responder 210(1) corresponding to the first destination.

In some examples, the result module 304 is configured to determine reply information 318 in the security response 314. For example, on a RADIUS authentication failure, RADIUS servers often respond with a RADIUS Reply-Message indicating the nature of the failure. The reply information 318 can include at least a portion, or all, of the Reply-Message. Result module 304 can be configured to extract, unpack, decode, or otherwise determine the reply information 318 from the security response 314. In some examples, the reply information 318 can include challenge data, system information, or other information included in or associated with the security response 314. The result module 304 can then determine the result 316 based at least in part on the reply information 318. For example, the result module 304 can compare information in the trigger 312 to reply information 318 to determine result 316.

In some examples, the result module 304 can determine the result 316 based at least in part on the reply information 318 and stored validation information 320. The validation information 320 can be or include, e.g., data of an expected reply, shown as reference reply information ("Ref. Reply") 322. The validation information 320 can additionally or alternatively be or include, e.g., a shared secret, a version or system identifier such as a uname string, or a hostname. In some examples, result module 304 can determine the result 316 indicating whether or not the reply information 318 matches the stored validation information 320.

In some examples, the RADIUS Reply-Message or other reply information 318 can include predetermined data, such OI(s) of roaming consortia for which responder 210(2) can authenticate users, or a text string such as "ACME Corporation AAA Master Control Program". If the stored validation information 320 equals or occurs in the reply information 318, or vice versa, the reply information 318 can be determined to match the stored validation information 320.

In some examples, the security response 314 can include a cryptographic signature 324 (or "signature," for brevity) or other cryptographic-signature information. Although reply information 318 and cryptographic signature 324 are shown separately, in this example, this is not limiting. In some examples, the RADIUS Reply-Message or other reply information 318 can include the cryptographic signature 324. In some examples, the validation information 320 can include a public key or other information useful for validating a message payload, e.g., reply information 318 or a portion thereof, against cryptographic signature 324. The cryptographic signature 324 can be used in determining the result 316, e.g., as discussed below with reference to blocks 616-630.

In some examples, state module 306 is configured to determine a state 326 of visitability of the network access point 104, e.g., WAP 202, based at least in part on the result 316. For example, in response to the result 316 indicating the reply information 318 matches the stored validation information 320, the state module 306 can determine that the state 326 of visitability is a state of full visitability. If the result 316 indicates the reply information 318 does not match the stored validation information 320, the state module 306 can determine that the state 326 of visitability is a state of absent visitability. If the result 316 indicates that reply information 318 was not received, the state module 306 can determine that the state 326 of visitability is a state of unknown visitability.

In some examples, state module 306 can be configured to store, e.g., in cache 124, information of state 326 and identification information 328 ("NAP ID") identifying or otherwise associated with the network access point 104. For example, the identification information 328 can include a Service Set Identifier (SSID), a Basic SSID (BSSID), a Homogenous Extended SSID (HESSID), a Media Access Control (MAC) address of the NAP 104, or other identification information, e.g., as discussed below with reference to block 704. The stored information can be used, e.g., as discussed herein with reference to at least FIG. 13, 14, or 17-19. For example, probing can be omitted if the most recent probe or state information for a particular NAP 104, as indicated in the cache 124, is within a predetermined time period, e.g., newer than 24 hours or 168 hours before the present time. In some examples, the probing may be determined based on, e.g., BSSID or another WAP-specific identification value. In some examples, a particular visited entity may have a large number of hotspots sharing a single SSID, so probing based on BSSID instead of SSID may reduce the number of probes and the bandwidth required for probing without reducing the accuracy of the probe results. Moreover, probing based on BSSID can permit independently reporting the state of visitability of multiple NAP(s) 104 operated by a single entity under a single SSID.

In some examples, reporting module 308 can be configured to present a user interface (UI) 330 (shown in phantom), e.g., a graphical UI (GUI), comprising an indication of the NAP 104 and the result 316. In the illustrated example, UI 330 includes a representation of the SSID of NAP 104 ("GANDALF") and a padlock icon, indicating that the state 326 is a state of absent visitability. In this example, the representation of the SSID and the padlock are associated with a pushbutton 332 of UI 330. A user can activate the pushbutton to attempt to obtain network connectivity, e.g., by providing payment information or other credentials.

Figure 4:
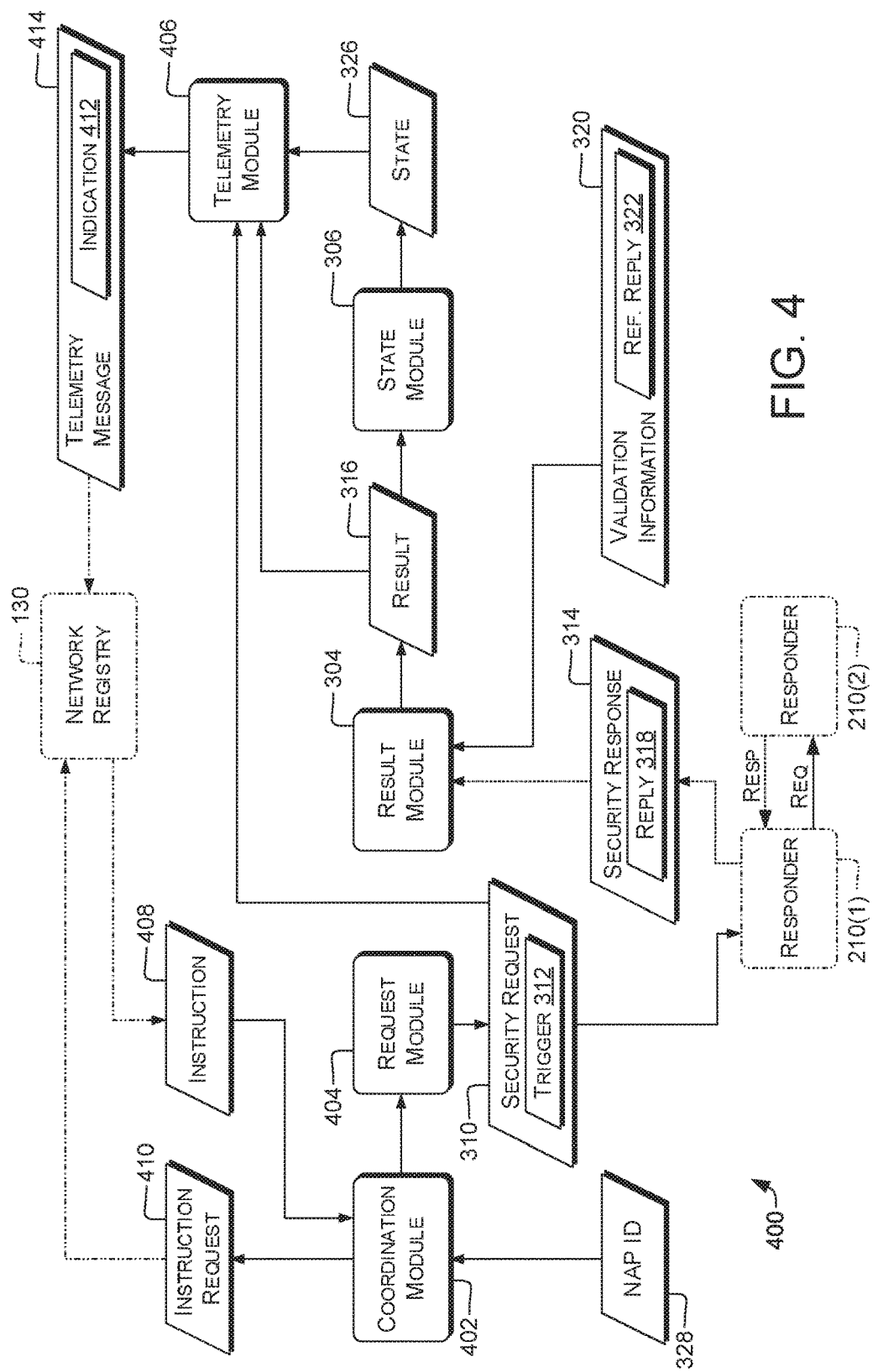
FIG. 4 is a dataflow diagram depicting example module interactions during visitability-state detection.

FIG. 4 is a dataflow diagram 400 illustrating example interactions between components illustrated in FIGS. 1 and 2, and showing example modules of visitability-determining component 122. The modules of the visitability-determining component 122 can include at least one of modules 304, 306, or 308, FIG. 3, and can further include a coordination module 402, a request module 404, and a telemetry module 406. Coordination module 402 and telemetry module 406 can communicate with network registry 130, e.g., as described below. In some examples, coordination module 402 and request module 404 can be combined into a single module performing the functions of both. In the illustrated example, responders 210(1) and 210(2) are shown separately from network registry 130. In other examples, as discussed above, network registry 130 can be combined with at least one of the responders 210(1) or 210(2).

In some examples, coordination module 402 can be configured to receive, via the network interface 128, an instruction 408. In the illustrated example, the instruction 408 is provided by the network registry 130, but this is not limiting. In response to the instruction 408, the coordination module 402 can cause the request module 404 to transmit the security request 310. In some examples, the instruction 408 can indicate that a security request 310 should be transmitted (a "probe instruction") or that a security request 310 should not be transmitted (a "no-probe instruction").

In some examples, coordination module 402 can be configured to transmit, via the network interface 128, a request 410 for instruction. For example, coordination module 402 can transmit the request 410 for instruction prior to receiving the instruction 408. In some examples, the network registry 130 can receive the request 410 for instruction and provide the instruction 408 in response to the request 410. In other examples, the network registry 130 can transmit the instruction 408 without a request 410 for instruction. In some examples, the request 410 for instruction can include, e.g., at least one of an SSID or other identification information 328; a username or other account information; or other information discussed below with reference to block 1302, FIG. 13.

In some examples, the request 410 for instruction and the instruction 408 can be communicated via a protocol tunnel. For example, as noted above, many local networks 108 providing less than full network connectivity permit name lookups. In some examples, the protocol tunnel can be a nameserver protocol tunnel. For example, network registry 130 can include or be associated with a nameserver that receives requests 410 for instructions as nameserver queries and responds with instructions 408 in nameserver responses, e.g., in DNS A, AAAA, CNAME, MX, NS, TXT, or NULL-type records. In some examples, a CNAME or other request can include a message, e.g., encoded or encrypted in the name being queried or other data in in the nameserver request.

In an example, the SSID name "Mike Oldfield's Hotspot" can be expressed as the UTF-8 octet sequence "4d 69 6b 65 20 4f 6c 64 66 69 65 6c 64 e2 80 99 73 20 48 6f 74 73 70 6f 74" (each octet given in hexadecimal). This sequence can be encoded as "jvuwwzjaj5wgiztjmvwgjyuatfzsasdporzxa33u", using the base32 encoding given in Request for Comments (RFC) 4648, sec. 6. This SSID can therefore be included in a nameserver query for the name "jvuwwzjaj5wgiztjmvwgjyuatfzsasdporzxa33u.p.example.com", where, for example, "p.example.com" is a subdomain dedicated to probing traffic. Other configurations of name components, e.g., domains or subdomains, can be used. Other encodings can be used, e.g., binary, base64, base36, Crockford base32, quoted-printable, or Punycode. In some examples, an encoding is selected which is compatible with the protocol over which the data will be sent. For example, DNS hostnames can be determined that begin and end with a letter or digit and include only letters, digits, or hyphens between the first and last characters.

In some examples, base32 can be used with the alphabet "abcdefghjklmnopqrstuvwxyz0123456", with character "i" used for padding if needed. In some examples, prefixes or suffixes can be added to the encoded data, e.g., if the encoded data has an invalid character in the first or last position, respectively. For example, a base36 alphabet including letters and digits, plus "-" as a padding character, may produce strings ending with a hyphen. A suffix, e.g., "z", can be added after the hyphen to form a valid hostname for DNS.

In various examples, using "quick-turn" protocols such as DNS to transfer the request 410 for instruction and the instruction 408 can reduce server and network load compared to using "slow-turn" protocols such as RADIUS. As used herein, "quick-turn" protocols, compared to "slow-turn" protocols, have relatively short transaction durations. For example a DNS query/response transaction can involve only two UDP packets, and DNS servers can be readily operated in parallel, e.g., to serve DNS clients from servers topographically close to those clients. By contrast, a RADIUS transaction may extend over the course of several seconds, e.g., ten seconds or more, e.g., while remote servers are reached, connections are accepted, or cryptographic primitives are processed. Moreover, as discussed above, in some examples of a RADIUS proxy chain, each proxy must hold a connection open from the time a request is sent by computing device 102 until the time the response is received by the computing device 102. By contrast, a DNS-tunneled request 410 for instruction can be transferred rapidly and processed with limited resource consumption. In some examples, therefore, conditioning probing on instruction 408 can reduce server and network load by efficiently, scalably transferring information about what probes are required, and therefore restricting network- or processor-intensive probe operations to only situations in which the information to be obtained by probing is not already available.

The request module 404 can transmit the security request 310, e.g., in response to the instruction 408. The request module 404 can function, e.g., as described above with respect to the request module 302, FIG. 3.

In some examples, the telemetry module 406 can be configured to transmit, via the network interface 128, an indication 412 of at least one of the security request 310, the trigger 312, the security response 314, the result 316, the reply information 318, or the state 326 of visibility of the network access point 104. In some examples, the telemetry module 406 can transmit a subset of any of the items listed in the preceding sentence. For example, the telemetry module 406 can transmit the indication 412 to the network registry 130. The indication 412 can be an example of a telemetry message 414 conveying information about NAP 104 to the network registry 130. The network registry 130 can then use the information from indication 412 in determining when, whether, or whither to transmit the instruction 408. Transmitting telemetry messages 414, e.g., including indication 412, and use of telemetry messages 414 in determining instructions 408, permit sharing information about the state 326 of visibility of a particular NAP 104 with other computing devices 102 seeking network connectivity via the particular NAP 104. This sharing can, in turn, reduce the bandwidth consumption, server load, and mobile-device power consumption required for a computing device 102 to determine the state 326 of visibility of a NAP 104.

In some examples, network registry 130 can modify registry information 136, e.g., as described herein. Network registry 130 can then provide at least some of the modified registry information 136 to computing device(s) 102. The computing device(s) 102 can receive modified data, e.g., via pull or push notification mechanisms. The computing device(s) 102 can update respective cache(s) 124 based at least in part on the modified registry information 136. This can permit periodically updating, e.g., identification information of visitable NAPs 104, content items (discussed below), or other information useful in probing or responding to probe results. For example, network registry 130 can provide computing device(s) 104 with a list of NAPs 104 for which no probing is required, since those NAPs 104 are already known to be visitable NAPs 104. This can further reduce the bandwidth required by probing, by removing the need to probe or request probing instructions at NAPs 104 included on the list. In some examples, the network registry 130 can use a best-effort push mechanism to distribute modified registry information 136. The network registry 130 can use, e.g., an exponential backoff timer to limit the amount of bandwidth consumed by distribution of the modified registry information 136.

In some examples, components shown in FIG. 3 can be used in cooperation with components shown in FIG. 4. Examples of such components, omitted from FIG. 4 for brevity, can include at least one of cache 124, identification information 328, UI 330, or pushbutton 332.

Illustrative Processes

FIGS. 5-19 illustrate example processes for, e.g., determining a state of visitability, responding to the determined state, determining instructions, or responding to server instructions. The methods are illustrated as sets of operations shown as discrete blocks. The methods can be implemented in any suitable hardware, software, firmware, or combination thereof. For example, functions shown in FIGS. 5-19 can be implemented on or otherwise embodied in one or more computing devices 102 or network registries 130, e.g., using software running on such devices. In the context of software, the operations represent computer-executable instructions that, when executed by one or more processors, cause one or more processors to perform the recited operations. In the context of hardware, the operations represent logic functions implemented in circuitry, e.g., datapath-control and finite-state-machine sequencing functions.

The order in which the operations are described is not to be construed as a limitation, and any number of the described operations can be combined in any order or in parallel to implement each process. For clarity of explanation, reference is made to various components and data items shown in FIGS. 1-4 that can carry out or participate in the steps of the exemplary methods. It should be noted, however, that other components can be used; that is, exemplary methods shown in FIGS. 5-19 are not limited to being carried out by the identified components.

Figure 5:
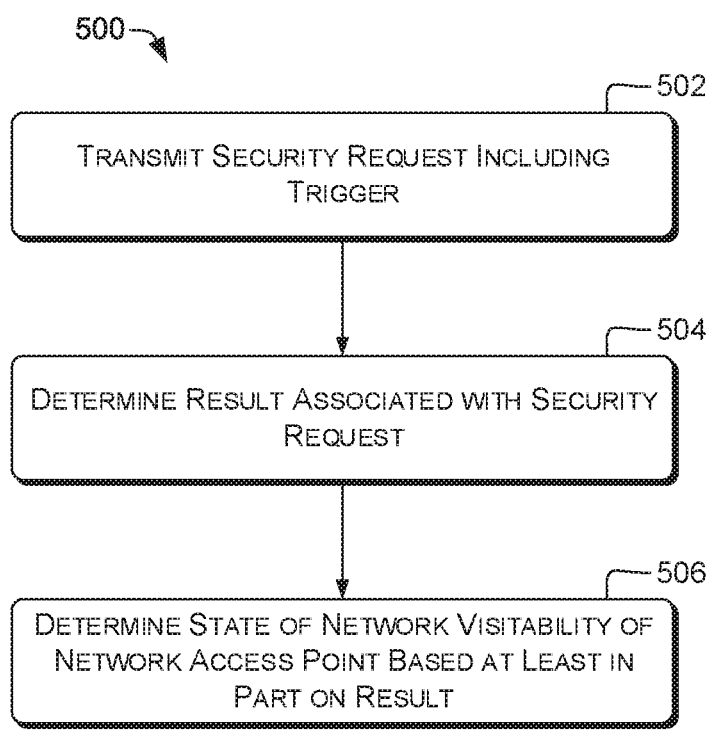
FIG. 5 is a flow diagram that illustrates example processes for determining a state of visitability of a network access point.

FIG. 5 illustrates an example process 500 for determining a state of visitability of a network access point. In some examples, process 500 can be carried out by, e.g., module(s) of visitability-determining component 122.

In some examples, at block 502, a security request 310 is transmitted via the network interface 128. The security request 310 includes data of a trigger 312. The security request 310 can be transmitted to a network access point 104 via the network interface 128. As discussed above, the NAP 104 may or may not be the intended final destination of the security request 310. Examples are discussed above, e.g., with reference to request module 302, security request 310, trigger 312, or request module 302. For example, the security request 310 can be expressed in a selected protocol, e.g., RADIUS. In some examples, security request 301 can be expressed in a first protocol, and NAP 104 or other network devices can produce and forward a security request in a second, different protocol, e.g., as discussed above with reference to login gateway 216. The trigger 312 can include at least one value that can be detected as invalid at the final destination of the security request 310, e.g., a request to authenticate by a method not supported by the credential-evaluation entity (responder 112).

In some examples, the trigger 312 can include at least one credential. For example, the trigger 312 can include a predetermined username, e.g., "probe", associated with probing operations as described herein. In some examples, the trigger 312 can include at least one of a username or a password.

In some examples, the trigger 312 can include a routing chain. In an illustrative topology, the issuing entity is named "india", the visited entity is named "victor", and an intervening proxy is named "papa". In some examples, the trigger 312 can include a username or other routing-chain designator such as "probe@india@papa@victor" or "papa/ india/probe@victor". A responder 210 or proxy 114 receiving such a trigger 312 can process suffixes, e.g., of the form "@name", from the outside in, then process prefixes, e.g., of the form "name/", from the outside in, or can process prefixes and then process suffixes. Either example above would result in the visited entity routing the security request 310 to the proxy, which would route the security request 310 to the issuing entity, which would determine, based on the username component "probe", that the request was a security request 310, and process the request accordingly. In some examples, trigger 312 can include a routing chain from a well-known server or entity to the issuing entity, and the visited entity can determine routing information from the NAP 104 to the well-known server or entity. For example, if computing device 102 is configured with information that proxy "papa" is well-known, the trigger 312 can include the username "papa/india/probe" (or "probe@india@papa"), and the visited entity can determine how to route the request to proxy "papa" (for example, directly, or via an intervening proxy "india"). In some examples, routing-chain indications as described in this paragraph can additionally or alternatively be used with respect to actual user credentials accepted by the host system. For example, user "mike" might provide a username of "papa/india/mike" in a connection request such as those described below with reference to FIG. 19.

In some examples, the security request 310 or the trigger 312 can include a cryptographic nonce. Example cryptographic nonces can include timestamps, sequence numbers, random numbers, Universally Unique Identifiers (UUIDs), or other values permitting different security requests 310 to be distinguished from each other. In some examples, a single piece of data can serve as both the trigger 312 and a cryptographic nonce. Examples of such data can include specially-formatted cryptographic nonces. For example, an all-numeric password in a security request 310 can serve as both the trigger 312 identifying the security request 310 as a security request and the cryptographic nonce identifying that specific security request 310.

In some examples, at block 504, a result 316 associated with the security request 310 can be determined. Examples are discussed above, e.g., with reference to result module 304, security response 314, result 316, or reply information 318, FIG. 3. Although omitted from FIG. 4 for brevity, in some examples, security response 314 can include cryptographic signature 324. Some examples of determining result 316 are discussed below with reference to FIGS. 6A-6B. In some examples, block 504 can include one or more blocks of processes 600, FIG. 6A-6B.

In some examples, at block 506, a state 326 of visitability of the network access point 104 is determined based at least in part on the result 316. Examples are discussed above, e.g., with reference to state module 306 or state 326, FIG. 3.

Figure 6A:
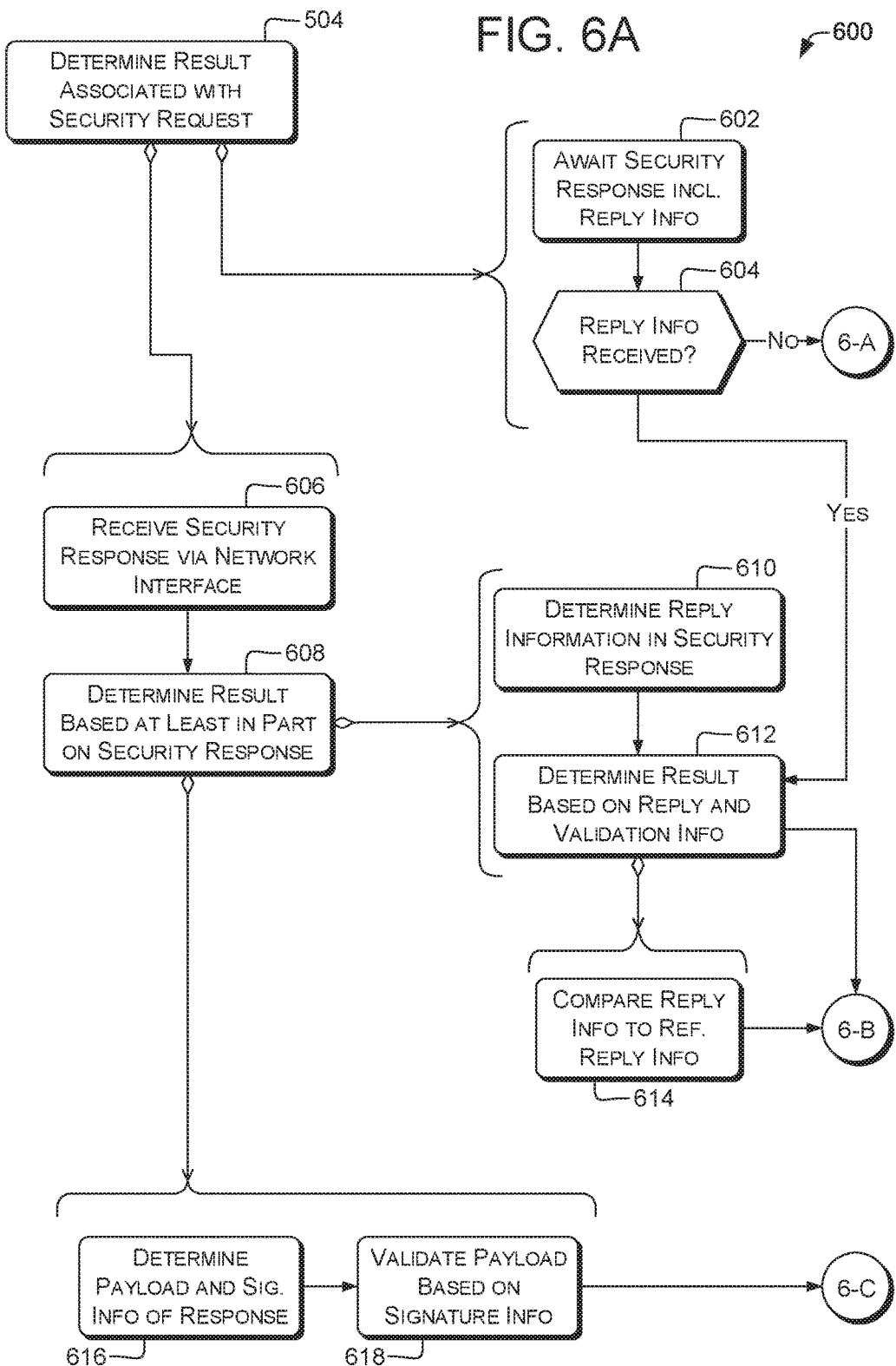
FIG. 6A is a flow diagram that illustrates example processes for determining a result associated with a security request.
Figure 6B:
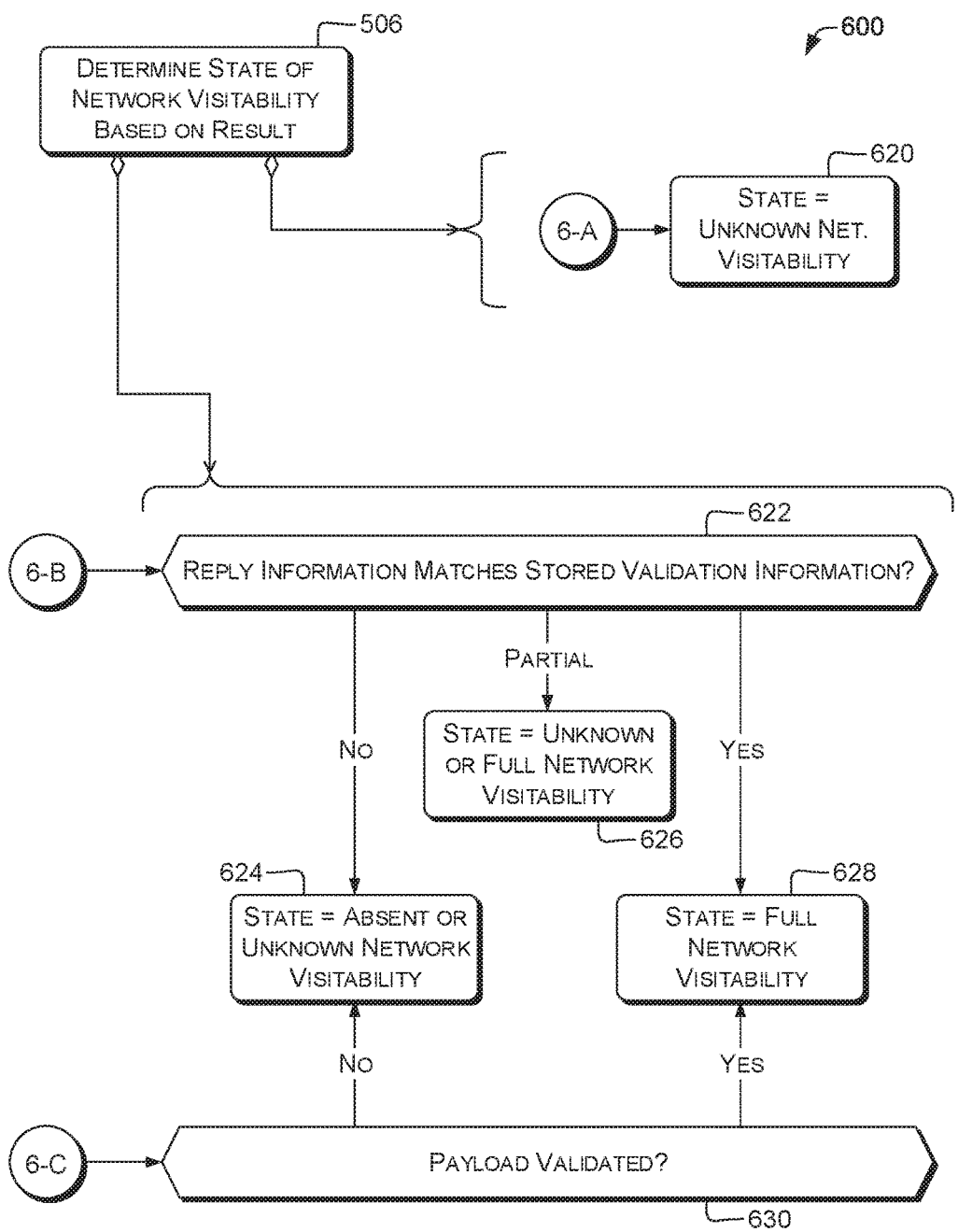
FIG. 6B is a flow diagram that illustrates example processes for determining a state of visitability based on a result determined, e.g., as in FIG. 6A.

FIGS. 6A and 6B illustrate example processes 600 for determining result(s) 316 or state(s) 326. FIG. 6A illustrates portions of processes 600 for determining a result 316 associated with a security request 310. FIG. 6B illustrates portions of processes 600 for determining a state 326 of visitability of a network access point 104 based at least in part on the result 316, e.g., the result 316 determined as shown in FIG. 6A. Operations of processes 600 can be carried out by, e.g., result module 304 or other module(s) of visitability-determining component 122. In some examples, block 504 or block 506 (or a block combining functions of blocks 504 and 506) can include one or more blocks of processes 600. In some examples, block 504 can include at least one of blocks 602-618. In some examples, block 504 can include at least one of blocks 602-630.

Referring to FIG. 6A, in some examples, at block 602, receipt via the network interface 128 of a security response 314 can be awaited, e.g., for a selected length of time after transmission of the security request 310. Block 602 can include, e.g., awaiting a security response 314 including reply information 318. Block 602 can be used, e.g., in configurations in which it is not known whether a security response 314 will be received.

Figure 8:
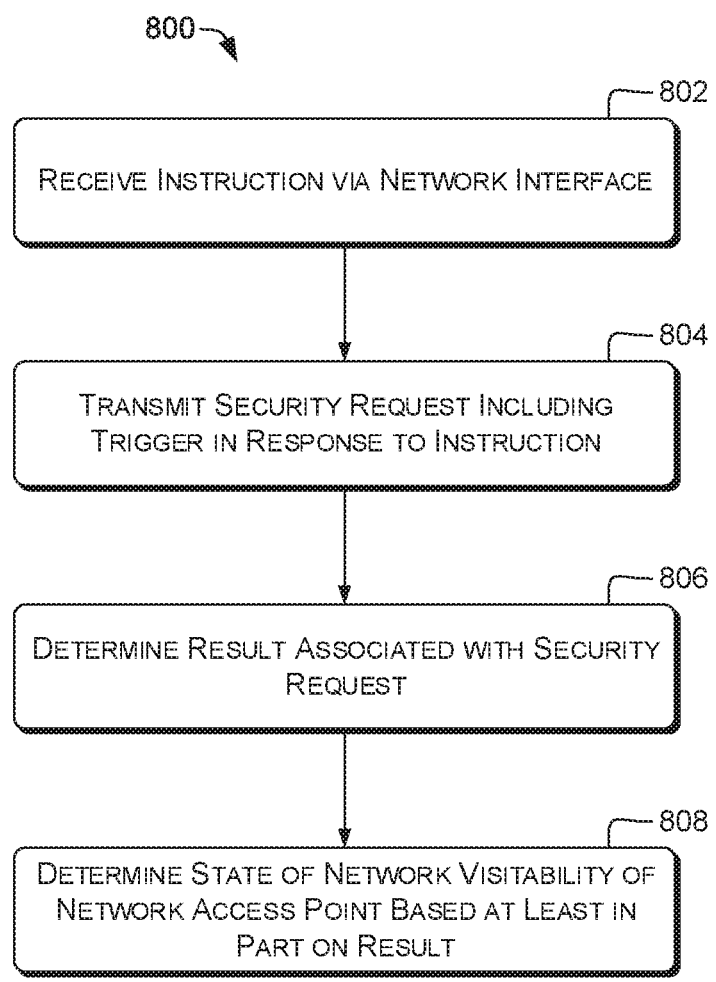
FIG. 8 is a flow diagram that illustrates an example process for determining a state of visitability of a network access point.

In some examples, at decision block 604, it can be determined whether the reply information 318 associated with the security request 310 was received, e.g., as part of a security response 314 or via another transmission, such as an error or other code received as part of the transmitting of the security request in block 502 (or block 804, FIG. 8). The result 316 can be determined indicating the result of the determination. If the reply information 318 was received, the next block can be block 612, discussed below. If not, as indicated by connector 6-A, the next block can be block 620, FIG. 6B.

In some examples, at block 606, a security response 314 can be received, e.g., via the network interface 128. Examples are discussed above, e.g., with reference to responder 210(1) or security response 314. Block 606 can be included in or combined with block 602, in some examples, though this is not required. In some examples, e.g., in which a security response 314 is required before performing further operations of processes 600, block 606 can be performed and block 602 can remain unperformed.

In some examples, at block 608, the result 316 can be determined based at least in part on the security response 314. Examples are discussed above, e.g., with reference to result module 304. In some examples, the trigger 312 can include at least one credential, e.g., a username or certificate. For example, the credential can be a credential of a system account or other account dedicated or intended for probing. Block 608 can include checking for a specific response, e.g., a success response associated with a valid probing credential. Other examples of block 608 are discussed below. In some examples, block 608 can include blocks 610 or 612.

In some examples, at block 610, reply information 318 in the security response 314 can be determined. In some examples, the reply information 318 can include, e.g., a RADIUS Reply-Message or other text provided by a responder 210 such as an authentication server or backend. Examples are discussed above, e.g., with reference to result module 304, FIG. 3 or 4.

In some examples, at block 612, the result can be determined based at least in part on the reply information 318 and stored validation information 320. The validation information 320 can include, e.g., an expected reply, a shared secret, or an extract from the security request 310 such as a username. Examples are discussed above, e.g., with reference to result module 304, FIG. 3 or 4. In some examples, block 612 can include at least one of blocks 614-628. In some examples, as indicated by connector 6-B, block 612 can include or be followed by decision block 622, FIG. 6B.

In some examples, at block 614, the reply information 318 can be compared to reference reply information 322 in the stored validation information 320 to provide the result 316. The result 316 can indicate whether the reply information 318 matches or otherwise corresponds to the reference reply information 322. Examples are discussed above, e.g., with reference to FIG. 3. In some examples, as indicated by connector 6-B, block 614 can include or be followed by decision block 622, FIG. 6B.

Some examples use cryptographic techniques to determine result 316 based at least in part on security response 314. In some examples, at block 616, a payload and a cryptographic-signature 324 ("signature" for brevity) of the security response 314 can be determined. For example, the payload and the cryptographic signature 324 can be extracted from the security response 314. In some examples, the cryptographic signature 324 can be extracted from the reply information 318. As used herein, the term "payload" refers to that portion (up to all) of the reply information 318 that associated with (e.g., signed by) the cryptographic signature 324. Accordingly, in any, each, or at least some of the described examples, discussion in blocks 618-630 of the "payload" can refer to the entirety of reply information 318, in examples in which the cryptographic signature 324 is included in the security response 314 separately from the reply information 318, or to at least some information in reply information 318 other than the cryptographic signature 324, in examples in which the cryptographic signature 324 is included in the reply information 318. In some examples, the reply information 318 can include the payload, a marker such as the text "-----BEGIN PGP SIGNATURE-----", and the cryptographic signature 324, e.g., in that order. In some examples, at least one of the security response 314 or the reply information 318 can include a multipart message, e.g., a Multipurpose Internet Mail Extension (MIME) "multipart/mixed", "multipart/signed", or "multipart/encrypted" message, including the payload and the cryptographic signature 324. In some examples, the payload and the cryptographic signature 324 can be packed, e.g., in a predetermined binary format, and transmitted.

In some examples, at block 618, the payload (e.g., part or all of the reply information 318) can be cryptographically validated based at least in part on the cryptographic signature 324 and a stored key, e.g., stored in memory 120. In some examples, as indicated by connector 6-C, block 618 can include or be followed by decision block 622, FIG. 6B.

In some examples, the cryptographic signature 324 can include a hash or other representation of the reply information 318, encrypted with a private key, and the stored key can include a public key associated with the private key. The hash can include, e.g., a SHA-256 hash. The public key and the private key can be associated, e.g., with a roaming consortium or with a particular issuing operator. In some examples, the cryptographic signature 324 can include a hash or other representation of both the reply information 318 and a private key or other shared secret, and the stored key can include a copy of the private key or other shared secret. Cryptographic signatures 324 can be produced and processed, e.g., using the Rivest-Shamir-Adleman (RSA) cryptosystem, e.g., using 2048-bit keys. In some examples, at least one of the public key or the shared secret can be stored in the cache 124. In some examples, to validate, the cryptographic signature 324 can be decrypted using a stored public key to provide a signature hash, and a hash of reply information 318 can be computed. Further examples of cryptographic signatures and validation are discussed below with reference to FIG. 13. Cryptographic techniques described with reference to request 410 or instruction 408, FIG. 4, 8, 9, or 13, can additionally or alternatively be used with respect to at least one of security request 310, security response 314, or telemetry message 414, in some examples.

Referring to FIG. 6B, connector 6-A (from decision block 604), in some examples, at block 620, it can be determined that the state 326 of visitability is a state of unknown visitability. Since a security response 314 was not received (decision block 604, FIG. 6A), the computing device 102 or other device carrying out block 504 (or block 806, FIG. 8) can not reliably determine, in some examples, whether or not the NAP 104 is a visitable NAP. A state 326 of unknown visitability may, but does not necessarily, imply that visitability or network connectivity is absent. Failure to receive the security response 314 may indicate that the security request 310 did not reach its intended final destination or another responder 112 configured to respond to the security request 310, e.g., due to link failure; that a responder 112 failed to properly generate a security response 314, e.g., due to system failure or software bugs; or that the security response 314 did not reach the computing device 102, e.g., due to link failure. In other examples, block 620 can include determining that the state 326 of visitability is a state of absent visitability.

As indicated at connector 6-B (from block 612 or 614), in some examples, at decision block 622, it can be determined, e.g., based on the result 316, whether the reply information 318 matches the stored validation information 320, e.g., the reference reply information 322 or other information in the stored validation information 320. If not, the next block can be block 624. If so, the next block can be block 628. In some examples, decision block 622 can include determining whether the reply information 318 partially matches the stored validation information 320, e.g., the reference reply information 322 or other information in the stored validation information 320. If so, the next block can be block 626.

In some examples, partial matching can be determined in response to, e.g., the reply information 318 and the stored validation information 320 including a common substring having at least a predetermined length (e.g., 20 characters or bytes). Partial matching can additionally or alternatively be determined in response to the reply information 318 matching the reference reply information 322 but a cryptographic signature failing to validate, e.g., as discussed below with reference to blocks 616-630. In some examples, a processor can determine that the reply information partially matches the stored validation information in response to at least one of: (1) a match between a first portion of the reply information and a second portion of the stored validation information; or (2) both of: (2a) a match between the reply information and the stored validation information, and (2b) a failure of cryptographic signature validation of the reply information.

In some examples, the reply information 318 may be corrupted, truncated, or otherwise modified by one or more device(s), e.g., proxy 114, between responder 112 and computing device 102. For example, the eighth bit of each byte of the reply information 318 may be stripped or zeroed by network links or devices that are not eight-bit clean; the reply information 318 may be truncated to less than its full length, e.g., to 80 characters or bytes; or the reply information 318 may be wholly or partly replaced with a message determined by, e.g., the operator of NAP 104, e.g., "Invalid username or password" or "Please visit hotspot.example.com to purchase access." Testing for partial matching in decision block 622 can permit determining state 326 with increased robustness to such modifications of the reply information 318.

In some examples, at block 624, it can be determined that the state 326 of visitability is a state of absent visitability. Since a security response 314 was received, but the security response 314 did not match the stored validation information 320, the computing device 102 or other device carrying out block 504 (or block 806, FIG. 8) can infer that the NAP 104 is not a visitable NAP, i.e., that visitability is absent. A state 326 of absent visitability may, but does not necessarily, imply that network connectivity is absent. Alternatively, a state 326 of absent visitability may, but does not necessarily, imply that network connectivity can be obtained, e.g., by presenting credentials or payment information, or by other ways described herein with reference to, e.g., captive-portal or walled-garden configurations.

In some examples, block 624 can include determining that the state of visitability is a state of unknown visitability, or a state of either absent or unknown visitability. This determination can be made, e.g., in response to determining at decision block 622 that the reply information 318 partially matches the stored validation information 320, as noted above with respect to decision block 622. The determination of whether non-matching reply information 318 indicates a state of absent visitability, a state of unknown visitability, or a state of absent or unknown visitability (e.g., a state that may be absent visitability but may not be) may be made at block 624 based at least in part on policy information, e.g., stored in memory 120. For example, the policy information can indicate that non-matching reply information 318 indicates a state of absent visitability. Alternatively, the policy information can indicate that non-matching reply information 318 indicates a state of unknown visitability.

In some examples, at block 626, it can be determined that that the state 326 of visitability is a state of unknown visitability, a state of unknown or full visitability, or a state of full visitability. The determination of whether partially-matching reply information 318 indicates a state of unknown visitability, a state of full visitability, or a state of unknown or full visitability (e.g., a state that may be full visitability but may not be) may be made at block 624 based at least in part on policy information, e.g., stored in memory 120. For example, the policy information can indicate that, in response to the reply information 318 matching the reference reply information 322 but a cryptographic signature failing to validate, the state 326 is a state 326 of full network connectivity. In some examples, block 626, or other blocks determining that the state 326 is a state 326 of unknown network connectivity, can include at least one of disregarding the probing results or reporting telemetry information, e.g., as described herein with reference to at least FIG. 7, 14, or 19.

In some examples, blocks 624 and 626 can include making the determinations of the state 326 of visitability listed in respective columns of Table 1. Each row of Table 1 represents examples independent of the other rows of Table 1.

TABLE 1

| Block 624 | Block 626 |
|---|---|
| Unknown | Unknown |
| Absent | Unknown |
| Unknown | Full |
| Absent | Full |

In some examples, at block 628, it can be determined that the state 326 of visitability is a state of full visitability. Since a security response 314 was received and matched the stored validation information 320, the computing device 102 or other device carrying out block 504 (or block 806) can infer that the NAP 104 is a visitable NAP, i.e., that full visitability is available. A state 326 of full visitability may, but does not necessarily, imply that network connectivity is present. Network connectivity may be interrupted, e.g., due to transient failures or other factors beyond the control of a hotspot operator.

As indicated at connector 6-C (from block 618), in some examples, at decision block 630, it can be determined whether the cryptographic validation in block 618 was successful. If not, the next block can be block 624. If so, the next block can be block 628. For example, if the signature hash matches the computed hash of the reply information, it can be determined that the cryptographic validation in block 618 was successful. Accordingly, in some examples, if the cryptographic validation in block 618 succeeds, it can be determined that the state of visitability is a state of full visitability (block 628). Moreover, in some examples, if the payload cannot be cryptographically validated based at least in part on the cryptographic signature 324 and the stored key, it can be determined that the state of visitability is a state of absent visitability, a state of unknown visitability, or a state of absent or unknown visitability (block 624).

Figure 7:
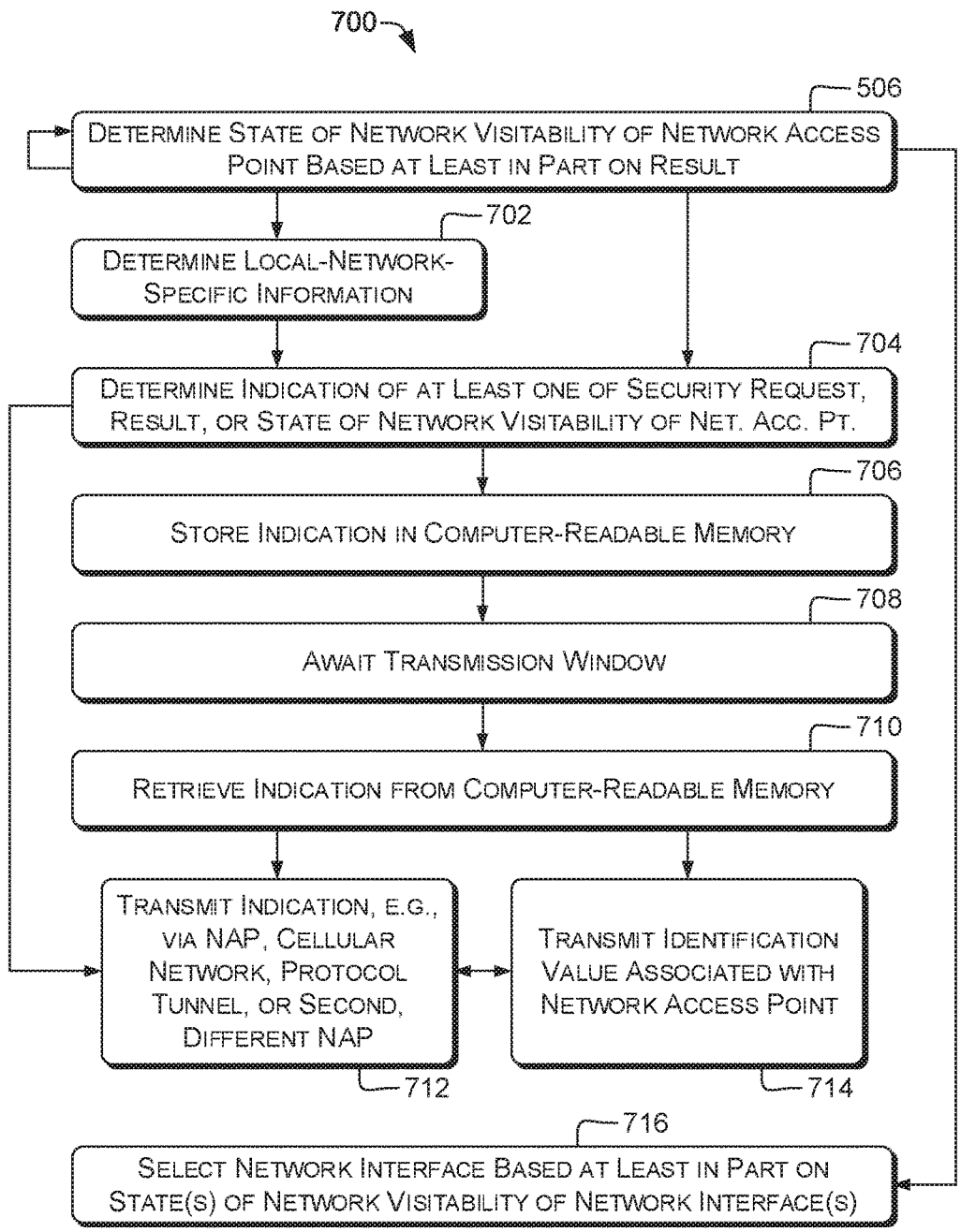
FIG. 7 is a flow diagram that illustrates example processes for providing telemetry information associated with a network access point.

FIG. 7 illustrates an example process 700 for reporting a state 326 of visitability of a NAP 104. Operations of process 700 can be carried out, e.g., by telemetry module 406 or other module(s) of visitability-determining component 122. Block 506 can be followed by at least one of blocks 702-712, e.g., block 702 or block 704. In some examples, at least some of blocks 702-714 can be carried out other than in response to a result 316 (e.g., determined based on a security response 314). For example, at least some of blocks 702-714 can be carried out on a regular schedule, or upon entering the network-service range of a NAP 104. As indicated by the arrow loop at block 506, block 506 can be performed one or more times to determine respective states of network visitability of one or more respective network interfaces.

In some examples, at block 702, local-network-specific information (LNSI) associated with the network access point 104 can be determined. LNSI can include information useful for determining whether a computing device 102 is receiving service from a particular NAP 104. In some examples, block 702 can include operate the network interface 128 to determine a characteristic of NAP 104, and then determine the LNSI based at least in part on the characteristic.

For example, the network interface 128 can be operated to at least transmit data, receive data, sniff data, measure times between packets or frames, measure bandwidth used, test bandwidth available (e.g., by communication with a test server such as those operated in connection with SPEEDTEST.NET), or report link characteristics such as link speed (e.g., 10 Mbps vs. 100 Mbps Ethernet). Block 702 can include determining the characteristic including, or based at least in part on, data provided by any, or any combination, of the listed operations. For example, the LNSI can include a wireless network identifier such as an SSID of the NAP 104. In some examples, block 702 can include receiving the wireless network identifier via a wireless network interface 128.

In some examples, e.g., for a WIFI network, the LNSI can include or indicate the SSID of the NAP 104. In other examples, e.g., for an Ethernet network, the LNSI can include the Ethernet media access control (MAC) address of, e.g., a default gateway (GW) or dynamic host configuration protocol (DHCP) server of or associated with NAP 104. In some examples, the LNSI can include an IP or other network address of a default GW, WAP 202, NAP 104, DHCP server, or other configuration server. In some examples, the LNSI can indicate reachability of a particular responder 112, nameserver 208, or other destination.

In some examples, at block 704, an indication 412 (or at least one indication 412) can be determined of at least one of the security request 310, the result 316, or the state 326 of visitability of the network access point. Other examples of indication(s) 412 or other telemetry message(s) 414 or data thereof are discussed above with reference to FIG. 4. For example, indication 412 can include text or an enumeration value representing the state 326 in the form of, e.g., strings "absent," "present," or "unknown," or respective enumeration values 0, 1, and 2. In some example, indication 412 can include an indication of at least one of the security request 310, the security response 314, or the result 316. In some examples, the indication 412 can include an indication of at least one of the security request 310, the security response 314 (if any), e.g., received via the network interface 128, the result 316, an identification value associated with the network access point 104 (e.g., an SSID, BSSID, or other types of NAP identification described herein); or LNSI associated with the NAP 104, e.g., as discussed above with reference to block 702. Block 704 can be followed by, e.g., block 706 or block 712.

In some examples, block 704 can further include determining the indication 412 including an indication of an authentication state, response code, or response message, e.g., received or determined during the probing process (e.g., blocks 502-506). In some examples, the indication 412 can include or indicate at least a portion of the RADIUS Reply-Message (type 18), State (type 24), or Class (type 25) attributes. In some examples, the indication 412 can include data indicating whether process 500 has been performed, or data indicating whether is being performed concurrently with process 700. Such data can include, e.g., a WISPR authentication state value such as DISCOVERING_WISPR (3), AUTHENTICATING (8), AUTHENTICATION_SUCCESS (10), or AUTHENTICATION_FAILURE (11). In some examples, the indication 412 can include or indicate at least a response code or at least a portion of a response message, e.g., a RADIUS or WISPR response code or response message. Example WISPR response codes can include, e.g., ACCESS_ACCEPT (50), ACCESS_REJECT (100), or AUTH_PENDING (201).

In some examples, at block 706, the indication can be stored in a computer-readable memory. The computer-readable memory can include, e.g., memory 120 or cache 124. Block 706 can be performed, e.g., in response to a lack of network connectivity to network registry 130. Using block 706 can permit store-and-forward reporting of indication 412.

In some examples, at block 708, a transmission window can be awaited. The transmission window can define a time period during which indication 412 can be transmitted. In some examples, e.g., in which network connectivity is not available during block 706, block 708 can include awaiting a change in network connectivity. For example, block 708 can include periodically pinging network registry 130 until a success response is received. Block 708 can be performed, e.g., by a background task or service. The transmission window can include a period of time during which network connectivity is available.

In some examples, block 708 can additionally or alternatively include awaiting expiration of a holdoff period. For example, even if network connectivity is available at the time the indication is determined (block 704) or stored (block 706), the computing device 102 can be programmed, e.g., with a holdoff period during which indications are not transmitted. This can reduce bandwidth consumed by reporting of probing results. For example, computing device 102 can be configured to transmit an indication or other telemetry message 414 at most once every five minutes (or other interval), and the transmission window can include a time period, of a predetermined length, that recurs once every five minutes.

In some examples, at block 710, during a transmission window (when the transmission window is open), e.g., subsequent to a change of network connectivity (in some examples, additionally or alternatively in response to the change of network connectivity) or after expiration of a holdoff period, the indication 412 can be retrieved from the computer-readable memory, e.g., for transmission via the network interface 128. For example, in response to establishment of network connectivity to network registry 130, operations of block 710 can be carried out.

In some examples, at block 712, the indication 412 can be transmitted, e.g., via the network interface 128. The indication 412 can be as provided directly by block 704, or as retrieved by block 710. In some examples, the indication 412 can be transmitted via the NAP 104, e.g. when NAP 104 provides a full state of network connectivity, or when a holdoff period has expired. In some examples, block 712 can include transmitting the indication 412 via at least one of a cellular network, a nameserver protocol tunnel such as a domain name system (DNS) tunnel, another protocol tunnel, or a second network access point 104 different from the network access point 104 with which the indication 412 is associated. Some examples can include transmitting the indication 412 other than via the associated NAP 104 to permit, e.g., promptly reporting information about a NAP 104 having a less than full state 326 of visitability. In some examples, the transmitted indication 412 can be included in a telemetry message 414, as discussed above.

In some examples using a telemetry identifier associated with the security request 310, e.g., as discussed above with reference to block 804, block 712 can include transmitting the indication 412 including or associated with the telemetry identifier. This can permit associating the security request 310 with the result 316 or other information indicated in the indication 412. Examples are discussed below with reference to FIG. 16.

In some examples, at block 714, an identification value associated with the network access point 104 can be transmitted, e.g., via the network interface 128. The identification value can be transmitted accompanying or otherwise associated with the indication 412. The identification value can include, e.g., an SSID, BSSID, HESSID, or other identifier of the NAP 104. Other examples of identification values are discussed above with reference to block 702 and LNSI. In some examples, blocks 712 and 714 can be combined in a single block that performs the functions of both.

In some examples, at block 716, a network interface, e.g., of multiple network interfaces of a terminal, can be selected to carry network traffic based at least in part on one or more determined state(s) of visitability of respective network interface(s). For example, block 716 can be performed after performing block 506 multiple times. In some examples, the multiple network interfaces can include at least two of WIFI, cellular, and Ethernet network interfaces. In some examples, block 716 can include selecting a network interface having a state of full network visitability. In some examples, block 716 can include selecting a network interface having a state of partial network visitability if no network interface has a state of full network visitability. In some examples, block 716 can include selecting one of multiple network interfaces having states of full network visitability (or of partial network visitability, e.g., if no network interface has a state of full network visitability) at random, or based on a priority order of the network interfaces (e.g., prioritizing WIFI over cellular or vice versa). The priority order can be determined, e.g., based on user preference information.

FIG. 8 illustrates an example process 800 for determining a state of visitability of a network access point. Operations of process 800 can be carried out, e.g., by coordination module 402, request module 404, result module 304, state module 306, or other module(s) of visitability-determining component 122.

In some examples, at block 802, an instruction 408 is received via a network interface 128. Examples are discussed above, e.g., with reference to coordination module 402 or instruction 408. Some examples of coordination, e.g., between a computing device 102 carrying out processes 800 and a network registry 130, are discussed below with reference to at least FIGS. 9 and 10. The instruction 408 can include, e.g., a probe instruction 408 or a no-probe instruction 408, as described above. Further examples of instructions 408 are discussed below with reference to block 1304.

In some examples, at block 804, in response to the instruction 408, e.g., in response to a probe instruction 408, a security request 310 is transmitted via the network interface 128. The security request 310 includes data of a trigger 312. Examples are discussed above, e.g., with reference to request module 302, security request 310, trigger 312, request module 302, block 502, or request module 404. Block 804 can include performing at least functions described above with reference to block 502.

In some examples, block 804 can include transmitting the security request 310 including a telemetry identifier. The telemetry identifier can include, e.g., a random number, UUID, serial number, or other text, numeric, or other-format data permitting distinguishing the security request 310 from other security requests. Uses of the telemetry identifier are discussed below with reference to block 712. In some examples, the telemetry identifier can be included, e.g., in a password or challenge-response field of the security request 310 (e.g., a RADIUS password field). For example, the security request 310 can include a password field including the telemetry identifier.

In some examples, at block 806, a result 316 associated with the security request 310 can be determined. Examples are discussed above, e.g., with reference to result module 304, security response 314, result 316, reply information 318, FIG. 3 or 4, or block 504 (which block 806 can represent). Some examples of determining result 316 are discussed herein with reference to FIGS. 6A-6B. In some examples, block 806 can include one or more blocks of processes 600. In some examples, block 806 can include at least one of blocks 606-628. In some examples, block 806 can include at least one of blocks 602-620. Block 806 can include performing at least functions described above with reference to block 504.

In some examples, at block 808, a state 326 of visitability of the network access point 104 is determined based at least in part on the result 316. Examples are discussed above, e.g., with reference to state module 306 or state 326, FIG. 3 or 4, or block 506 (which block 808 can represent). Block 808 can include performing at least functions described above with reference to block 506. Block 808 can be followed by at least one of blocks 702-712, e.g., block 702 or block 704, FIG. 7.

Figure 9:
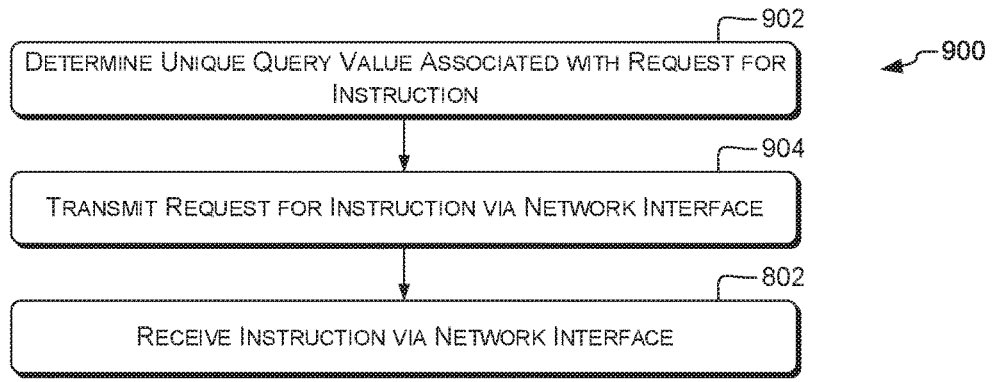
FIG. 9 is a flow diagram that illustrates example processes for acquiring a probing instruction.

FIG. 9 illustrates an example process 900 for coordinating probing. Operations of process 900 can be carried out, e.g., by coordination module 402 or other module(s) of visitability-determining component 122 of computing device 102. In some examples, block 802 can be preceded by at least one of blocks 902 or 904.

In some examples, at block 902, a unique query value associated with the request 410 for instruction can be determined. For example, the unique query value can include a random string or number, a UUID, or other data associated with a particular request 410 for instruction. In some examples, the unique query value can include data of the request 410 for instruction. In some examples, the unique query value can include a unique query name, e.g., a data item encoded into the form of a hostname. The unique query value can include any of the preceding data values or types transformed, e.g., by uuencode, base36, base64, punycode, or other encoding algorithms. Examples of encoding algorithms are discussed above with reference to FIG. 4.

In some examples, at block 904, a request 410 for instruction can be transmitted via the network interface 128. The request 410 for instruction can be transmitted, e.g., prior to receiving the instruction 408. For example, the request 410 for instruction can be transmitted via a DNS tunnel. Examples are discussed above, e.g., with reference to coordination module 402. In some examples, block 904 can include transmitting the request 410 for instruction via at least one of a cellular network, a domain name system (DNS) tunnel or other protocol tunnel, or a second network access point 104 different from the network access point 104. Using networks other than NAP 104 can permit transmitting the request 410 for instruction even if network connectivity to the network registry 130 is not available. Further examples of requests 410 for instruction are discussed below with reference to block 1302.

In some examples, e.g., of DNS tunnels, block 904 can include transmitting the request 410 for instruction to (or toward, and likewise throughout this discussion) a nameserver 208. For example, block 904 can include transmitting a request for records associated with the unique query value. Examples are discussed above, e.g., with reference to FIG. 4. In some examples, block 802 can include receiving the instruction 408 from the nameserver 208. In some examples, the request 410 for instruction includes a DNS request. In some examples, the security request 310 comprises a RADIUS request.

Figure 10:
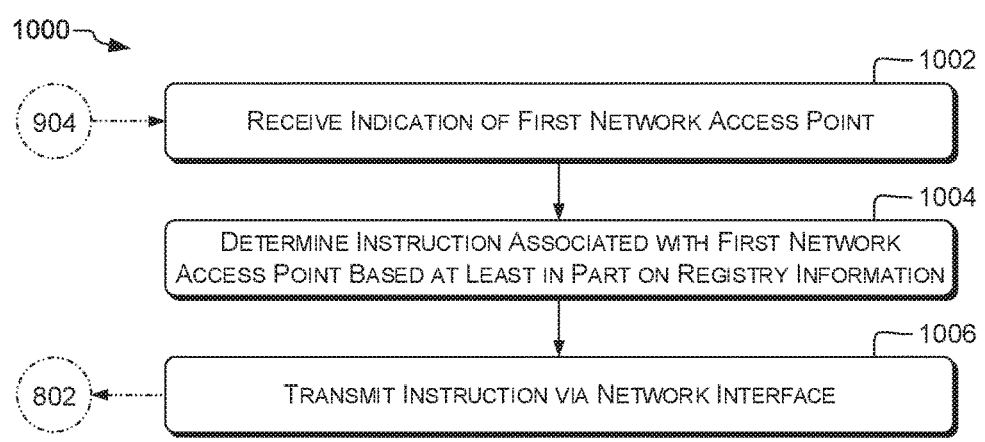
FIG. 10 is a flow diagram that illustrates example processes for determining a probing instruction.

FIG. 10 illustrates an example process 1000 for coordinating probing. In some examples, process 1000 can be carried out by network registry 130, e.g., by probing-control component 138 or module(s) thereof, or by a responder 112. Network registry 130 can include a memory, e.g., memory 134, holding registry information 136 associated with at least one network access point 104. In some examples, as shown in phantom, at least one of blocks 1002-1006 can be performed, e.g., by or at a responder 112 or network registry 130, after block 904 is performed, e.g., at a computing device 102, or before block 802 is performed, e.g., at a computing device 102.

In some examples, at block 1002, via the network interface 142, an indication can be received of a first NAP 104. The indication can be, include, or be included in a request 410 for instruction, e.g., an SSID or BSSID of the first NAP 104. Additionally or alternatively, the indication can be included in or associated with framing or other packet information of the request 410 for instruction. For example, the indication can be carried in a source or destination IP address of a DNS packet, or in the payload of such a packet. For example, the indication can include a unique query value, e.g., as discussed above with reference to block 902. In some examples, accordingly, block 1002 can include receiving a request packet. The indication can include at least one of a network address (e.g., source, relay, or destination) associated with the request packet or an access-point identifier included in the request packet.

In some examples, at block 1004, based at least in part on the registry information 136, an instruction 408 can be determined associated with the first NAP 104. The instruction 408 can be determined, e.g., based at least in part on predetermined rules applied to the registry information 136. In some examples, the first NAP 104, identified by the indication, can be represented in the registry information 136 (a "known NAP"). In some examples, the first NAP 104 can be absent from, i.e., not represented in, the registry information 136 (an "unknown NAP"). The instruction 408 can indicate, e.g., whether first NAP 104 should be probed to determine its state 326 of visitability (a probe instruction or a no-probe instruction, as discussed above with reference to FIG. 4).

In some examples, block 1004 can include determining the instruction 408 comprising at least one of (1) a test instruction directing testing of a state of visitability of the first network access point to determine whether the first network access point is communicatively connectable with a responder to evaluate credentials or (2) at least one content identifier. For example, the test instruction can include a bit field or other flag or value indicating that probing should be carried out, e.g., as discussed herein with reference to FIG. 5. In some examples, the content identifier can include a reversed domain name, URL, UUID, or other identifier of a content item. Content items are discussed below with reference to at least block 1214 or FIGS. 12-13.

In some examples, block 1004 can be carried out other than in response to an indication received at block 1002. For example, block 1004 can include periodically transmitting instructions to probe known NAPs. This can permit refreshing the registry information 136, e.g., as NAPs join and leave routing consortia over time.

In some examples, at block 1006, the instruction 408 can be transmitted, e.g., via the network interface 142. For example, the instruction 408 can be transmitted to a computing device 102, e.g., via a DNS tunnel or other communication links discussed above.

Figure 11:
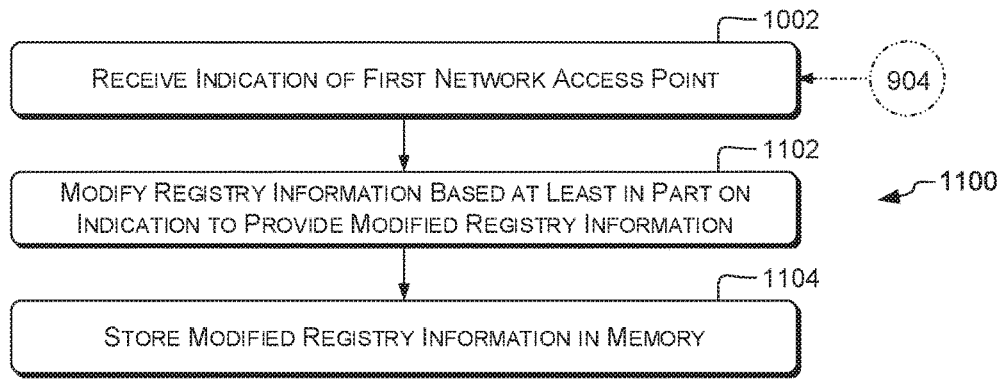
FIG. 11 is a flow diagram that illustrates example processes for updating registry information, e.g., related to a network access point.

FIG. 11 illustrates an example process 1100 for updating registry information. In some examples, e.g., in response to receiving an indication of a first NAP 104, e.g., at block 1002, at least one of blocks 1102 or 1104 can be performed. In some examples, process 1100 can be carried out by network registry 130, e.g., by probing-control component 138 or module(s) thereof, or by a responder 112, e.g., in coordination with the network registry 130. In some examples, as shown in phantom, at least one of blocks 1002, 1102, or 1104 can be performed, e.g., by or at a responder 112 or network registry 130, after block 904 is performed, e.g., at a computing device 102.

In some examples, at block 1102, the registry information 136 can be modified based at least in part on the indication of the first NAP 104 to provide modified registry information. For example, historical data in the registry information 136 can be modified to indicate that the first NAP 104 has hosted a computing device 102, e.g., at a timestamp of receipt of the indication or a timestamp indicated in association with the indication. Historical data are discussed below with reference to FIG. 12.

In some examples, at block 1104, the modified registry information can be stored in the memory, e.g., in addition to or in place of part or all of the registry information 136. For example, information stored in a nonvolatile memory 134 and associated with the first NAP 104 can be updated.

In some examples using blocks 1102 and 1104, the registry information 136 can be updated to indicate that communication is possible from computing device 102 via first NAP 104 to network registry 130, e.g., via a DNS tunnel. For example, if the first NAP 104 is not represented in the registry information 136, block 1104 can include adding to the registry information 136 record(s) indicating or associated with the first NAP 104. This can permit applying rate-limiting techniques such as those discussed below with reference to blocks 1202-1206.

Figure 12:
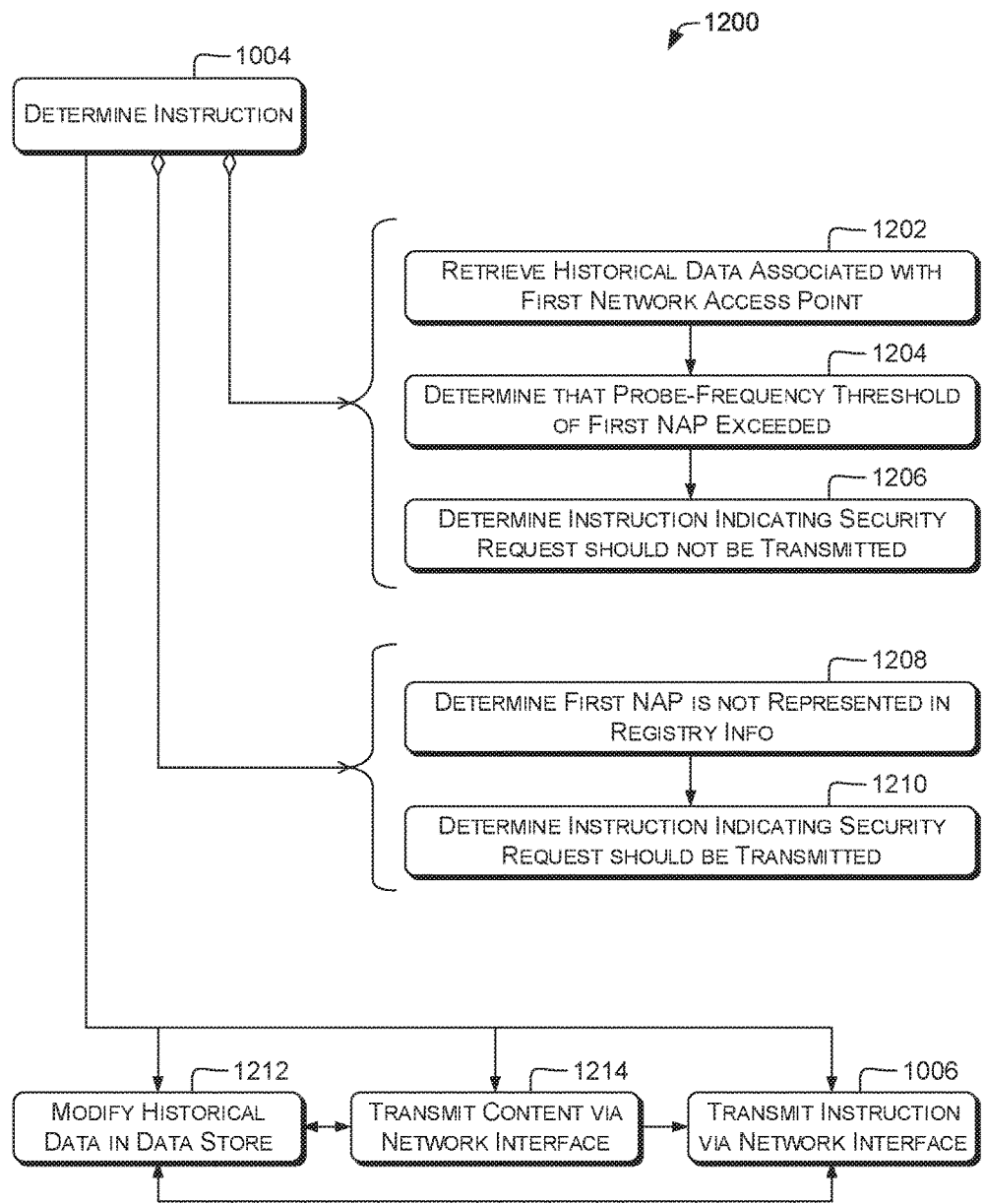
FIG. 12 is a flow diagram that illustrates example processes for determining a probing instruction or related functions.

FIG. 12 illustrates an example process 1200 for determining instruction(s) 408 or related functions. In some examples, block 1004 can include blocks 1202-1206. In some examples, block 1004 can include blocks 1208-1210. In some examples, block 1004 can be followed by block 1212, block 1214, or block 1006. In some examples, process 1200 can be carried out by network registry 130, e.g., by probing-control component 138 or module(s) thereof, or by a responder 112.

In some examples, e.g., using common configurations of RADIUS servers, the number of responders 112 can be limited in number, or the responders 112 can be limited in bandwidth. Therefore, in some examples, the rate of probing of responders 112 can be controlled to reduce load on individual responders 112 or on a set of responders 112. Various examples of rate-limiting described herein can include, e.g., limiting the number of queries per unit time of a particular responder 112, NAP 104, or network 110.

In some examples, at block 1202, historical data associated with the first network access point 104 can be retrieved from the memory 134, e.g., of network registry 130. For example, the historical data can include data representing the last probe time for a particular NAP 104, the number of probes within a predetermined recent time window (e.g., the preceding week or month) or over the lifetime of a particular network registry 130, probe packet sizes, or other timing, count, or bandwidth-related information associated with probes of the first NAP 104 by computing devices 102 associated with the network registry 130. In some examples, the historical data can include data related to one or more roaming consortia for which NAP 104 is a visitable NAP.

In some examples, at block 1204, it can be determined, based at least in part on the historical data, that a selected probe-frequency threshold associated with the first network access point 104 has been exceeded. This is referred to for brevity as "determining overload." In some examples, the probe-frequency threshold can correspond to at least one of a number of security requests per network access point per unit time or a number of security requests per network per unit time. In some examples, multiple probe-frequency thresholds can be used, and block 1204 can include determining overload in response to, e.g., one threshold being exceeded, a majority of thresholds being exceeded, or all thresholds being exceeded. Numerical thresholds having positive values are used in some examples herein, but these examples are not limiting. For example, the probe-frequency threshold can include a budget of probes remaining, so that overload is determined in response to the probe-frequency threshold decreasing to zero.

In some examples, block 1204 can include comparing limit(s) in the probe-frequency threshold with value(s) in the historical data. In some examples, if the number of probes of NAP 104 within a recent time window exceeds the probe-frequency threshold, overload can be determined. In some examples in which NAP 104 is a member of a first roaming consortium, if the number of probes of NAPs visitable by the first roaming consortium within a recent time window exceeds the probe-frequency threshold, overload can be determined. In some examples in which NAP 104 is a member of multiple roaming consortia, if the number of probes of NAPs visitable by any of those roaming consortia, or all of those roaming consortia, within a recent time window exceeds the probe-frequency threshold, overload can be determined.

In some examples, block 1204 can compute or use time averages. For example, the probe-frequency threshold can indicate a peak number of probes per NAP per unit time, or a peak number of probes per roaming consortium per unit time. Block 1204 can compute or retrieve a time average and compare the time average with a probe-frequency threshold to determine overload.

In some examples, at block 1206, e.g., in response to determining overload (block 1204), the instruction 408 can be determined as a no-probe instruction 408, i.e., an instruction 408 indicating that a security request 310 should not be transmitted with respect to the first network access point 104. For example, if a particular NAP 104 has exceeded a probe-frequency threshold, the instruction can indicate that NAP 104 should not be probed. Limiting probing of NAPs 104 based on probe-frequency thresholds can reduce bandwidth consumption and network delays at NAPs 104 or at responders 112, e.g., RADIUS servers.

Alternatively, in some examples, e.g., using transmission of instructions 408 in the absence of a specific request 410 for instruction, block 1206 can be omitted. In some of these examples, processing can terminate, or resume at block 1002, block 1208, or block 1212, in response to a determination in block 1204 that the probe-frequency threshold has been exceeded.

In some examples, as discussed above, a NAP 104 recently added to a new roaming consortium may not be advertising the OI for that consortium. Therefore, in some examples, unknown NAPs 104 can be probed to determine whether they are visitable NAPs 104. Examples are discussed above, e.g., with reference to block 1004, FIG. 10.

In some examples, at block 1208, it can be determined that the first network access point 104 is not represented in the registry information 136. That is, the first NAP 104 is an unknown NAP 104.

In some examples, at block 1210, the instruction 408 can be determined as a probe instruction 408, i.e., an instruction 408 indicating that a security request 310 should be transmitted with respect to the first network access point 104. That is, the unknown NAP 104 should be probed to determine whether it is a visitable NAP 104. This can permit updating information stored by network registry 130 over time, which can in turn reduce the bandwidth required to determine visitability. A single computing device 102, or a small number of computing devices 102, can probe the unknown NAP 104 in response to the instruction 408 determined at block 1210. The registry information 136 can then be updated, e.g., as discussed below with reference to FIG. 15 or 16. The network registry 130 can then apply rate limiting, e.g., as discussed above with reference to blocks 1202-1206, to limit probes by other computing devices 102.

In some examples, at block 1212, the historical data in the memory 134 can be modified in response to the determining the instruction (block 1004). For example, the historical data can be retrieved from the memory 134, the historical data can be modified to provide modified historical data, and the modified historical data can be stored into the memory 134. Block 1212 can include modifying the historical data, e.g., only in response to determining a probe instruction 408, or in response to determining either a probe instruction 408 or a no-probe instruction 408. The historical data can be modified, e.g., by adding new records or modifying existing records to include data of instruction 408, a time of transmission of instruction 408, a size of instruction 408, or other timing, count, or bandwidth-related information associated with instruction 408.

In some examples, at block 1214, at least one content identifier and a content item associated with the at least one content identifier can be transmitted via the network interface 142. In some examples, multiple content identifiers and respective content items can be transmitted. The at least one content identifier can be or include, e.g., the at least one content identifier included in the instruction in some examples of block 1004. For example, the content item can include a web page or portion thereof; text; rich text; images; sounds; or any other content intended to be presented to a user, e.g., via a display 2004, FIG. 20, or other user-interface device. In some examples, the content item can include at least one offer or digital coupon, or an indication of at least one amount of a real or virtual currency. Content items are discussed in more detail with reference to FIGS. 13 and 14.

In some examples, block 1214 can be followed by block 1212 or block 1006. In some examples, the at least one content identifier and the content item associated with the at least one content identifier can be transmitted (block 1214) before transmission of the instruction (block 1006). In some examples, blocks 1212, 1214, and 1006 can be performed in any relative order in which block 1214 precedes block 1006. In some examples, blocks 1212, 1214, and 1006 can be performed in any relative order.

Figure 13:
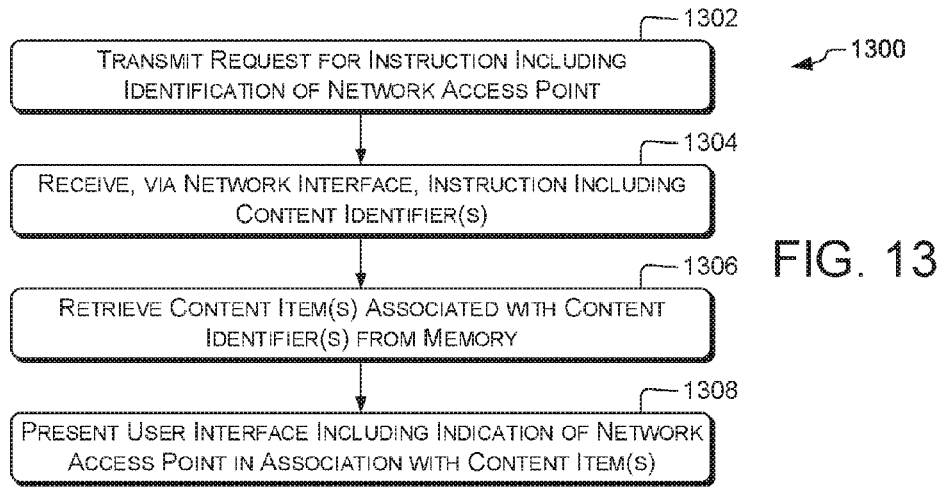
FIG. 13 is a flow diagram that illustrates example processes for presenting a user interface indicating a network access point.

FIG. 13 illustrates an example process 1300 for determining or presenting a user interface. Operations of process 1300 can be carried out, e.g., by coordination module 402, reporting module 308, or other module(s) of visitability-determining component 122 of computing device 102.

In some examples, at block 1302, a request 410 for instruction can be transmitted, e.g., via network interface 128. The request 410 can include, e.g., identification of a network access point 104 (or at least one network access point 104, and likewise throughout the discussion of FIG. 13). The identification can include, e.g., an SSID, BSSID, or other types of identification described herein. In some examples, the identification of the network access point 104 can include at least one of a Service Set Identifier (SSID), Basic SSID (BSSID), or Homogenous Extended SSID (HESSID). In some examples, the request for instruction can further include identification or authentication information of a user, e.g., a username, public key, cryptographic certificate, signature, or token, or authentication ticket. In some examples, the request 410 for instruction can include information sufficient to cryptographically assure that the request 410 for instruction was transmitted by the user named in the request 410 for instruction. In some examples, the request 410 for instruction can be encrypted, e.g., using a shared secret. In some examples, the shared secret can include a secret established, e.g., at a time of registration of the computing device 102. The secret can be, e.g., per user, per computing device 102, or both. Shared secrets can be established, e.g., via Diffie-Hellman or other key exchange protocols, or via key derivation functions such as PBKDF2. Cryptographic salt can be used in encrypting or decrypting data, or in deriving session keys, in some examples. Shared secrets, e.g., salt values or keys, can be exchanged, e.g., via a secure channel during a user- or device-registration process. AES-256 or other encryption algorithms can be used to encrypt and decrypt the request 410 for instruction. Public-key encryption can additionally or alternatively be used.

In some examples, at block 1304, an instruction 408 can be received, e.g., via the network interface 128. The instruction 408 can include, e.g., a content identifier (or at least one content identifier, and likewise throughout the document). In some examples, individual one(s) of the content identifiers can include UUID(s), reversed domain name(s), URL(s), filename(s), or other unique or otherwise distinguishable identifiers. The instruction 408 can be encrypted, e.g., as described above with reference to the request 410 for instruction.

In some examples, the request 410 for instruction can include, e.g., identification information 328 for at least one NAP 104, e.g., from which network service is available to the computing device 102 at the time of preparing the request 410 for instruction. In some examples, the request 410 for instruction can include user identification information, as discussed herein. In some examples, the instruction 408 can include at least one of a status code, a cryptographic nonce, or indication(s) of whether to probe or not probe individual one(s) of the NAP(s) 104 identified in the request 410 for information.

In some examples, at block 1306, a content item associated with the content identifier can be retrieved, e.g., from a memory 120. In some examples, the content item can be stored in cache 124. In some examples, the content item can include text, a Web page, a sound, a picture, a video, or any number of any combination of any of those. In some examples, the content item can represent an offer, a status report, a user review, an instruction, or any number of any combination of any of those.

In some examples, at block 1308, a user interface 330 can be presented. The user interface 330 can include an indication of the network access point 104 in association with the content item. For example, the content item can be presented below, behind, or next to a text label indicating the NAP 104.

In some examples, the request 410 for instruction can identify a plurality of NAP(s) 104 within range of a computing device 102, e.g., NAPs 104 from which the computing device 102 can obtain network service. The instruction 408 can indicate which of the NAPs 104 are visitable NAP(s) 104, and can indicate a respective content identifier for at least one of the visitable NAP(s) 104. The user interface 330 can include a listbox or other control showing the name(s) of the visitable NAP(s) 104, and the respective content items associated therewith. For example, at least one content item can include offers or instructions related to obtaining network connectivity from the respective visitable NAP 104.

Figure 14:
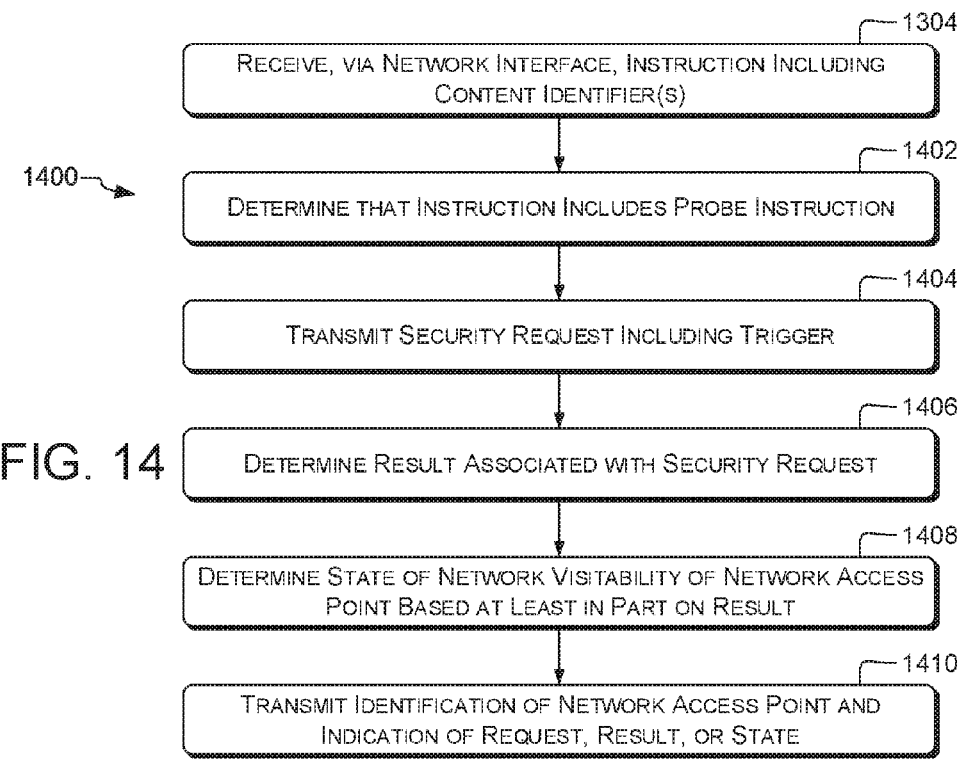
FIG. 14 is a flow diagram that illustrates example processes for determining a state of network visitability of a network access point.

FIG. 14 illustrates an example process 1400 for probing. In some examples, block 1304 can be followed by at least one of blocks 1402-1410. Operations of process 1400 can be carried out, e.g., by request module 302, reporting module 308, or other module(s) of visitability-determining component 122 of computing device 102.

In some examples, at block 1402, it can be determined that the instruction 408 includes a probe instruction. For example, a bit or other field in the instruction 408 can be tested. The instruction 408 can include other information along with the indication that the instruction 408 is a probe instruction, in some examples.

In some examples, at block 1404, a security request 310 can be transmitted, e.g., via the network interface 128. The security request 310 can be transmitted, e.g., to a network access point 104, e.g., the NAP 104 via which the instruction 408 was received, or at least one NAP 104 indicated in the request 410 for instruction. The security request 310 can include data of a trigger 312. Block 1404 can be performed, e.g., in response to the determination at block 1402.

In some examples, at block 1406, a result 316 associated with the security request 310 can be determined. Examples are discussed above, e.g., with reference to at least 3-6 B.

In some examples, at block 1408, a state 326 of visitability of the network access point 104 can be determined based at least in part on the result. Examples are discussed above, e.g., with reference to at least 3-6 B.

In some examples, at block 1410, the identification of the network access point 104 can be transmitted, e.g., via the network interface 128. An indication of at least one of the security request 310, the result 316, or the state 326 of visitability of the network access point can additionally or alternatively be transmitted with, within, or otherwise in association with the identification of the network access point 104.

Figure 15:
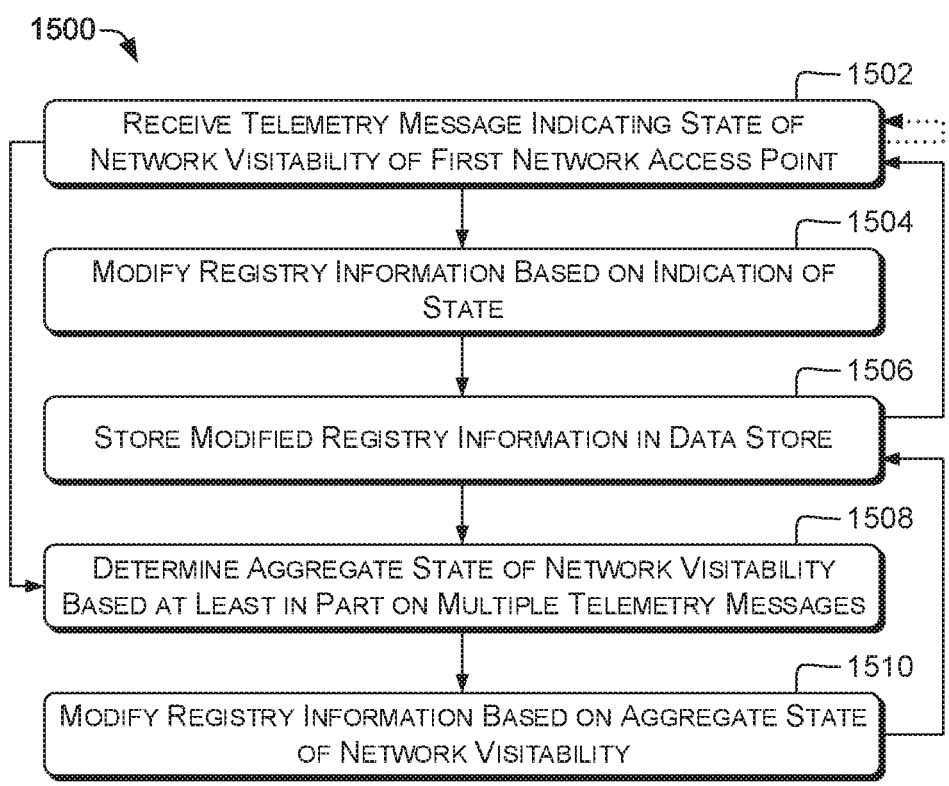
FIG. 15 is a flow diagram that illustrates example processes for processing telemetry messages.

FIG. 15 illustrates an example process 1500 for updating registry information. In some examples, process 1500 can be carried out by network registry 130, e.g., by probing-control component 138 or module(s) thereof, or by a responder 112, e.g., in coordination with the network registry 130.

In some examples, at block 1502, a telemetry message 414 associated with the first network access point 104 can be received, e.g., via the network interface 142. The telemetry message 414 can include an indication 412 of a state 326 of visitability of the first network access point 104. Examples are discussed above, e.g., with reference to FIG. 4. For example, the state 326 of visitability of the first network access point 104 can indicate whether the first network access point 104 is communicatively connectable with a responder 112 to evaluate credentials. In some examples, block 1502 can receive multiple telemetry messages 414 associated with the first network access point 104, as indicated by the dotted arrow. In some examples, block 1502 can be followed by block 1504 or block 1508.

In some examples, block 1502 can include receiving, via the network interface 142, a plurality of telemetry messages 414 associated with respective network access points 104. Each telemetry message 414 can include a respective indication 412 of a state 326 of visitability of the respective network access point 104. For example, telemetry messages 414 associated with respective NAPs 104 can be batched and processed, e.g., daily or on another regular or irregular schedule (e.g., every so many hours or telemetry messages 414). In some examples, subsequent to an update, updated cache or registry information can be provided to computing device(s) 102, e.g., daily, weekly, or on another schedule. Examples are discussed above, e.g., with reference to FIG. 4.

In some examples, at block 1504, the registry information 136 can be modified to provide modified registry information. The modification can be based at least in part on the indication 412 of the state 326 of visitability of the first network access point 104, or on the respective indications 412 of the states 326 of visitability of the respective NAPs 104. For example, the registry information 136 can be wholly or partly replaced or modified based on the indication 412. In some examples, in response to an indication that a previously-unknown NAP 104 has a state 326 of full visitability, the registry information 136 can be modified to indicate at least that the previously-unknown NAP 104 is a visitable NAP 104, or that the previously-unknown NAP 104 should not be probed again for a predetermined period of time. In some examples, the historical data in the registry information 136 can be modified, e.g., as discussed above with reference to block 1212.

In some examples, at block 1506, the modified registry information can be stored, e.g., in the memory 134. The modified registry information can replace or supplement part or all of the stored registry information 136. Block 1506 can represent block 1104, in some examples.

In some examples, block 1506 can be followed by block 1502. In this way, via the network interface 142, a plurality of telemetry messages 414 associated with the first network access point 104 can be received.

In some examples, at block 1508, an aggregate state 326 of visitability associated with the first network access point 104 can be determined based at least in part on a plurality of received telemetry messages 414, e.g., associated with the first network access point 104. The aggregate state 326 of visitability can indicate, e.g., whether the first network access point 104 is communicatively connectable with a responder 112 to evaluate credentials. In some examples, the aggregate state 326 of visitability can include a value that is a majority value or plurality value of values in the states 326 associated with the plurality of received telemetry messages 414. In an example, if 90% of messages of the plurality of received telemetry messages 414 indicate a state 326 of full visitability, and the remaining 10% of the plurality of received telemetry messages 414 indicate a state 326 of unknown network visitability, the aggregate state 326 can be determined to be full visitability (the majority).

In some examples, at block 1510, the registry information 136 can be modified based at least in part on the aggregate state 326 of visitability associated with the first network access point 104 to provide modified registry information. In some examples, block 1510 can be followed by block 1506, in which the modified registry information can be stored in the memory 134.

Figure 16:
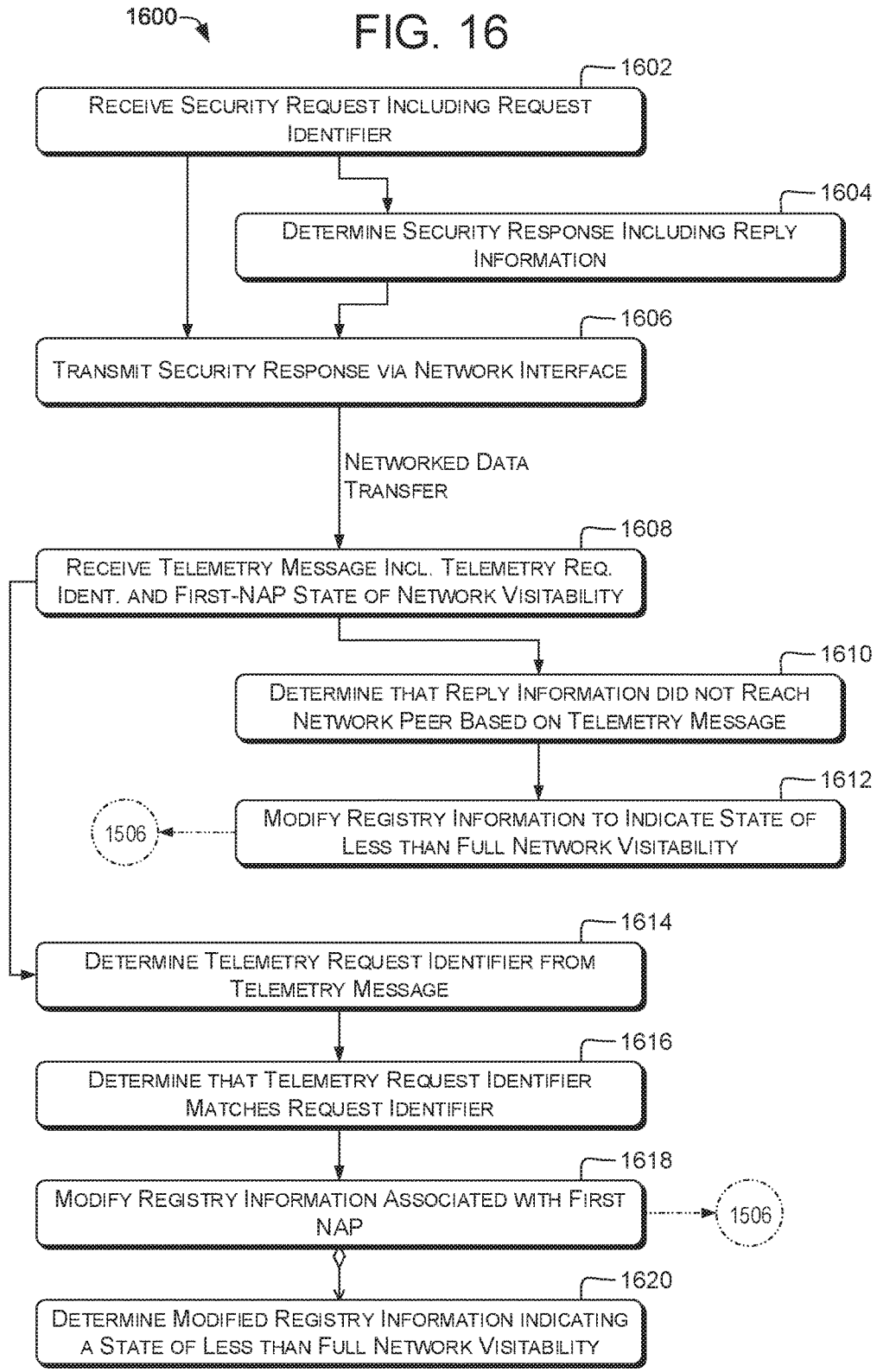
FIG. 16 is a flow diagram that illustrates example processes for processing security requests or associated telemetry messages.

FIG. 16 illustrates an example process 1600 for processing security requests 310 and telemetry messages 414. In some examples, process 1600 can be carried out by network registry 130, e.g., by probing-control component 138 or module(s) thereof, or by a responder 112, e.g., in coordination with the network registry 130.

In some examples, at block 1602, a security request 310 can be received via the network interface 142. In some examples, the security request 310 can include an EAP, RADIUS, or other request to authenticate a user. As noted above, the username of the user to be authenticated can be an reserved username (or other account identifier), a dedicated-function username, a username including a character permitted by the protocol of the security request 310 but not accepted by servers of the roaming consortium (e.g., "!"), or another trigger 312. The security request 310 can include a request identifier. The request identifier can be, include, overlap wholly or partly with, or be wholly or partly separate from the trigger 312. For example, the trigger 312 can be carried in the username field of a security request 310 and the request identifier can be carried in the password field of the security request 310. The request identifier can include, e.g., a timestamp or other cryptographic nonce, e.g., as described above with reference to FIG. 5. Block 1602 can be followed by, e.g., block 1604 or block 1606. Block 1602 can be performed, e.g., prior to receiving a telemetry message 414 (block 1608, below).

In some examples, at block 1604, the security response 314 can be determined. Block 1604 can include determining the security response 314 having selected reply information 318 included, packed, or encoded therein. Examples of security response 314 and reply information 318 are discussed above with reference to at least FIG. 3, 5, 6A, or 6B. For example, reply information 318 can include a cryptographic nonce.

In some examples, the security request 310 can include credentials, e.g., a username/password pair. Examples are discussed above, e.g., with reference to trigger 312. In some examples, block 1604 can include determining the security response 314 but not granting network connectivity or any other resource access. For example, block 1604 can include determining the security response 314 including an indication of an invalid request, a rejected login, a failed login, a gateway error, or another type of error that will cause the visited entity to not grant network connectivity in response to the security request 310. This can permit probing to determine the state 326 of visitability while maintaining baseline levels of security.

In some examples, at block 1606, a security response 314 can be transmitted, e.g., via the network interface 142. For example, the security response 314 determined at block 1604 can be transmitted. Examples are discussed above, e.g., with reference to responder 210. In some examples, the security response can include an EAP, RADIUS, or other response. For example, the security response 314 can include (1) an indication that authentication of an invalid username failed and (2) reply information 318, e.g., as discussed above.

In some examples, at block 1608, a telemetry message 414 can be received. Examples are discussed above, e.g., with reference to block 1502. In some examples, block 1606 can be followed by block 1608. In some examples, operations of at least one of blocks 1602-1606 can be performed before operations of block 1608. In this way, the security request can be received (block 1602) and the security response 314 can be transmitted (block 1606) before receiving the telemetry message 414. In some examples, block 1608 can be followed by at least one of block 1610 or block 1614.

In some examples, at block 1610, it can be determined that the telemetry message 414 indicates selected reply information 318 did not reach a selected network peer. The selected reply information 318 can be the reply information 318 determined at block 1604. For example, the telemetry message 414 can include a cryptographic nonce determined at block 1604. In some examples, the telemetry message 414 can include an indication of an unknown or absent state 326 of visitability, or a specific indication that no security response 314 was received, e.g., by computing device 102.

In some examples, at block 1612, the registry information 136 can be modified to provide modified registry information. The modified registry information can include an indication that the first network access point 104 has a state of less than full visitability, e.g., absent or partial visitability. In some examples, indicated in phantom, block 1612 can be followed by block 1506 of storing the modified registry information in a data store. In some examples, processing at blocks 1604-1612 can permit determining that, e.g., a proxy 114 conveying security requests 310 and security responses 314 is not proxying part or all of the reply information 318. For example, some RADIUS proxies may truncate or replace part or all of the reply information 318 in a security response 314. Modifying registry information associated with a first NAP 104, e.g., as in block 1612, can permit the network registry 130 to report to a computing device 102 connected via first NAP 104 that visitability is present, even if the reply information 318 fails to reach the computing device 102 (which failure, in some examples, would trigger processing described above with reference to blocks 614, 622, or 626). This can, in turn, reduce the network bandwidth consumed by computing device 102 in probing the first NAP 104.

In some examples, at block 1614, a telemetry request identifier can be retrieved from, or otherwise determined based at least in part on, the telemetry message 414. In some examples, the telemetry request identifier is included in a dedicated field of the telemetry message 414 and can be accessed in that field. For example, the telemetry message 414 can be transmitted via a protocol tunnel, e.g., a DNS tunnel as described herein, and the telemetry request identifier can be retrieved from the body of the DNS-tunneled telemetry message 414. In some examples, the telemetry request identifier is packed or otherwise encoded in the telemetry message 414, and block 1614 can include unpacking or decoding the telemetry request identifier.

In some examples, at block 1616, it can be determined that the telemetry request identifier matches the request identifier. For example, the telemetry request identifier can be or include a copy of, or a hash or other representation of, the request identifier, or can overlap with the request identifier in at least a predetermined number of bytes or characters. In some examples, a match between the request identifier and the telemetry request identifier can indicate that the indication 412 in the telemetry message 414 carrying the telemetry request identifier is associated with the security request 310 or information therein, e.g., an identifier of the first network access point 104.

In some examples, at block 1618, the registry information 136 can be modified, e.g., to provide modified registry information. The modified registry information can include an association between the first network access point 104 and a second indication of the state of visitability of the first network access point 104 different from the indication stored in the registry information 136 of the state 326 of visitability of the first network access point 104. For example, the telemetry message 414 can include more recent or more accurate information about the state of visitability of the first network access point 104 than the information in the registry information 136 about the state of visitability of the first network access point 104. The modified registry information can reflect this more recent or more accurate information, e.g., in the second indication. In some examples, indicated in phantom, block 1618 can be followed by block 1506 of storing the modified registry information in a data store. In some examples, block 1618 can include block 1620.

In some examples, the telemetry message 414 can indicate that the computing device 102 successfully authenticated to responder 112 via visitable NAP 104. The telemetry message 414 can additionally include identification information 328 of the NAP 104. Block 1618, in these examples, can include modifying the registry information 136 associated with the NAP 104 to indicate that NAP 104 has a state 326 of full visitability. These examples can permit modifying registry information 136 even when login-success logs, e.g., generated by a RADIUS server, do not include identification information 328 of the NAP 104 via which a successful login request was received.

In some examples, block 1618 can include updating security logs to indicate that the security request 310 was a probe and not a standard request for access. For example, the security request 310 can be removed from "login-failed" logs or other auditing records, or the auditing records can be updated to note that a login failure associated with the security request 310 was actually a probe request. This can permit readily distinguishing probes from failed logins, e.g., due to user error or to attack, which can in turn make information about genuine login failures more readily accessible to network administrators.

In some examples, at block 1620, the registry information can be modified based at least in part on the indication so that the second indication of the state of visitability of the first network access point indicates a state of less than full visitability. For example, in response to a failure to receive reply information 318, or a failure to authenticate to the issuing responder 112 via the first NAP 104, the modified registry information can indicate that full visitability is not present with respect to the first NAP 104.

In some examples, one or more of blocks 1604 and 1610-1620 can be used together. For example, blocks 1604, 1610, and 1612 can permit determining and storing information about the link between a computing device 102 and a responder 112, e.g., a RADIUS proxy chain. In some examples, blocks 1614-1620 can permit determining and storing information about the overall state 326 of visitability of a computing device 102. In some examples, the two types of information described in this paragraph can be combined to determine, e.g., whether a state of less than full network connectivity is due to a RADIUS proxy chain, a NAP, or other component(s) of a networking system.

In some examples, blocks 1602-1606 can be performed by a responder 112. In some examples, blocks 1608-1620 can be performed by a network registry 130. Accordingly, in some examples, at least one of blocks 1602-1606 can include transmitting relevant information (e.g., request identifier, reply information, or security response, respectively) to network registry 130 ("Networked Data Transfer"), though this is not required. In some examples, at least one of the blocks 1608-1620 can include receiving respective information, though this is not required. For example, block 1610 can include receiving the reply information 318 determined at block 1604.

Figure 17:
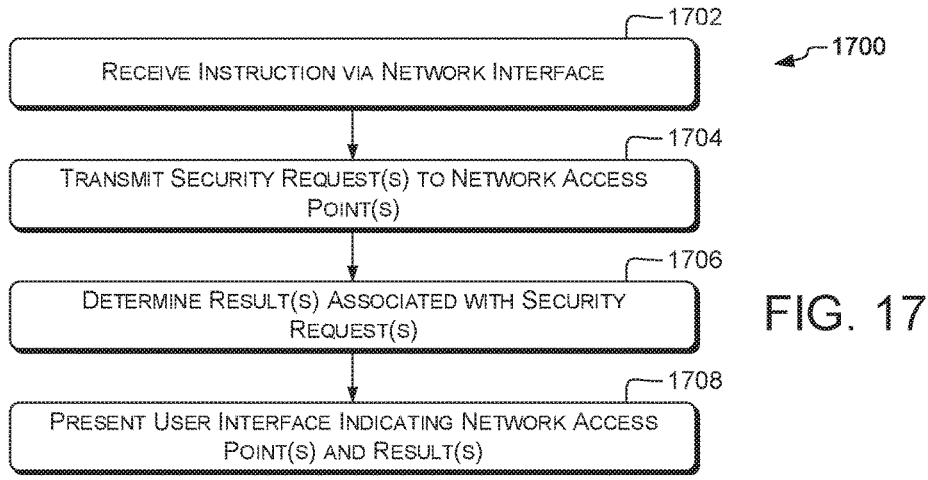
FIG. 17 is a flow diagram that illustrates example processes for determining at least one state of visitability of at least one respective network access point and presenting the determined at least one state via a user interface.

FIG. 17 illustrates an example process 1700 for probing or reporting probing results. In some examples, process 1700 can be carried out by a computing device 102. In some examples, processing can begin with block 1702 or block 1704.

In some examples, at block 1702, an instruction 408 can be received, e.g., via a network interface 128. Examples are discussed above, e.g., with reference to at least FIG. 8, 9, 13, or 14.

In some examples, at block 1704, one or more security request(s) 310 can be transmitted, e.g., via the network interface 128, to respective network access point(s) 104. Examples are discussed above, e.g., with reference to at least FIG. 3-5, 8, or 14. In some examples, block 1704 can be carried out, e.g., in response to the instruction received at block 1702. In some examples, block 1704 can be carried out, e.g., in response to detection by a computing device 102 of one or more NAP(s) 104.

In some examples, at block 1706, one or more result(s) 316 associated with respective security request(s) 310 of the one or more security request(s) 310 can be determined. Examples are discussed above, e.g., with reference to at least FIG. 3-8 or 14. For example, an individual result 316 can indicate or be associated with the state 326 of visitability of a respective one of the NAP(s) 104.

In some examples, at block 1708, a user interface can be presented, e.g., UI 330, FIG. 3. The user interface 330 can include indication(s) of one or more of the network access point(s) 104 and, e.g., associated therewith, indication(s) of respective result(s) 316 of the one or more result(s) 316. For example, the user interface 330 can show the SSID(s) of one or more NAP(s) 104 and, associated therewith, indications of the result(s) 310 (or state(s) 326 determined based at least in part on the respective result(s) 316, e.g., as in block 506). An example is shown in FIG. 3, in which the padlock icon on pushbutton 332 indicates that the respective one of the result(s) 316 indicates absent visibility. Other examples are discussed above with reference to FIG. 13.

Figure 18:
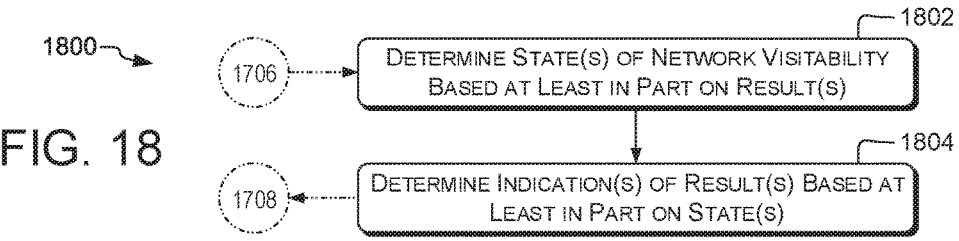
FIG. 18 is a flow diagram that illustrates example processes for determining user-interface indications.

FIG. 18 illustrates an example process 1800 for determining element(s) of a user interface 330. In some examples, as indicated in phantom, block 1706 can be followed by block 1802. In some examples, process 1800 can be carried out by a computing device 102.

In some examples, at block 1802, respective state(s) 326 of visibility of one or more of the network access point(s) 104 can be determined based at least in part on the respective result(s) 316. Examples are discussed above, e.g., with reference to at least FIG. 3-8 or 14.

In some examples, at block 1804, the indication(s) of at least some of the result(s) 316 can be determined based at least in part on the respective state(s) 326. For example, a state of absent visibility can be associated with an indication of a lock, "X", or slashed-circle icon, e.g., as discussed herein with reference to FIG. 3. In some examples, a state of full visibility can be associated with a green circle, thumbs-up, or other positive icon. In some examples, block 1804 can be followed by block 1708. This can permit presenting the determined state(s) via the user interface 330.

In some examples of techniques discussed herein with reference to FIG. 17 or 18, the user interface 330 can represent or be associated with all, or fewer than all, of the NAP(s) 104 to which security request(s) 310 were transmitted in block 1704. In some examples, each and every one of the presented indication(s) is associated with a respective result of the one or more result(s) indicating that the respective network access point 104 has a state 326 of full visibility. That is, in some examples, block 1708 can include omitting from the user interface 330 indication(s) of any NAP(s) 104 that do not have a state 326 of full visibility. This can reduce the time required for users to select and connect to NAP(s) 104, since the user can select a NAP 104 from the UI in confidence that the NAP 104 is a visitable NAP 104, in these examples. In some examples, each state of full visibility can indicate that a respective credential-evaluation entity is reachable via the respective NAP 104. The respective credential-evaluation entities can be the same for each NAP 104, or at least one NAP 104 can have reachability to a different credential-evaluation entity than at least one other NAP 104. For example, if the user has credentials associated with two different roaming consortia, the user interface 330 can present user interface 330 including NAP(s) 104 having states of full visibility with respect to either roaming consortium.

Figure 19:
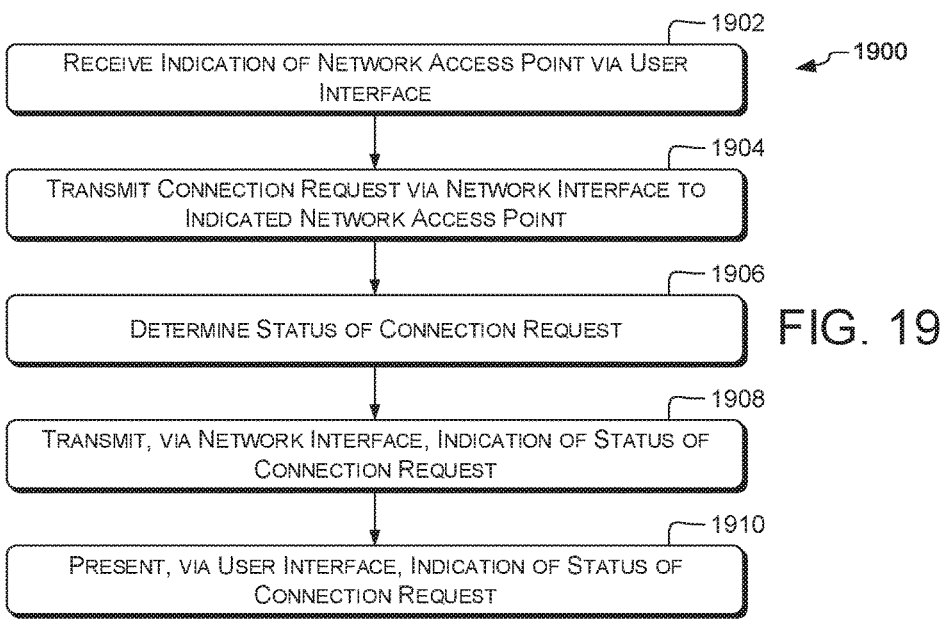
FIG. 19 is a flow diagram that illustrates example processes for acquiring network connectivity and presenting related user-interface elements.

FIG. 19 illustrates an example process 1900 for determining or reporting connection status. In some examples, block 1708 can be followed by at least one of blocks 1902-1910. In some examples, process 1900 can be carried out by a computing device 102.

In some examples, at block 1902, an indication of a first network access point 104 can be received, e.g., via the user interface 330. The first NAP 104 can be, e.g., a NAP 104 of the one or more of the network access point(s) 104 discussed above with reference to block 1704. The indication can include, e.g., an SSID, BSSID, or other forms of identification described above. For example, a user can click on (or touch) a button, link, or list item associated with the first NAP 104, and an event corresponding to that click can be received in block 1902.

In some examples, at block 1904, a connection request can be transmitted, e.g., via the network interface 128. The connection request can be transmitted to the first network access point 104. In some examples, the connection request can include an authentication request indicating credentials valid for at least one roaming consortium of which NAP 104 is part. In some examples, the connection request can include, e.g., an EAP response carrying an Identity field, an HTTP POST request carrying credentials such as a Wireless ISP Roaming (WISPR) Authentication Request, or another request to establish full network connectivity. In some examples, the first NAP 104 is a visitable NAP 104 communicatively connectable with an issuing responder 112 to request the issuing responder 112 process the credentials and return an indication of success or failure.

In some examples, at block 1906, a status of the connection request can be determined. For example, an EAP, HTTP, or RADIUS response to the connection request can be received, and the status determined based at least in part on a response code, error code, response flag, or other indication of the status of the connection request indicated in the received response. The status can indicate whether the credentials or other information included in the connection request were accepted by the issuing responder 112 as sufficient to authorize the first NAP 104 to provide full network connectivity.

In some examples, at block 1908, an indication of the status of the connection request can be transmitted, e.g., via the network interface 128. The indication can be included in or associated with, e.g., a telemetry message 414. In some examples, transmitting the indication at block 1908 can permit network registry 130 to maintain updated information about NAPs 104 that, e.g., advertise membership in a particular roaming consortium but do not in fact have full visibility with that roaming consortium.

In some examples, at block 1910, via the user interface 330, an indication of the status of the connection request can be presented. The indication can include, e.g., a traffic-light indicator, a progress bar, a spinner, or another graphical indication of whether the connection request has been sent, whether the response has been received, or whether the connection was successful. Presenting this indication can permit the user to more readily choose an alternative NAP 104 if a request to connect to a particular NAP 104 fails.

In some examples of user interfaces described herein, e.g., for indicating states of visibility, states of network connectivity, or statuses of connection requests, the user interfaces can present at least one visual representation such as, e.g., a red/green (or red/blue) stoplight indicator, a "bars" indicator showing visibility or connectivity as a bar graph, a network icon showing an "X" or "!" for, respectively, no or reduced connectivity or visibility, a depiction of a hedge for walled-garden configurations, a depiction of a gate for captive-portal configurations, or a roaming consortium's logo for visitable NAPs. Presenting a visual representation distinguishing no-connectivity, walled-garden, captive-portal, or visitable-NAP configurations can reduce the amount of time required for a user to determine an appropriate action to improve network connectivity of the computing device 102. For example, even if the user is not using a Web browser and therefore is not interacting with a captive portal, a depiction of a gate can indicate to the user that opening a Web browser to interact with a captive portal should readily correct network-connectivity failures, and a depiction of a roaming consortium's logo, indicating full visitability, can indicate to the user that network connectivity is readily obtainable.

Illustrative Components

Figure 20:
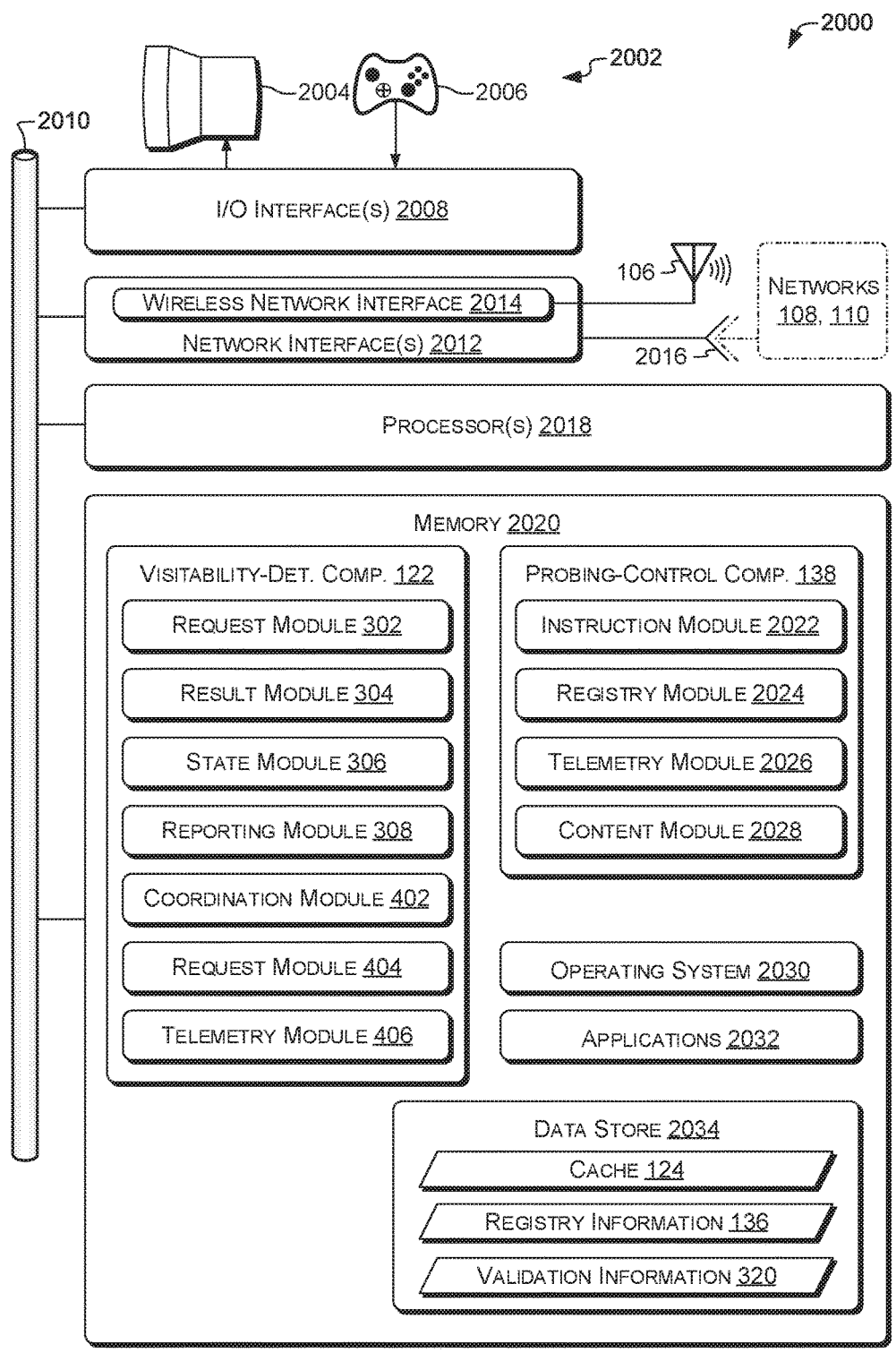
FIG. 20 is a block diagram depicting an example computing device configured to participate in visitability-state detection or to respond to detected visitability states according to various examples described herein.

FIG. 20 illustrates select components of an example computing device 2000, which can represent a computing device 102, responder 112, or network registry 130, FIG. 1. In the illustrated example, computing device 102 includes a user interface (UI) 2002 including, for example, a display device 2004, e.g., a touchscreen, enabling computing device 102 to present, e.g., video content. In some examples, UI 2002 can represent UI 330, FIG. 3. In example implementations, display device 2004 can display, e.g., Web pages of captive portals. In some examples, computing device 102 can be configured to present, on display device 2004, a visual representation of the state 326 of visitability of at least one of the network interface(s) 128, or a state of network connectivity thereof. Examples are discussed above, e.g., with reference to FIGS. 17-19.

UI 2002 can additionally or alternatively include, or be communicatively connected with, for example, a user-operable input device 2006 (graphically represented as a gamepad), enabling a user to, e.g., direct computing device 102 to establish connections to specific NAPs 104 or destinations 116. User-operable input device 2006 can include, e.g., a touch sensor over a touchscreen, a user-operable button, switch, or other physical input control, an optical sensor, e.g., to detect finger position with respect to a screen, a mouse, a trackball, a joystick, or a pointing stick such as a TRACKPOINT.

At least one of display 2004 or input device 2006 can be communicatively connected to at least one input/output (I/O) interface 2008, which can convey signals between display 2004 or input device 2006 and a system bus 2010, which can represent bus 126 or 140. A system bus 2010 can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus, e.g., a Mezzanine bus.

In the illustrated example, system bus 2010 is further connected to at least one network interface 2012, which can include at least one wireless network interface 2014 in some examples. Network interfaces 2012 or 2014 can represent network interfaces 128 or 142, FIG. 1. Network interfaces 2012 or 2014 can permit computing device 102 to communicate with other computing devices 102. For example, network interface(s) 2012 or 2014 can establish or facilitate receiving wired or wireless network service, e.g., via local network(s) 108 or network(s) 110. In some examples, at least one of the network interface(s) 2012 or 2014 can include, but is not limited to, a transceiver for Ethernet, cellular (3G, 4G, or other), WI-FI, ultra-wideband (UWB), BLUETOOTH, satellite, or other wireless transmissions. At least one of the network interface(s) 2012 or 2014 can include a wired I/O interface, such as an Ethernet interface, a serial interface, a Universal Serial Bus (USB) interface, an INFINIBAND interface, or other wired interfaces.

In some examples, at least one of the network interface(s) 2012 or 2014 can communicate wirelessly with at least one of the network(s) 110 via antenna 106. In some of these examples, the at least one of the network interface(s) 2012 or 2014 is or includes a wireless network interface 2014. In some examples, the computing device 102 can include a cable jack 2016, e.g., a plug, socket, or receptacle, communicatively connected to at least one of the network interface(s) 2012 or 2014. The at least one of the network interface(s) 2012 or 2014 can communicate with at least one of the network(s) 110 via cable jack 2016. Cable jack 2016 can include, e.g., an RJ-45 Ethernet receptacle.

Computing device 2000 can include at least one processor 2018, which can represent processors 118 or 132, FIG. 1. Computing device 2000 can further include at least one memory 2020, which can represent memory 120 or 134. Memory 2020 can be implemented as any combination of various types of memory components, e.g., computer-readable media (CRM) or computer storage media components. Examples of possible memory components include a random access memory (RAM), a disk drive, a mass storage component, and a non-volatile memory (e.g., ROM, Flash, EPROM, EEPROM, etc.). Alternative implementations of computing device 2000 can include a range of processing and memory capabilities. For example, full-resource computing devices can be implemented with substantial memory and processing resources, including a disk drive to store content for replay by the viewer. Low-resource computing devices, however, can have limited processing and memory capabilities, such as a limited amount of RAM, no disk drive, and limited processing capabilities.

Processor(s) 2018 process various instructions to control the operation of computing device 2000 and to communicate with other electronic and computing devices. For example, the processor(s) 2018 can be configured to execute modules of a plurality of modules, e.g., discussed above with reference to FIGS. 3 and 4, on the memory 2020. In some examples, the computer-executable instructions stored on the memory 2020 can, upon execution, configure a computer such as a computing device 2000 to perform operations described herein with reference to, e.g., visitability-determining component 122, probing-control component 138, or modules of either of those. The modules stored in the memory 2020 can include instructions that, when executed by the one or more processor(s) 2018, cause the one or more processor(s) 2018 to perform operations described herein. Examples of modules of probing-control component 138 can include an instruction module 2022 configured to determine instructions, e.g., as in at least FIG. 10, a registry module 2024 configured to determine or modify registry information, e.g., as in at least FIG. 11, a telemetry module 2026 configured to process telemetry messages, e.g., as in at least FIG. 16, or a content module 2028 configured to provide content items to a computing device 102, e.g., as in at least FIG. 12.

The memory 2020 stores various information or data, including, for example, at least a visitability-determining component 122, a probing-control component 138, an operating system 2030, or one or more other applications 2032. Functionality described associated with the illustrated components or modules can be combined to be performed by a fewer number of components or modules or can be split and performed by a larger number of components or modules. The other applications 2032 can include, for example, an Internet browser such as a Web browser, a captive-portal browser such as a browser component displayed in a dedicated window or interface for the purpose of interacting with a captive portal, a WISPR dedicated client, a media player application, a video editing application, a video streaming application, a television viewing application, and so on. In some examples, computer-executable instructions of vi sitability-determining component 122, probing-control component 138, or applications 2032 stored in at least one computer-readable medium (e.g., memory 2020), when executed on processor 2018 of computing device 2000, direct computing device 2000 to perform functions listed herein with respect to the relevant components in memory 2020.

In some examples, visitability-determining component 122 determines a state of visitability of computing device 2000. This can be as described above with reference to at least FIG. 3, 5-9, 13, 14, or 17-19, e.g., using algorithms such as those described above. In some examples, probing-control component 138 provides instructions or network-visitability information to computing devices 102. This can be as described above with reference to at least FIG. 4, 10-12, 15, or 16, e.g., using algorithms such as those described above.

In the illustrated example, memory 2020 includes a data store 2034. In some examples, data store 2034 can store information described above with reference to FIG. 1, 3, or 4, e.g., information described above with reference to cache 124, registry information 136, or validation information 320.

Although shown separately, some of the components of computing device 2000 can be implemented together in a single hardware device, such as in a Field-Programmable Gate Array (FPGA), an Application Specific Integrated Circuit (ASIC), Application-specific Standard Product (ASSP), System-On-a-Chip system (SoC), Complex Programmable Logic Device (CPLD), Digital Signal Processor (DSP), or other type of customizable processor. For example, a processor 2018 can represent a hybrid device, such as a device from ALTERA or XILINX that includes a CPU core embedded in an FPGA fabric. These or other hardware logic components can operate independently or, in some instances, can be driven by a CPU. In some examples, processor 2018 can be or include one or more single-core processors, multi-core processors, central processing unit (CPUs), graphics processing units (GPUs), general-purpose GPUs (GPGPUs), or hardware logic components configured, e.g., via specialized programming from modules or APIs, to perform functions described herein.

Any of the components illustrated in FIG. 20 can be in hardware, software, or a combination of hardware and software. Further, any of the components illustrated in FIG. 20, e.g., memory 2020, can be implemented using any form of computer-readable media that is accessible by computing device 2000, either locally or remotely, including over a network 110.

Computer-readable media includes two types of computer-readable media, namely computer storage media and communications media. Computer storage media (e.g., a computer storage medium) includes tangible storage units such as volatile memory, nonvolatile memory, or other persistent or auxiliary computer storage media, removable and non-removable computer storage media implemented in any method or technology for storage of information such as computer-readable instructions, data structures, program modules, or other data. Computer storage media includes tangible or physical forms of media included in a device or hardware component that is part of a device or external to a device, including, but not limited to, random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, or storage media that can be used to store and maintain information for access by a computing device 2000.

In contrast to computer storage media, communication media can embody computer-readable instructions, data structures, program modules, or other data in a modulated data signal, such as a carrier wave, or other transmission mechanism. As defined herein, computer storage media does not include communication media. In some examples, memory 2020 can be or include computer storage media.

In some examples, function(s) of at least the following blocks can be performed by a computing device 102: 502-506, 606-630, 702-714, 802-808, 902, 904, 1302-1308, 1402-1410, 1702-1708, 1802, 1804, or 1902-1910. In some examples, function(s) of at least the following blocks can be performed by a responder 112: 1002-1006, 1202-1214, or 1602-1606. In some examples, function(s) of at least the following blocks can be performed by a network registry 130: 1002-1006, 1102, 1104, 1202-1212, 1502-1510, or 1608-1618.

Example Clauses

A: An apparatus, comprising: at least one processor; a network interface communicatively coupled to the at least one processor; and a computer-readable medium including an identifier of a credential-evaluation entity and instructions to, when executed by the at least one processor, cause the at least one processor to: transmit, via the network interface, a security request including data of a trigger, the security request transmitted to a network access point; determine a result associated with the security request; and determine a state of visitability of the network access point based at least in part on the result, the state of visitability indicating whether the credential-evaluation entity is reachable via the network access point.

B: An apparatus as recited in paragraph A, wherein the trigger comprises at least one credential.

C: An apparatus as recited in paragraph A or B, wherein the security request comprises a cryptographic nonce.

D: An apparatus as recited in any of paragraphs A-C, the instructions further to cause the at least one processor to: receive, via the network interface, a security response; and determine the result based at least in part on the security response.

E: An apparatus as recited in paragraph D, the instructions further to cause the at least one processor to: determine a payload and a cryptographic signature of the security response; cryptographically validate the payload based at least in part on the cryptographic signature and a stored key; and determine that the state of visitability is a state of full visitability.

F: An apparatus as recited in paragraph D or E, the instructions further to cause the at least one processor to: determine a payload and a cryptographic signature of the security response; determine that the payload cannot be cryptographically validated based at least in part on the cryptographic signature and a stored key; and determine that the state of visitability is a state of unknown visitability.

G: An apparatus as recited in any of paragraphs D-F, the instructions further to cause the at least one processor to: determine reply information in the security response; and determine the result based at least in part on the reply information and stored validation information.

H: An apparatus as recited in paragraph G, the instructions further to cause the at least one processor to: compare the reply information to reference reply information in the stored validation information to provide the result, wherein the result indicates whether the reply information corresponds to the reference reply information.

I: An apparatus as recited in paragraph G or H, the instructions further to cause the at least one processor to: determine that the reply information does not match the stored validation information; and determine that the state of visitability is a state of unknown visitability.

J: An apparatus as recited in any of paragraphs G-I, the instructions further to cause the at least one processor to: determine that the reply information partially matches the stored validation information; and determine that the state of visitability is a state of full visitability.

K: An apparatus as recited in paragraph J, the instructions further to cause the at least one processor to determine that the reply information partially matches the stored validation information in response to at least one of: a match between a first portion of the reply information and a second portion of the stored validation information; or both of: a match between the reply information and the stored validation information, and a failure of cryptographic signature validation of the reply information.

L: An apparatus as recited in any of paragraphs G-K, the instructions further to cause the at least one processor to: determine that the reply information matches the stored validation information; and determine that the state of visitability is a state of full visitability.

M: An apparatus as recited in any of paragraphs A-L, the instructions further to cause the at least one processor to: determine that reply information associated with the security request was not received; and determine that the state of visitability is a state of unknown visitability.

N: An apparatus as recited in paragraph M, the instructions further to cause the at least one processor to await, for a selected length of time after transmission of the security request, receipt via the network interface of a security response comprising the reply information.

O: An apparatus as recited in any of paragraphs A-N, the instructions further to cause the at least one processor to transmit, via the network interface, an identification value associated with the network access point and an indication of at least one of the security request, the result, or the state of visitability of the network access point.

P: An apparatus as recited in paragraph O, wherein the indication further comprises local-network-specific information (LNSI) associated with the network access point.

Q: An apparatus as recited in paragraph O or P, the instructions further to cause the at least one processor to transmit the indication via a nameserver protocol tunnel.

R: An apparatus as recited in any of paragraphs O-Q, the instructions further to cause the at least one processor to: determine the indication; store the indication in a computer-readable memory; await a change in network connectivity (or other transmission window); and subsequent to the change in network connectivity, retrieve the indication from the computer-readable memory for transmission via the network interface.

S: An apparatus as recited in any of paragraphs A-R, the instructions further to cause the at least one processor to select a network interface (e.g., of multiple network interfaces of a terminal) (e.g., to carry network traffic) based at least in part on one or more determined states of visitability of respective network interfaces (e.g. of the apparatus).

T: A system comprising: at least one processor; a network interface communicatively coupled to the at least one processor; a memory storing registry information associated with at least one network access point and instructions that, when executed by the at least one processor, cause the at least one processor to perform operations comprising: receiving, via the network interface, an indication of a first network access point; determining, based at least in part on the registry information, an instruction associated with the first network access point, wherein the instruction comprises at least one of: a test instruction directing testing of a state of visitability of the first network access point to determine whether the first network access point is communicatively connectable with a credential-evaluation entity to evaluate credentials; or at least one content identifier; and transmitting the instruction via the network interface.

U: A system as recited in paragraph T, the operations further comprising: receiving, via the network interface, a telemetry message associated with the first network access point and comprising an indication of a state of visitability of the first network access point; modifying the registry information based at least in part on the indication of the state of visitability of the first network access point to provide modified registry information; and storing the modified registry information in the memory.

V: A system as recited in paragraph T or U, the operations further comprising: receiving, via the network interface, a plurality of telemetry messages associated with respective network access points, each telemetry message comprising an indication of a state of visitability of the respective network access point; modifying the registry information based at least in part on the indications of the states of visitability of the network access points to provide modified registry information; and storing the modified registry information in the memory.

W: A system as recited in any of paragraphs T-V, the operations further comprising, before transmitting the instruction, transmitting, via the network interface, the at least one content identifier and a content item associated with the at least one content identifier.

X: A method, comprising: transmitting, via a network interface, a request for instruction comprising identification of a network access point; receiving, via the network interface, an instruction comprising a content identifier; retrieving, from a computer-readable memory, a content item associated with the content identifier; and presenting a user interface including an indication of the network access point in association with the content item.

Y: A method as recited in paragraph X, wherein the identification of the network access point comprises at least one of a Service Set Identifier (SSID), Basic SSID (BSSID), or Homogenous Extended SSID (HESSID).

Z: A method as recited in paragraph X or Y, further comprising: determining that the instruction comprises a probe instruction; transmitting, via the network interface, a security request including data of a trigger, the security request transmitted to the network access point; determining a result associated with the security request; determining a state of visitability of the network access point based at least in part on the result, the state of visitability indicating whether a predetermined credential-evaluation entity is reachable via the network access point; and transmitting, via the network interface, the identification of the network access point and an indication of at least one of the security request, the result, or the state of visitability of the network access point.

AA: A method as recited in any of paragraphs X-Z, wherein the request for instruction further comprises identification information of a user.

AB: An apparatus, comprising: at least one processor; a network interface communicatively coupled to the at least one processor; and a computer-readable medium including instructions to, when executed by the at least one processor, cause the at least one processor to: receive, via the network interface, an instruction; transmit, in response to the receiving the instruction and via the network interface, a security request including data of a trigger, the security request transmitted to a network access point; determine a result associated with the security request; and determine a state of visibility of the network access point based at least in part on the result, the state of visibility indicating whether a predetermined credential-evaluation entity is reachable via the network access point.

AC: An apparatus as recited in paragraph AB, the instructions further to cause the at least one processor to: determine an indication of at least one of the security request, the result, or the state of visibility of the network access point; store the indication in a computer-readable memory; await expiration of a holdoff period (or other transmission window); subsequent to the expiration of the holdoff period, retrieve the indication from the computer-readable memory; and transmit the indication via the network interface.

AD: An apparatus as recited in paragraph AB or AC, the instructions further to cause the at least one processor to: receive, via the network interface, a security response; and determine the result based at least in part on the security response.

AE: An apparatus as recited in paragraph AD, wherein the trigger comprises at least one credential.

AF: An apparatus as recited in paragraph AD or AE, the instructions further to cause the at least one processor to: determine reply information in the security response; and determine the result based at least in part on the reply information and stored validation information.

AG: An apparatus as recited in paragraph AF, the instructions further to cause the at least one processor to: compare the reply information to reference reply information in the stored validation information to provide the result, wherein the result indicates whether the reply information corresponds to the reference reply information.

AH: An apparatus as recited in paragraph AF or AG, the instructions further to cause the at least one processor to: determine that the reply information does not match the stored validation information; and determine that the state of visibility is a state of absent visibility.

AI: An apparatus as recited in any of paragraphs AF-AH, the instructions further to cause the at least one processor to: determine that the reply information does not match the stored validation information; and determine that the state of visibility is a state of unknown visibility.

AJ: An apparatus as recited in any of paragraphs AF-AI, the instructions further to cause the at least one processor to: determine that the reply information matches the stored validation information; and determine that the state of visibility is a state of full visibility.

AK: An apparatus as recited in any of paragraphs AB-AJ, the instructions further to cause the at least one processor to: determine that reply information associated with the security request was not received; and determine that the state of visibility is a state of unknown vi sitability.

AL: An apparatus as recited in paragraph AK, the instructions further to cause the at least one processor to await, for a selected length of time after transmission of the security request, receipt via the network interface of a security response comprising the reply information.

AM: An apparatus as recited in any of paragraphs AB-AL, the instructions further to cause the at least one processor to transmit, via the network interface, an indication of at least one of the security request, the result, or the state of visibility of the network access point.

AN: An apparatus as recited in paragraph AM, wherein the indication comprises an indication of at least one of the security request, the result, a security response received via the network interface, or local-network-specific information (LNSI) associated with at least one of the network interface or the network access point.

AO: An apparatus as recited in paragraph AM or AN, the instructions further to cause the at least one processor to transmit the indication via at least one of a cellular network, a domain name system (DNS) tunnel or other protocol tunnel, or a second network access point different from the network access point.

AP: An apparatus as recited in any of paragraphs AM-AO, the instructions further to cause the at least one processor to: determine the indication; store the indication in a computer-readable memory; await a change in network connectivity (or other transmission window); and subsequent to the change in network connectivity, retrieve the indication from the computer-readable memory for transmission via the network interface.

AQ: An apparatus as recited in any of paragraphs AM-AP, the instructions further to cause the at least one processor to transmit the security request comprising a telemetry identifier and to transmit the indication comprising the telemetry identifier.

AR: An apparatus as recited in paragraph AQ, wherein the security request comprises a password field including the telemetry identifier.

AS: An apparatus as recited in any of paragraphs AB-AR, the instructions further to cause the at least one processor to transmit, via the network interface, a request for instruction prior to receiving the instruction.

AT: An apparatus as recited in paragraph AS, the instructions further to cause the at least one processor to transmit the request for instruction via at least one of a cellular network, a domain name system (DNS) tunnel or other protocol tunnel, or a second network access point different from the network access point.

AU: An apparatus as recited in paragraph AS or AT, the instructions further to cause the at least one processor to transmit the request for instruction to a nameserver and to receive the instruction from the nameserver.

AV: An apparatus as recited in paragraph AU, the instructions further to cause the at least one processor to determine a unique query value associated with the request for instruction.

AW: An apparatus as recited in any of paragraphs AS-AV, wherein the security request comprises a Remote Authentication Dial In User Service (RADIUS) request and the request for instruction comprises a Domain Name System (DNS) request.

AX: An apparatus as recited in any of paragraphs AB-AW, the instructions further to cause the at least one processor to select a network interface (e.g., of multiple network interfaces of a terminal) (e.g., to carry network traffic) based at least in part on one or more determined states of visibility of respective network interfaces (e.g. of the apparatus).

AY: A system comprising: at least one processor; a network interface communicatively coupled to the at least one processor; a memory storing registry information associated with at least one network access point and instructions that, when executed by the at least one processor, cause the at least one processor to perform operations comprising: receiving, via the network interface, an indication of a first network access point; determining, based at least in part on the registry information, an instruction associated with the first network access point; and transmitting the instruction via the network interface.

AZ: A system as recited in paragraph AY, the operations further comprising receiving a request packet, wherein the indication comprises at least one of a network address associated with the request packet or an access-point identifier included in the request packet.

BA: A system as recited in paragraph AY or AZ, the operations further comprising: receiving, via the network interface, a plurality of telemetry messages associated with the first network access point; determining an aggregate state of visitability associated with the first network access point based at least in part on the plurality of telemetry messages, the aggregate state of visitability indicating whether the first network access point is communicatively connectable with a credential-evaluation entity; modifying the registry information based at least in part on the aggregate state of visitability associated with the first network access point to provide modified registry information; and storing the modified registry information in the memory.

BB: A system as recited in any of paragraphs AY-BA, the operations further comprising: receiving, via the network interface, a telemetry message associated with the first network access point and comprising an indication of a state of visitability of the first network access point, the state of visitability of the first network access point indicating whether the first network access point is communicatively connectable with a credential-evaluation entity; modifying the registry information based at least in part on the indication of the state of visitability of the first network access point to provide modified registry information; and storing the modified registry information in the memory.

BC: A system as recited in any of paragraphs AY-BB, the operations further comprising, in response to the receiving the indication: modifying the registry information based at least in part on the indication to provide modified registry information; and storing the modified registry information in the memory.

BD: A system according to any of paragraphs AY-BC, the operations further comprising: receiving, via the network interface, a security request comprising a request identifier; and transmitting, via the network interface, a security response.

BE: A system as recited in paragraph BD, the operations further comprising: determining the security response comprising selected reply information; determining that the telemetry message indicates the selected reply information did not reach a selected network peer; and modifying the registry information, wherein the modified registry information comprises an indication that the first network access point has a state of less than full visitability.

BF: A system as recited in paragraph BD or BE, the operations further comprising receiving the security request and transmitting the security response before receiving the telemetry message.

BG: A system as recited in any of paragraphs BD-BF, the operations further comprising: retrieving from the telemetry message a telemetry request identifier; determining that the telemetry request identifier matches the request identifier; and modifying the registry information, wherein the modified registry information comprises an association between the first network access point and a second indication of the state of visitability of the first network access point different from the indication of the state of visitability of the first network access point.

BH: A system as recited in paragraph BG, the operations further comprising modifying the registry information based at least in part on the indication so that the second indication of the state of visitability of the first network access point indicates a state of less than full visitability.

BI: A system as recited in any of paragraphs AY-BH, the operations further comprising: retrieving from the memory historical data associated with the first network access point; determining, based at least in part on the historical data, that a selected probe-frequency threshold associated with the first network access point has been exceeded; and determining the instruction indicating that a security request should not be transmitted with respect to the first network access point.

BJ: A system as recited in paragraph BI, wherein the probe-frequency threshold corresponds to at least one of a number of security requests per network access point per unit time or a number of security requests per network per unit time.

BK: A system as recited in any of paragraphs AY-BJ, the operations further comprising modifying historical data in the memory in response to the determining the instruction.

BL: A system as recited in any of paragraphs AY-BK, the operations further comprising: determining that the first network access point is not represented in the registry information; and determining the instruction indicating that a security request should be transmitted with respect to the first network access point.

BM: A method, comprising: receiving, via a network interface, an instruction; transmitting one or more security requests via the network interface to respective network access points in response to the receiving the instruction; determining one or more results associated with respective security requests of the one or more security requests; presenting a user interface including indications of one or more of the network access points and indications of respective results of the one or more results.

BN: A method as recited in paragraph BM, further comprising: determining respective states of visitability of one or more of the network access points based at least in part on the respective results, the states of visitability indicating whether respective credential-evaluation entities are reachable via the respective network access points; and determining the indications of at least some of the results based at least in part on the respective states.

BO: A method as recited in paragraph BM or BN, further comprising: receiving, via the user interface, an indication of a first network access point of the one or more of the network access points; and transmitting, via the network interface, a connection request to the first network access point.

BP: A method as recited in paragraph BO, further comprising: determining a status of the connection request; and transmitting, via the network interface, an indication of the status of the connection request.

BQ: A method as recited in paragraph BP, further comprising presenting, via the user interface, an indication of the status of the connection request.

BR: A method as recited in any of paragraphs BM-BQ, wherein each (e.g., each and every one) of the indications of the one or more network access points is associated with a respective result of the one or more results indicating that the respective network access point has a respective state of full visitability, the states of full visitability indicating that respective credential-evaluation entities are reachable via the respective network access points.

BS: A computer-readable medium, e.g., a computer storage medium, having thereon computer-executable instructions, the computer-executable instructions upon execution configuring a computer to perform operations as any of paragraphs X-AA recites.

BT: A device comprising: a processor; and a computer-readable medium, e.g., a computer storage medium, having thereon computer-executable instructions, the computer-executable instructions upon execution by the processor configuring the device to perform operations as any of paragraphs X-AA recites.

BU: A system comprising: means for processing; and means for storing having thereon computer-executable instructions, the computer-executable instructions including means to configure the system to carry out a method as any of paragraphs X-AA recites.

BV: A computer-readable medium, e.g., a computer storage medium, having thereon computer-executable instructions, the computer-executable instructions upon execution configuring a computer to perform operations as any of paragraphs BM-BR recites.

BW: A device comprising: a processor; and a computer-readable medium, e.g., a computer storage medium, having thereon computer-executable instructions, the computer-executable instructions upon execution by the processor configuring the device to perform operations as any of paragraphs BM-BR recites.

BX: A system comprising: means for processing; and means for storing having thereon computer-executable instructions, the computer-executable instructions including means to configure the system to carry out a method as any of paragraphs BM-BR recites.

BY: A computer-readable medium, e.g., a computer storage medium, having thereon computer-executable instructions as any of paragraphs A-S recites.

BZ: A computer-readable medium, e.g., a computer storage medium, having thereon computer-executable instructions, the computer-executable instructions upon execution by a processor configuring the processor to perform operations as any of paragraphs T-W recites.

CA: A computer-readable medium, e.g., a computer storage medium, having thereon computer-executable instructions as any of paragraphs AB-AX recites.

CB: A computer-readable medium, e.g., a computer storage medium, having thereon computer-executable instructions, the computer-executable instructions upon execution by a processor configuring the processor to perform operations as any of paragraphs AY-BL recites.

CONCLUSION

Example detection techniques described herein can provide more reliable detection of a state of visitability of a network access point. Example reporting and user-interface techniques herein can provide more efficient user access to information regarding visitability and network connectivity. Example techniques herein can provide, to at least a network registry or a user, more reliable indications of the state of visitability of a network access point, or of characteristics of a communications path between the network access point and an issuing responder.

Some examples have been described herein with respect to DNS tunnels and RADIUS probes and connection requests. However, these examples are not limiting. Some examples herein can be applied in any situation in which obtaining network connectivity of a computing device 102 includes providing user credentials to a non-local authoritative source of information, such as a responder 112 of an issuing entity; the computing device 102 is not configured with information indicating that the authoritative source is always reachable via a network 110 (e.g., due to possible interruptions in connectivity, or due to unknown connectivity); and the authoritative source can provide information to at least one of the computing device 102 or the network registry 130 indicating whether security requests 310 from the computing device 102 were received by the authoritative source (e.g., responder 112).

Although visitability detection has been described in language specific to structural features or methodological steps, it is to be understood that the invention defined in the appended claims is not necessarily limited to the specific features or steps described. Rather, the specific features and steps are disclosed as preferred forms of implementing the claimed invention.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, or executed in parallel to implement the described processes. The described processes can be performed by resources associated with one or more computing device(s) 102, such as one or more internal or external CPUs or GPUs, or one or more pieces of hardware logic such as FPGAs, DSPs, or other types of accelerators.

The methods and processes described above can be embodied in, and fully automated via, software code modules executed by one or more general purpose computers or processors. The code modules can be stored in any type of computer-readable storage medium or other computer storage medium. Some or all of the methods can alternatively be embodied in specialized computer hardware.

Conditional language such as, among others, "can," "could," "might" or "may," unless specifically stated otherwise, are understood within the context to present that certain examples include, while other examples do not include, certain features, elements or steps. Thus, such conditional language is not generally intended to imply that certain features, elements or steps are in any way required for one or more examples or that one or more examples necessarily include logic for deciding, with or without user input or prompting, whether certain features, elements or steps are included or are to be performed in any particular example. The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," and/or any of those phrases with "and/or" substituted for "or," unless specifically stated otherwise, is to be understood as signifying that an item, term, etc., can be either X, Y, or Z, or a combination of any elements thereof (e.g., a combination of XY, XZ, YZ, and/or XYZ). As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present.

Any routine descriptions, elements or blocks in the flow diagrams described herein or depicted in the attached figures should be understood as potentially representing modules, segments, or portions of code that include one or more executable instructions for implementing specific logical functions or elements in the routine. Alternate implementations are included within the scope of the examples described herein in which elements or functions can be deleted, or executed out of order from that shown or discussed, including substantially synchronously or in reverse order, depending on the functionality involved as would be understood by those skilled in the art. It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise.

What is claimed is:

1. An apparatus, comprising:
   at least one processor;
   a network interface communicatively coupled to the at least one processor; and
   a computer-readable medium including an identifier of a credential-evaluation entity and instructions to, when executed by the at least one processor, cause the at least one processor to:
   transmit, via the network interface, a security request expressed in a first protocol including data of a trigger, the security request transmitted to a network access point;
   receive, via the network interface, a security response in a second protocol, the second protocol different from the first protocol;
   determine a result associated with the security request based at least in part on the security response; and
   determine a state of visitability of the network access point based at least in part on the result, the state of visitability indicating whether the credential-evaluation entity is reachable via the network access point, thereby providing at least one of improved network connectivity and reduced network bandwidth consumption.

2. The apparatus as recited in claim 1, wherein the trigger comprises at least one credential.

3. The apparatus as recited in claim 1, wherein the security request comprises a cryptographic nonce.

4. The apparatus as recited in claim 1,
   wherein receiving, via the network interface, the security response in the second selected protocol includes receiving reply information associated with the security response, the reply information including one or more of a RADIUS Reply-Message, challenge data, and a cryptographic signature.

5. The apparatus as recited in claim 4, the instructions further to cause the at least one processor to:
   determine a payload and the cryptographic signature of the reply information associated with the security response;
   cryptographically validate the payload based at least in part on the cryptographic signature and a stored key; and
   determine that the state of visitability is a state of full visitability.

6. The apparatus as recited in claim 4, the instructions further to cause the at least one processor to:
   determine the reply information associated with the security response; and
   determine the result based at least in part on the reply information and stored validation information.

7. The apparatus as recited in claim 6, the instructions further to cause the at least one processor to:
   determine that the reply information does not match the stored validation information; and
   determine that the state of visitability is a state of unknown visitability.

8. The apparatus as recited in claim 6, the instructions further to cause the at least one processor to:
   determine that the reply information partially matches the stored validation information; and
   determine that the state of visitability is a state of full visitability.

9. The apparatus as recited in claim 6, the instructions further to cause the at least one processor to:
   determine that the reply information matches the stored validation information; and
   determine that the state of visitability is a state of full visitability.

10. The apparatus as recited in claim 1, the instructions further to cause the at least one processor to:
    determine that reply information associated with the security request was not received; and
    determine that the state of visitability is a state of unknown visitability.

11. The apparatus as recited in claim 10, the instructions further to cause the at least one processor to await, for a selected length of time after transmission of the security request, receipt via the network interface of the security response comprising the reply information.

12. The apparatus as recited in claim 1, the instructions further to cause the at least one processor to transmit, via the network interface, an identification value associated with the network access point and an indication of at least one of the security request, the result, or the state of visitability of the network access point.

13. The apparatus as recited in claim 12, the instructions further to cause the at least one processor to transmit the indication via a nameserver protocol tunnel.

14. The apparatus as recited in claim 12, the instructions further to cause the at least one processor to:
    determine the indication;
    store the indication in a computer-readable memory;
    await a transmission window; and
    during the transmission window, retrieve the indication from the computer-readable memory for transmission via the network interface.

15. A system comprising:
    at least one processor;
    a network interface communicatively coupled to the at least one processor;

a memory storing registry information associated with at least one network access point and instructions that, when executed by the at least one processor, cause the at least one processor to perform operations comprising:

receiving, via the network interface, an indication of a first network access point;

determining, based at least in part on the registry information, an instruction associated with the first network access point, wherein the instruction comprises at least one of:

a test instruction directing testing of a state of visitability of the first network access point to determine whether the first network access point is communicatively connectable with a credential-evaluation entity; or at least one content identifier;

transmitting the instruction via the network interface; and receiving, via the network interface, a security request expressed in a first protocol including data of a trigger, the security request received from the first network access point; and transmitting, via the network interface, a security response, based on the security requests, in a second protocol, the second protocol different from the first protocol, thereby providing at least one of improved network connectivity and reduced network bandwidth consumption.

16. The system as recited in claim 15, the operations further comprising:

receiving, via the network interface, a telemetry message associated with the first network access point and comprising an indication of a state of visitability of the first network access point;

modifying the registry information based at least in part on the indication of the state of visitability of the first network access point to provide modified registry information; and storing the modified registry information in the memory.

17. The system as recited in claim 15, the operations further comprising, before transmitting the instruction, transmitting, via the network interface, the at least one content identifier and a content item associated with the at least one content identifier.

18. A method, comprising:

transmitting, via a network interface, a request for instruction comprising identification of a network access point;

receiving, via the network interface, an instruction comprising a content identifier;

retrieving, from a computer-readable memory, a content item associated with the content identifier;

presenting a user interface including an indication of the network access point in association with the content item;

determining that the instruction comprises a probe instruction;

transmitting, via the network interface, a security request expressed in a first protocol including data of a trigger, the security request transmitted to the network access point receiving, via the network interface, a security response in a second protocol, the second protocol different from the first protocol; and determine a result associated with the security request based at least in part on the security response, thereby providing at least one of improved network connectivity and reduced network bandwidth consumption.

19. The method as recited in claim 18, further comprising:

determining a state of visitability of the network access point based at least in part on the result, the state of visitability indicating whether a predetermined credential-evaluation entity is reachable via the network access point; and transmitting, via the network interface, the identification of the network access point and an indication of at least one of the security request, the result, or the state of visitability of the network access point.

20. The method as recited in claim 18, wherein the request for instruction further comprises identification information of a user.

* * * * *